US009050921B2

(12) United States Patent
Anderson et al.

(10) Patent No.: US 9,050,921 B2
(45) Date of Patent: *Jun. 9, 2015

(54) AUTO-RACK RAILROAD CAR VEHICLE WHEEL CHOCK

(71) Applicant: Standard Car Truck Company, Park Ridge, IL (US)

(72) Inventors: John D. Anderson, Oswego, IL (US); Walter J. Peach, Montgomery, IL (US); Michael K. Burke, Wheaton, IL (US)

(73) Assignee: Standard Car Truck Company, Park Ridge, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/787,577

(22) Filed: Mar. 6, 2013

(65) Prior Publication Data

US 2013/0183115 A1    Jul. 18, 2013

Related U.S. Application Data

(60) Division of application No. 13/152,541, filed on Jun. 3, 2011, now Pat. No. 8,419,326, which is a continuation of application No. 12/048,402, filed on Mar. 14, 2008, now Pat. No. 7,976,255.

(60) Provisional application No. 60/939,277, filed on May 21, 2007, provisional application No. 60/896,625, filed on Mar. 23, 2007.

(51) Int. Cl.
*B60P 7/08*    (2006.01)
*B60P 3/077*    (2006.01)
*B61D 3/18*    (2006.01)

(52) U.S. Cl.
CPC ............. *B60P 3/077* (2013.01); *B61D 3/188* (2013.01)

(58) Field of Classification Search
CPC .......................... B60P 3/077; B61D 3/188
USPC .............. 410/7, 9, 19, 30, 49; 188/32, 36
See application file for complete search history.

(56) References Cited

U.S. PATENT DOCUMENTS

| 1,424,957 A | 8/1922 | Tilburg |
| 1,776,935 A | 9/1930 | Snyder |
| 2,066,714 A | 1/1937 | Butterworth |
| 2,540,400 A | 2/1951 | McHenry |
| 2,705,081 A | 3/1955 | Jacobs |
| 2,730,400 A | 1/1956 | Francis |
| 2,771,162 A | 11/1956 | Marsh |

(Continued)

FOREIGN PATENT DOCUMENTS

| DE | 1265771 | 4/1968 |
| DE | 1810854 | 7/1971 |

(Continued)

OTHER PUBLICATIONS

Pictures of Gaster Prototype "Chock," Publicly Available Prior to 2000.

*Primary Examiner* — Stephen Gordon
(74) *Attorney, Agent, or Firm* — Neal, Gerber & Eisenberg LLP

(57) ABSTRACT

A vehicle wheel chock for a vehicle restraint system for an auto-rack railroad car which secures a vehicle in the auto-rack railroad car. The vehicle wheel chock is configured to be positioned on a grating adjacent to a tire of the vehicle.

13 Claims, 73 Drawing Sheets

(56) References Cited

U.S. PATENT DOCUMENTS

| | | |
|---|---|---|
| 2,797,774 A | 7/1957 | Eckhart |
| 2,853,257 A | 9/1958 | Cook |
| 2,858,905 A | 11/1958 | Fahland |
| 2,895,569 A | 7/1959 | Nystrom |
| 3,119,350 A | 1/1964 | Bellingher |
| 3,581,846 A | 6/1971 | Janus |
| 3,605,954 A | 9/1971 | Wakabayashi et al. |
| 3,739,906 A | 6/1973 | Cwycyshyn et al. |
| 3,895,587 A | 7/1975 | Bell |
| 4,024,820 A | 5/1977 | Hlinsky et al. |
| 4,031,983 A | 6/1977 | Lentini |
| 4,032,167 A | 6/1977 | Chereda |
| 4,060,036 A | 11/1977 | Palms |
| 4,316,686 A | 2/1982 | Cottrell et al. |
| 4,343,401 A | 8/1982 | Paulyson |
| 4,399,893 A | 8/1983 | Switzer |
| 4,615,416 A | 10/1986 | Wilson |
| 4,659,266 A | 4/1987 | Thelen et al. |
| 4,668,140 A | 5/1987 | Blunden |
| 4,676,344 A | 6/1987 | Locicero |
| 4,695,087 A | 9/1987 | Hollrock |
| 4,786,223 A | 11/1988 | Crissy et al. |
| 4,804,070 A | 2/1989 | Bohler |
| 4,836,726 A | 6/1989 | Robertson et al. |
| 4,838,743 A | 6/1989 | Blunden et al. |
| 4,875,813 A | 10/1989 | Moyer et al. |
| 4,960,353 A | 10/1990 | Thorndyke |
| 4,971,492 A | 11/1990 | Moyer et al. |
| 4,979,856 A | 12/1990 | Blunden et al. |
| 5,011,347 A | 4/1991 | Bullock |
| 5,037,255 A | 8/1991 | Bullock et al. |
| 5,106,245 A | 4/1992 | Fritz et al. |
| 5,160,223 A | 11/1992 | Seitz |
| 5,302,063 A | 4/1994 | Winsor |
| 5,312,213 A | 5/1994 | Winsor |
| 5,316,421 A | 5/1994 | Bullock et al. |
| 6,164,893 A | 12/2000 | Glomot et al. |
| 6,835,034 B2 | 12/2004 | Winsor |
| 6,851,523 B1 | 2/2005 | Gaster |
| D516,268 S | 2/2006 | Gaster |
| 7,004,696 B2 | 2/2006 | Anderson et al. |
| 7,128,508 B2 | 10/2006 | Anderson et al. |
| 7,150,592 B2 | 12/2006 | Anderson et al. |
| 7,513,725 B1 | 4/2009 | Bullock |
| 7,976,255 B2 | 7/2011 | Anderson et al. |
| 8,152,424 B2 | 4/2012 | Anderson et al. |
| 8,419,326 B2 * | 4/2013 | Anderson et al. ............... 410/30 |
| 8,506,217 B2 * | 8/2013 | Anderson et al. ............... 410/30 |
| 2009/0208304 A1 | 8/2009 | Bullock |

FOREIGN PATENT DOCUMENTS

| | | |
|---|---|---|
| DE | 2519885 A1 | 11/1976 |
| EP | 0128992 A1 | 12/1984 |
| FR | 1564196 | 4/1969 |
| FR | 2296550 | 11/1974 |
| FR | 2421768 | 11/1979 |
| FR | 2584664 A1 | 1/1987 |
| SU | 1243985 A1 | 7/1986 |
| WO | WO 8909709 | 10/1989 |

* cited by examiner

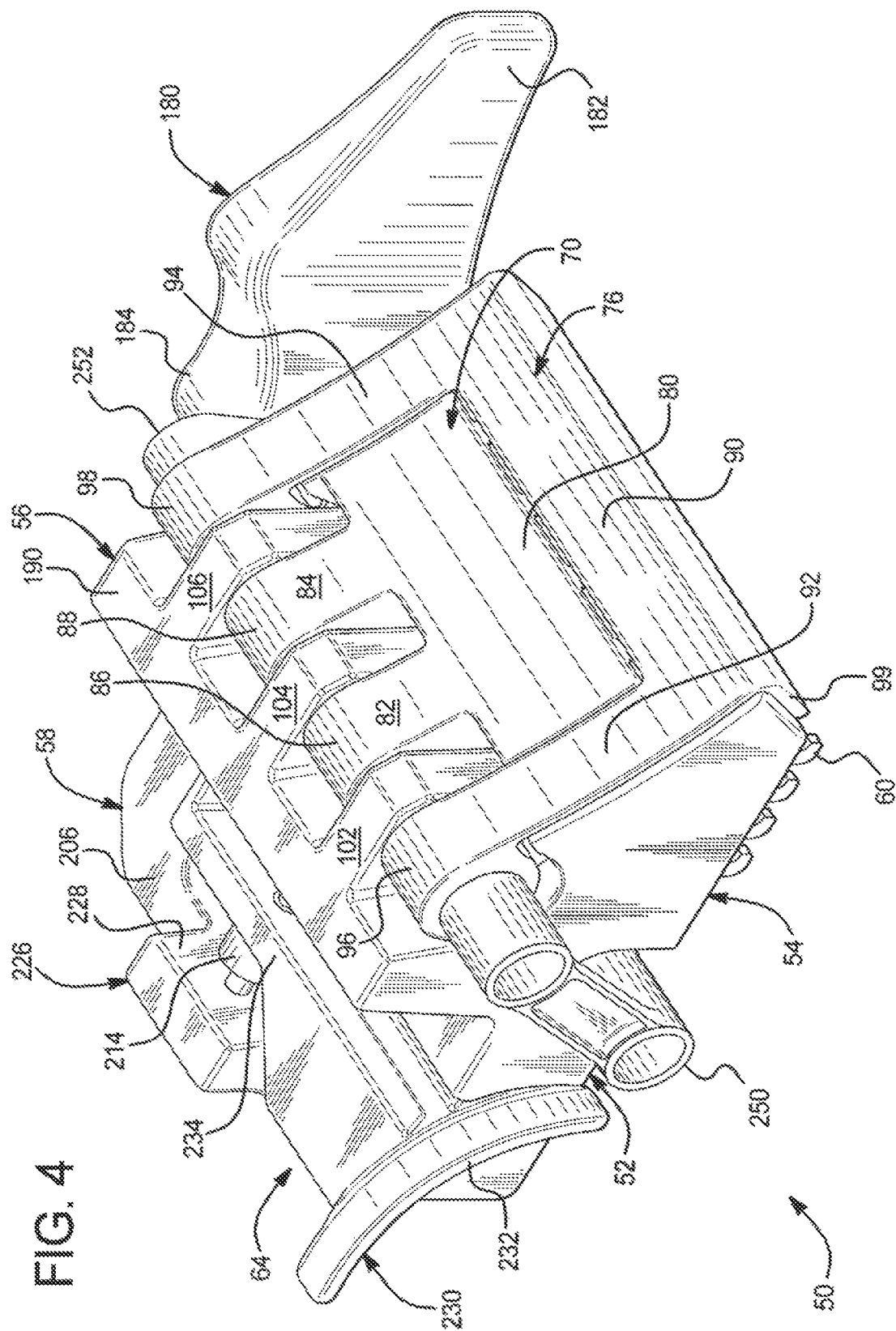

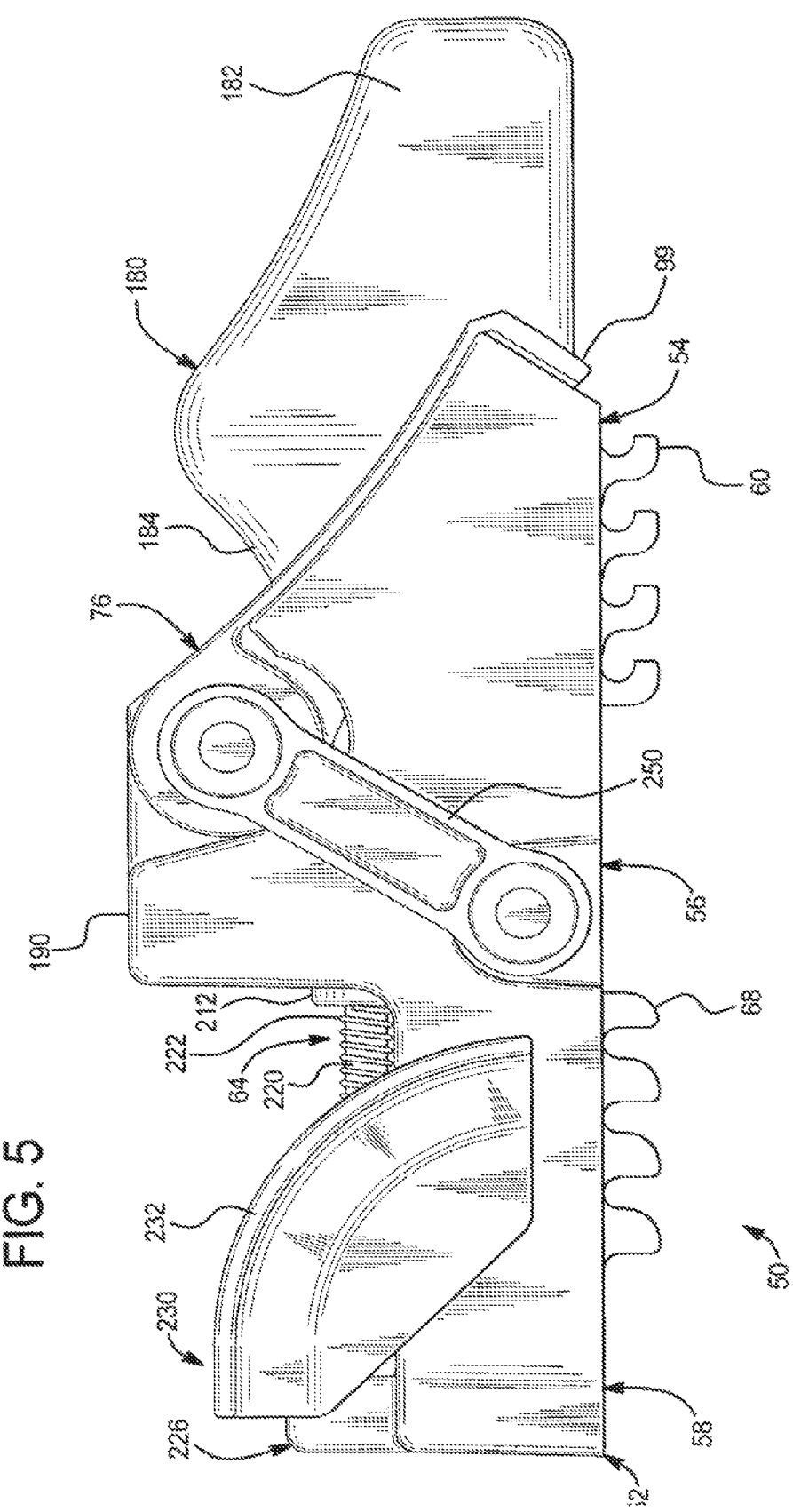

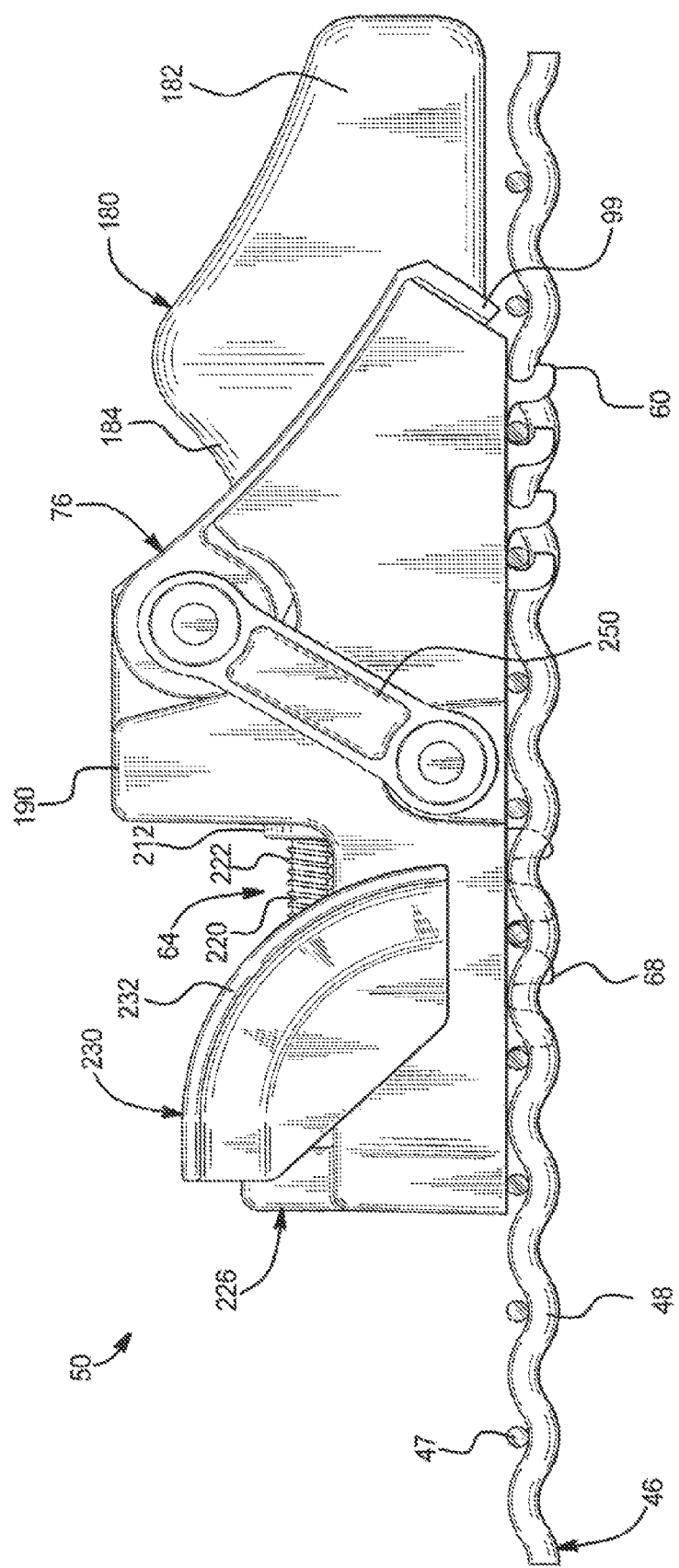

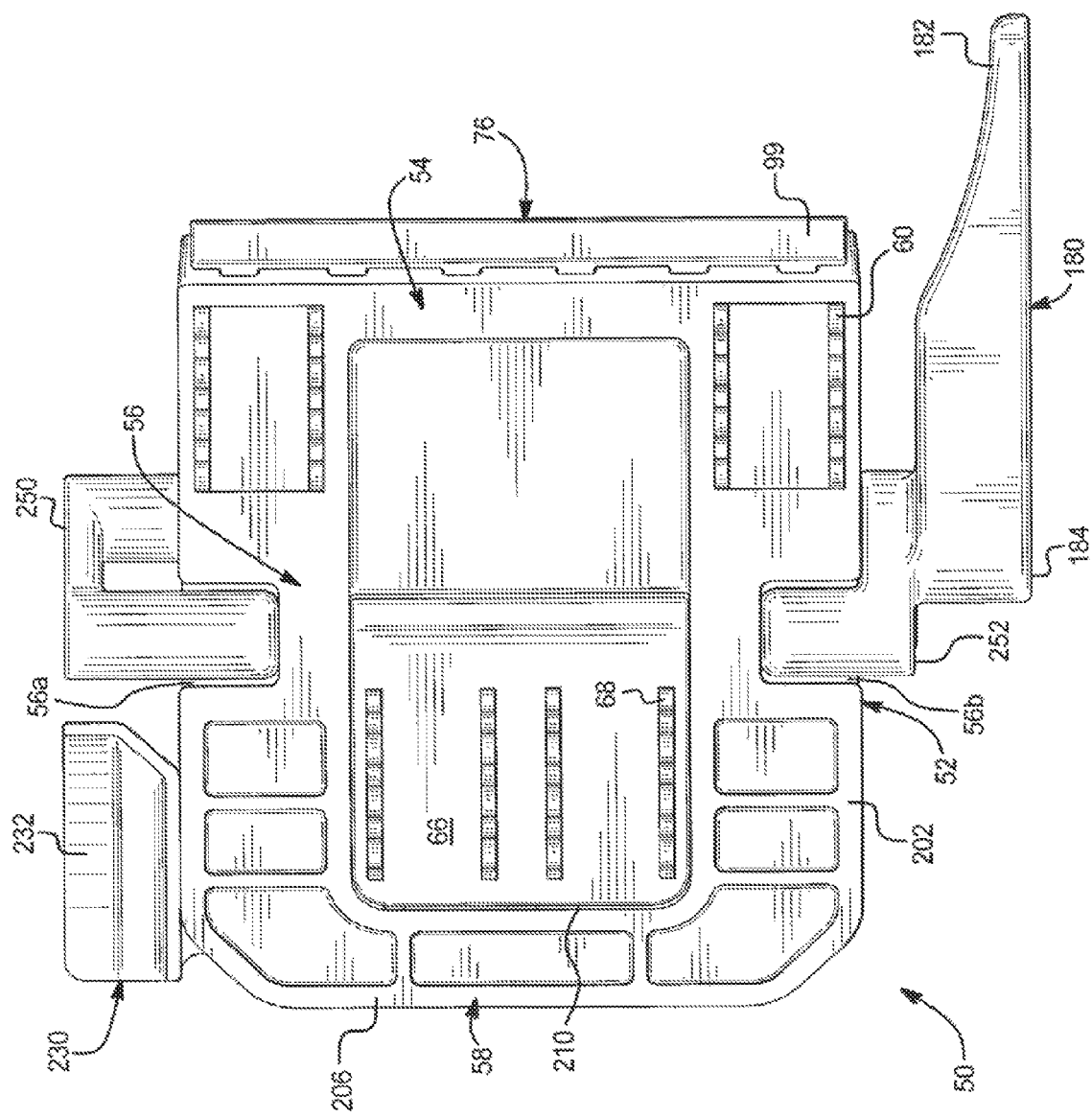

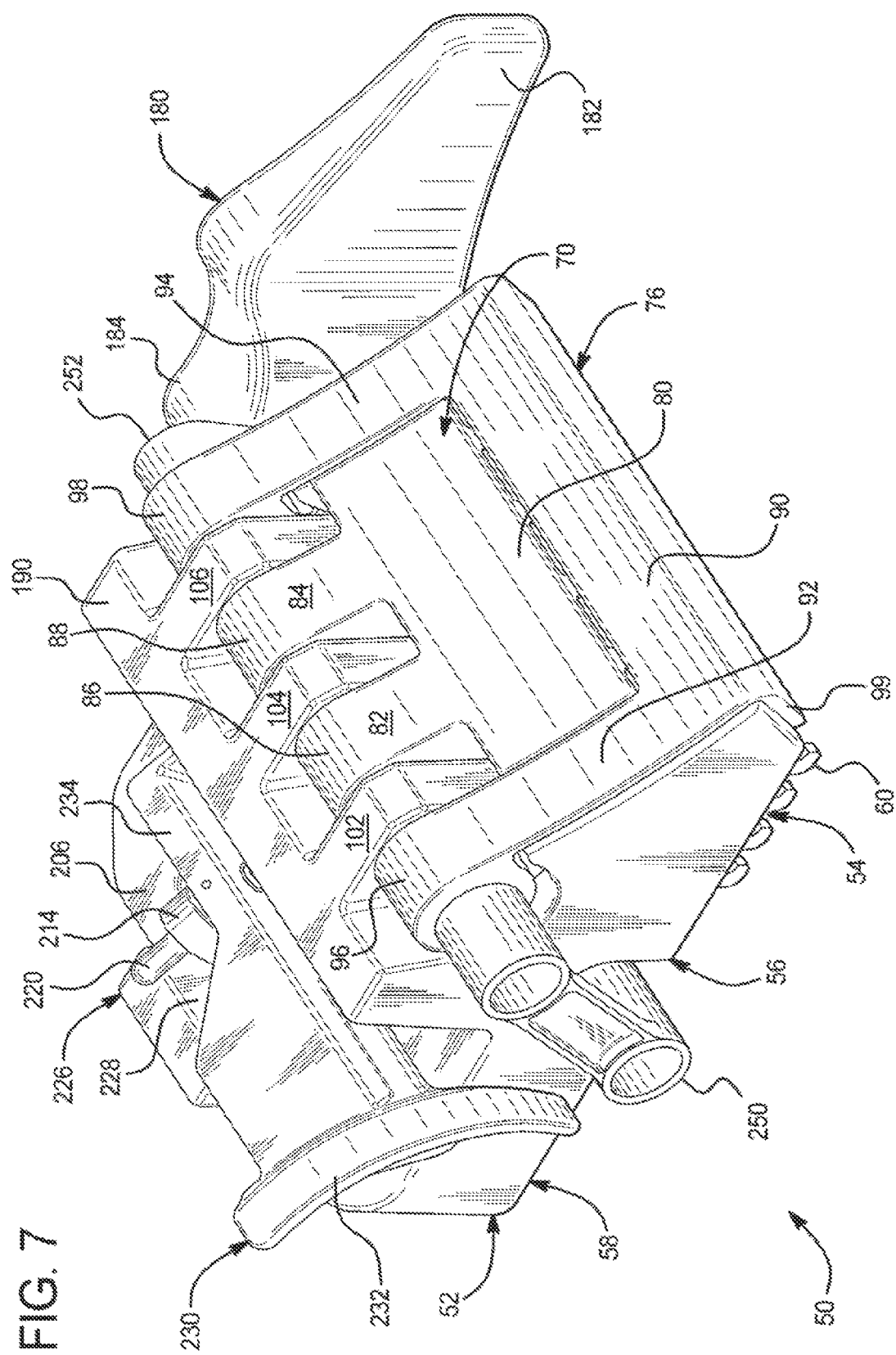

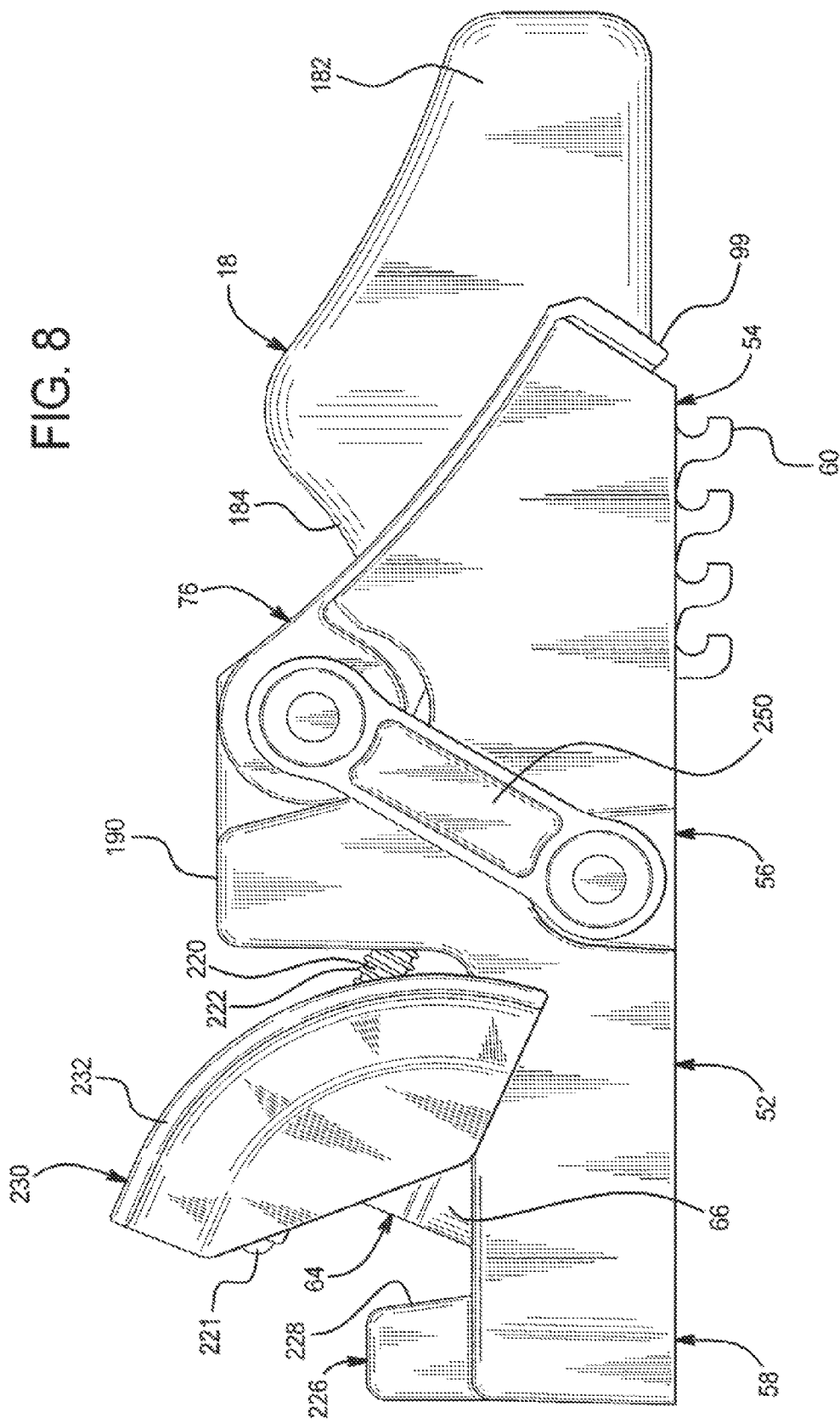

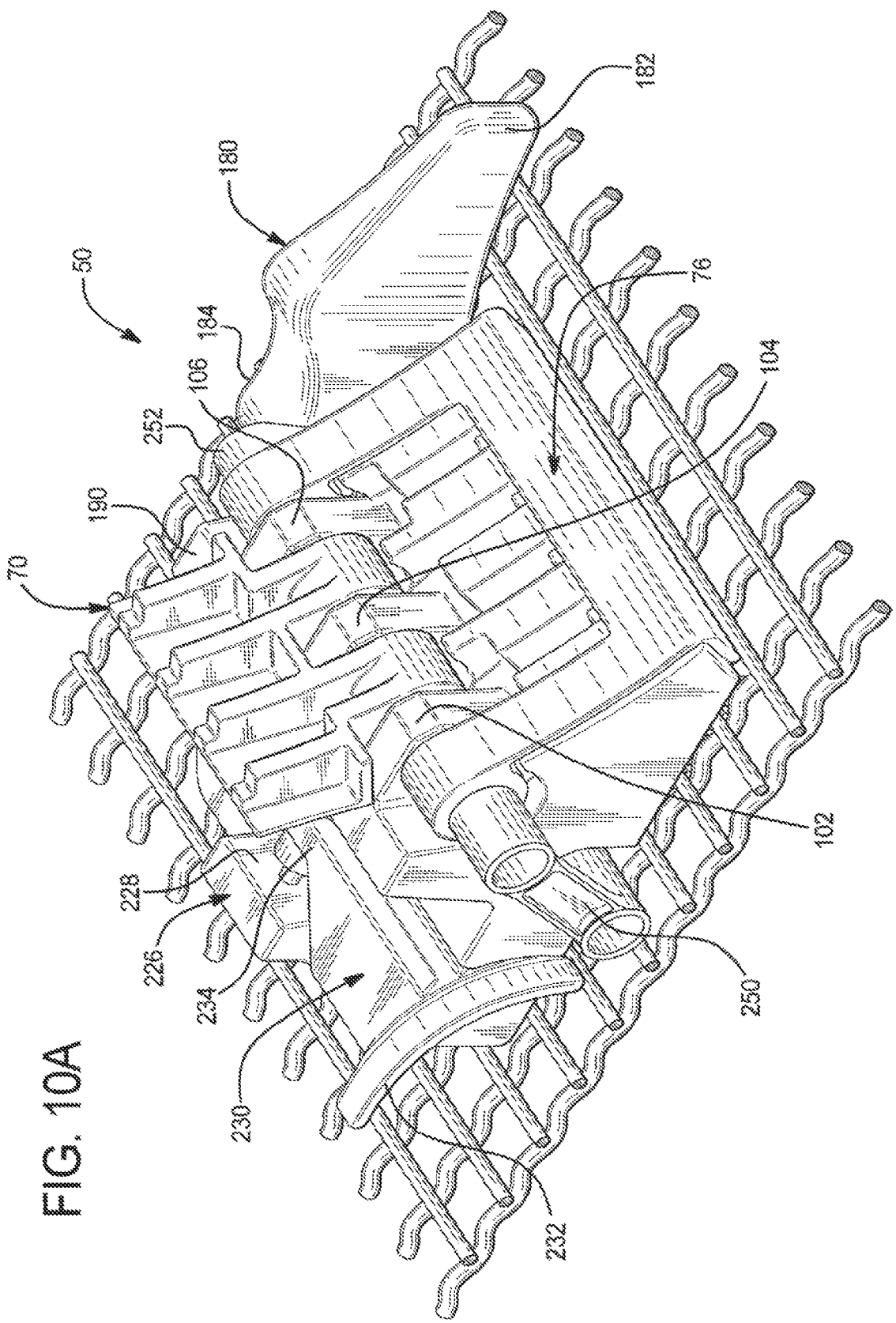

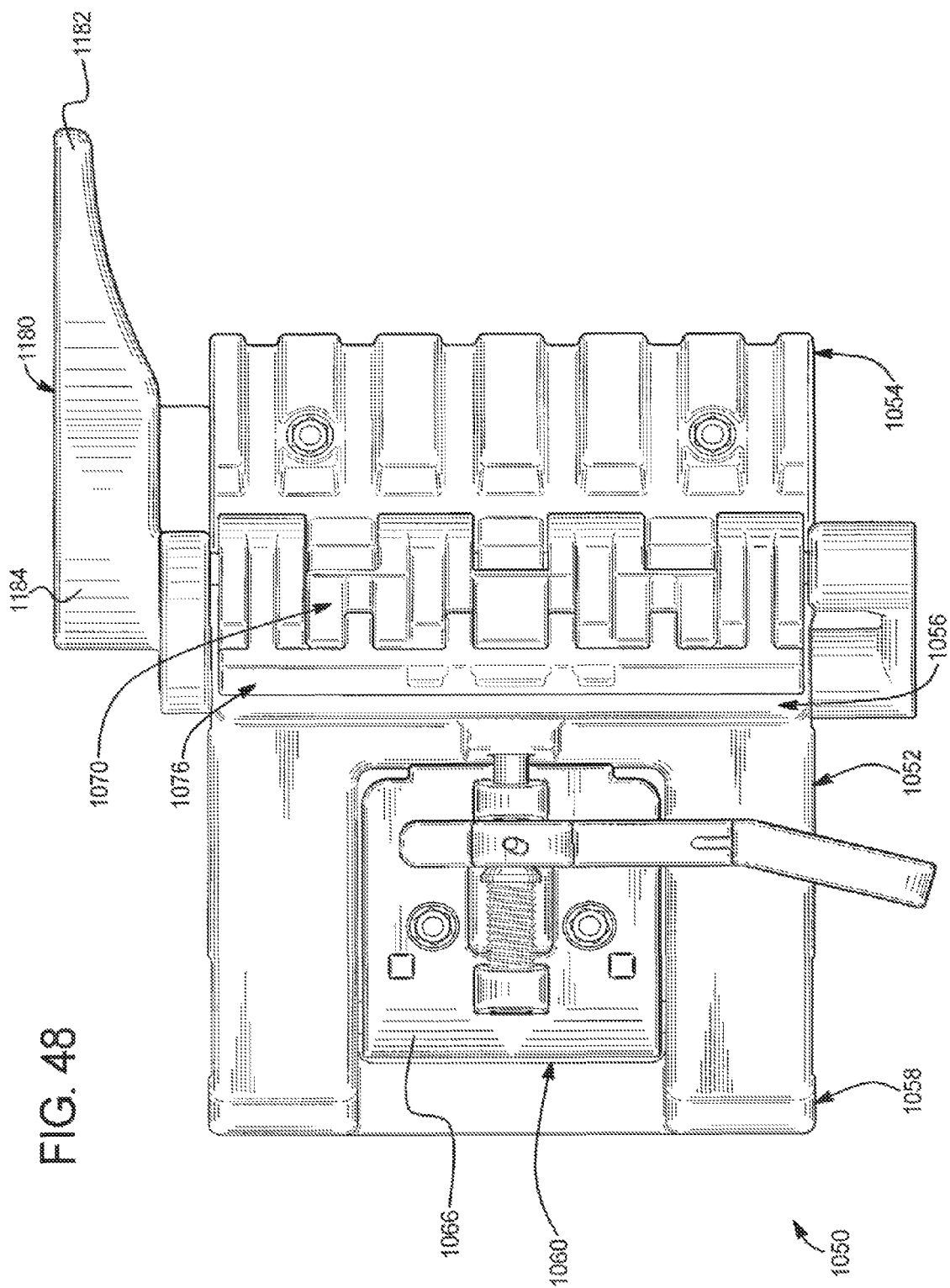

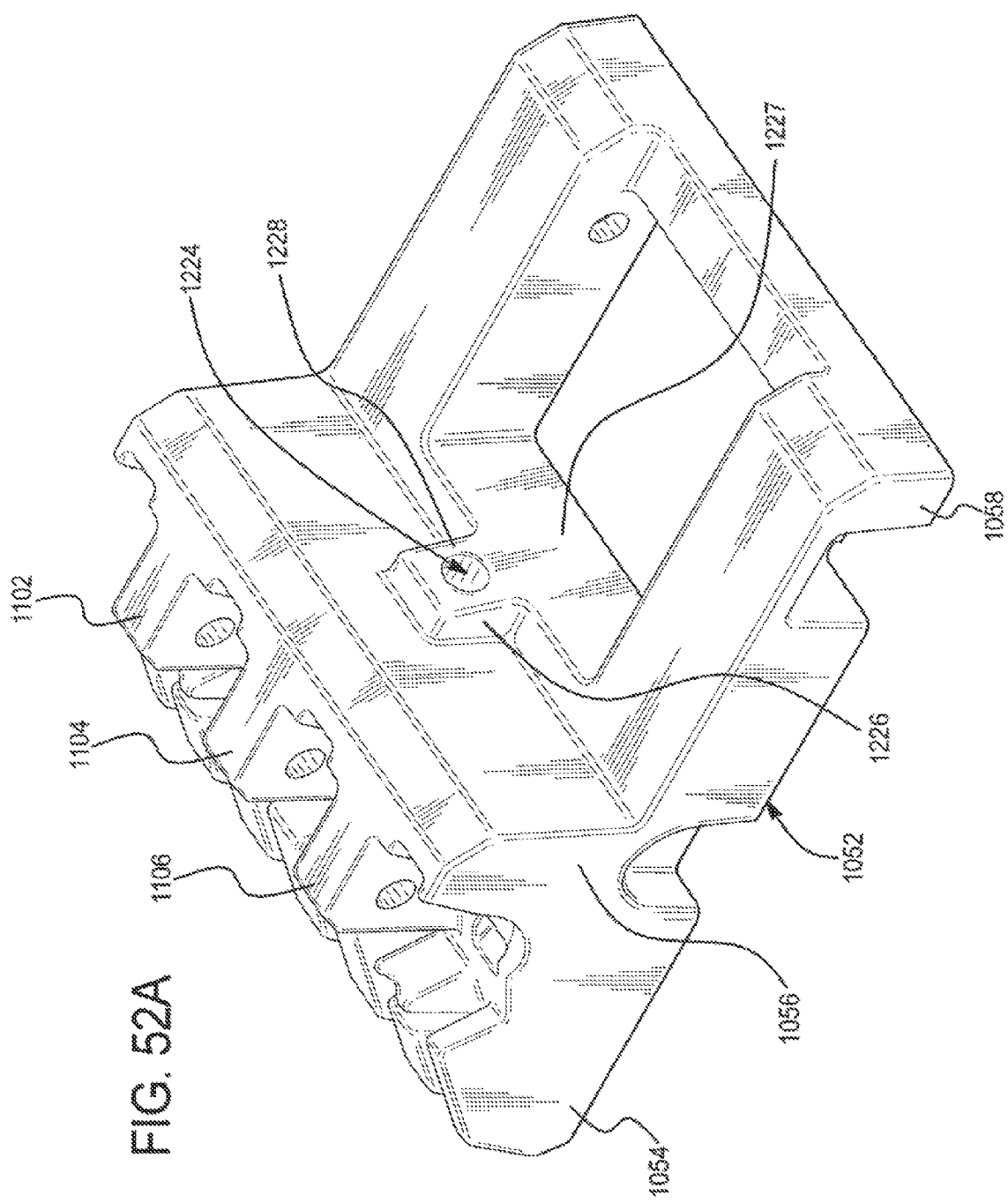

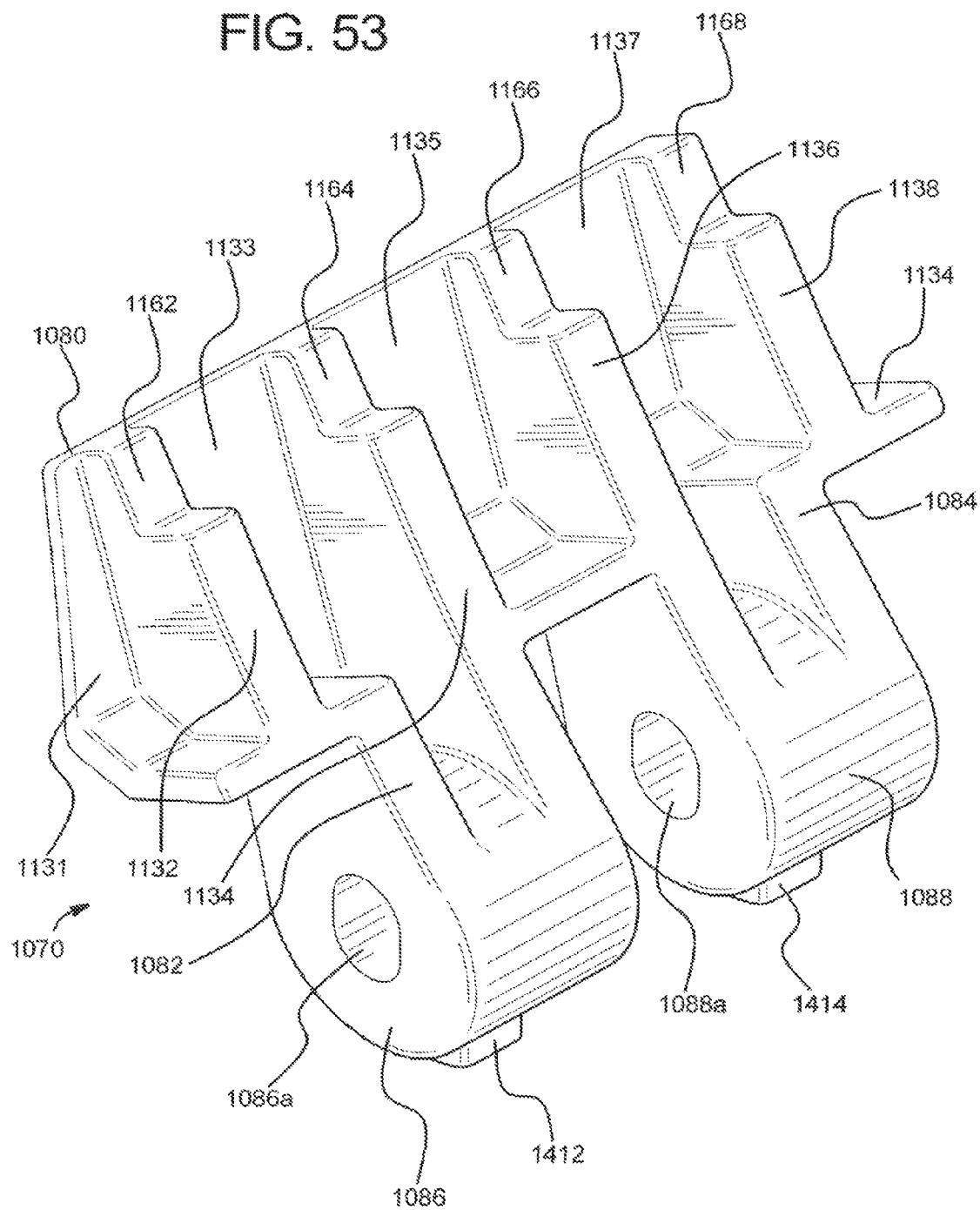

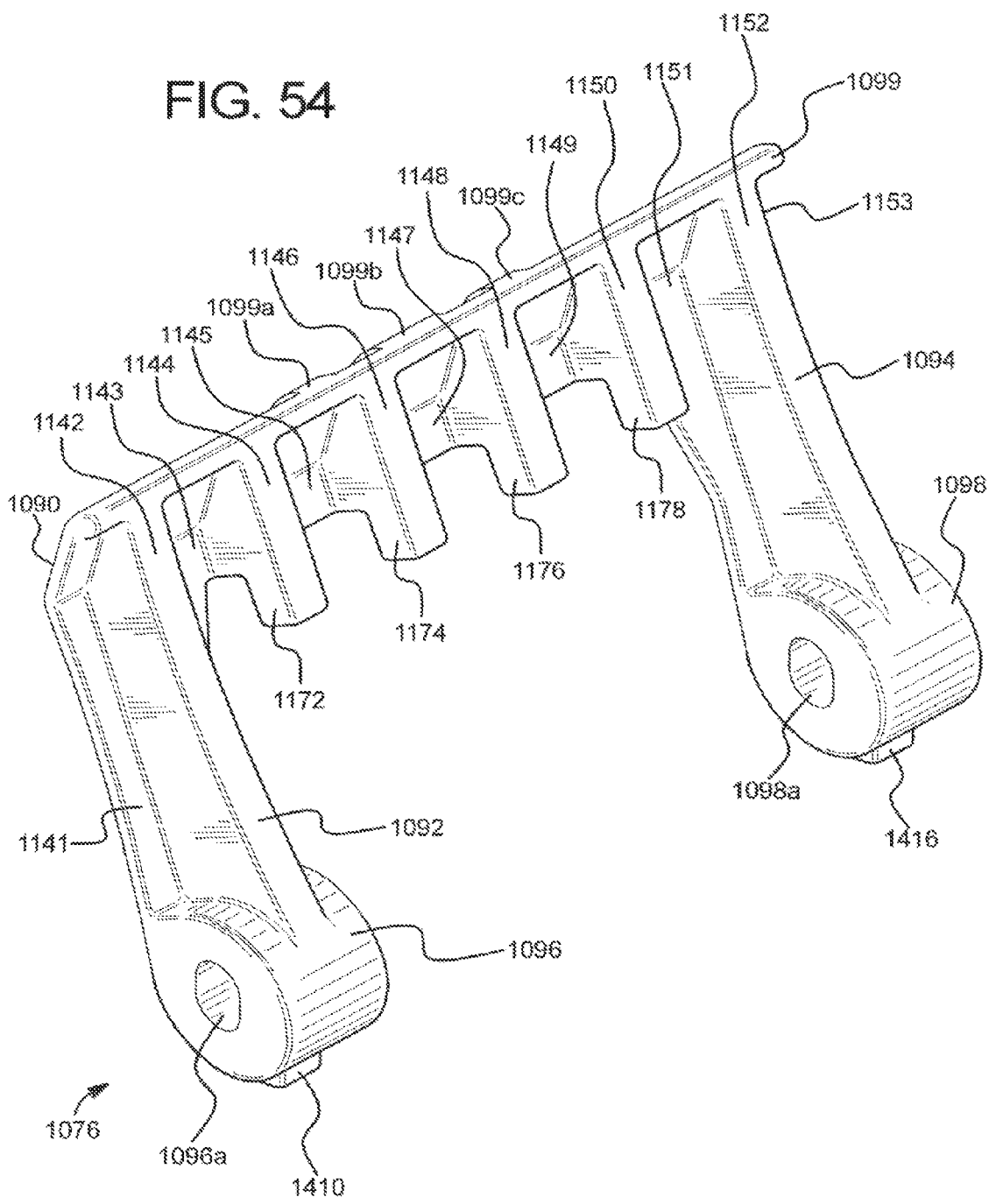

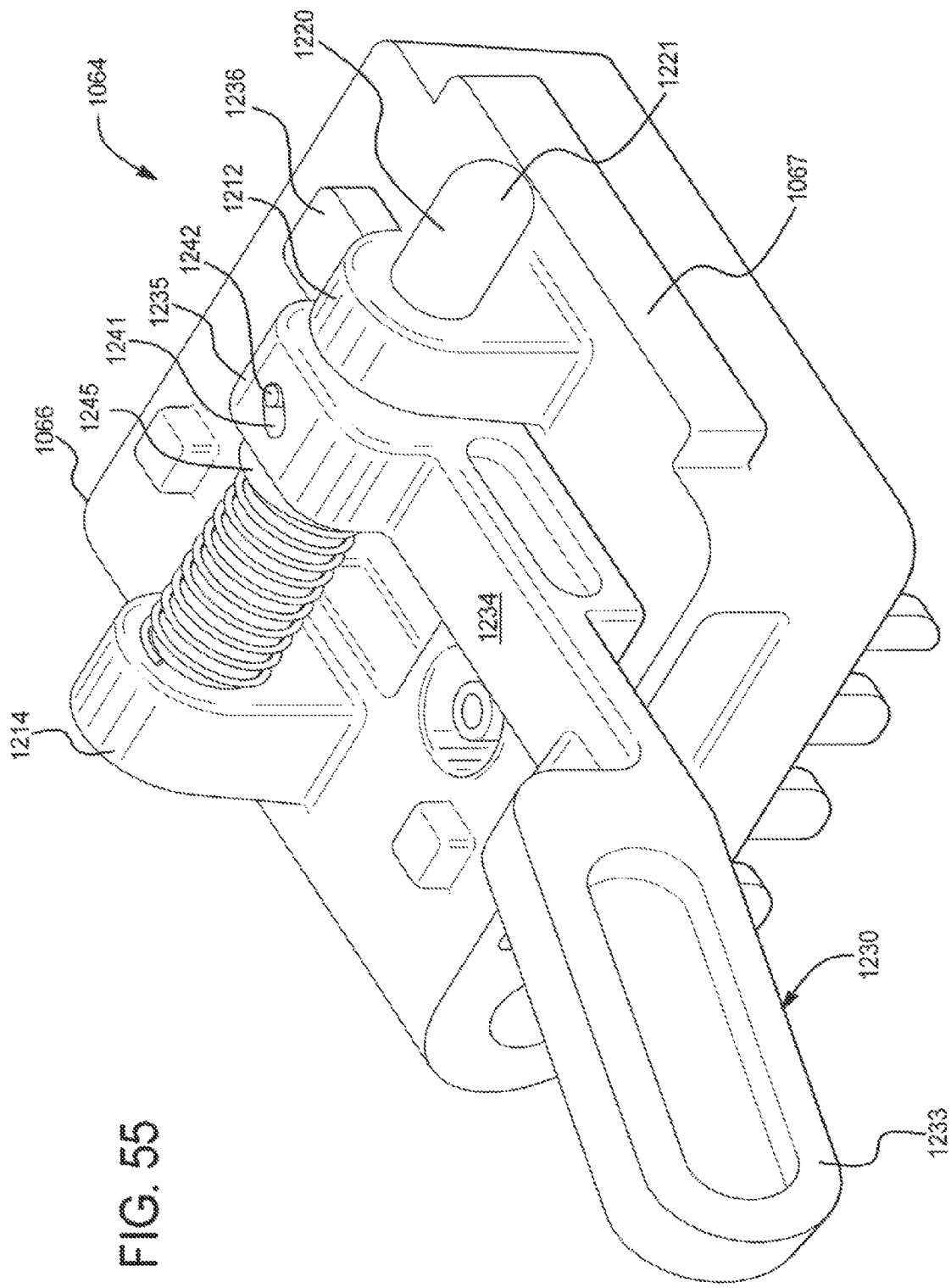

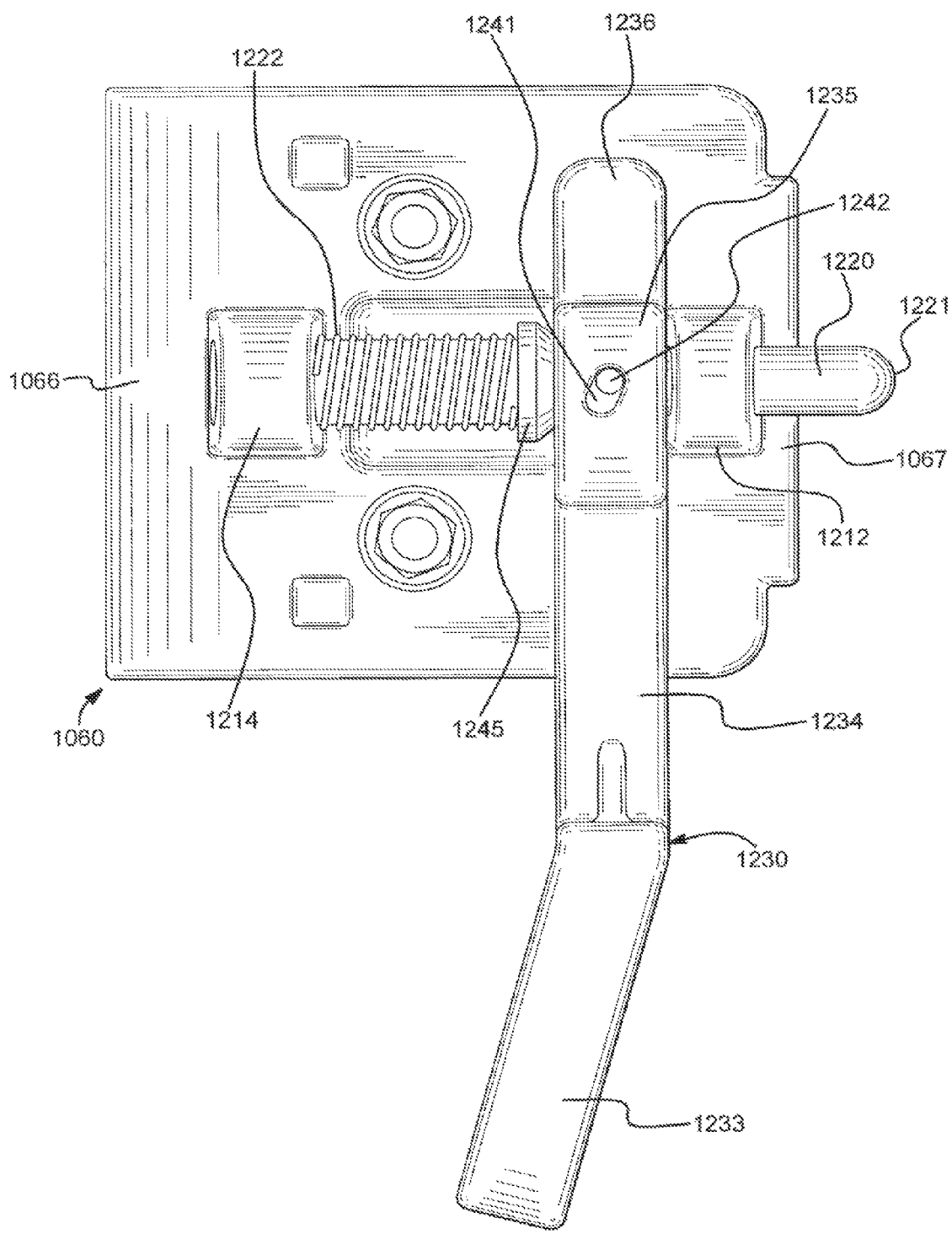

AUTO-RACK RAILROAD CAR VEHICLE WHEEL CHOCK

PRIORITY

This application is a divisional of and claims the benefit of and priority to U.S. Non-Provisional patent application Ser. No. 13/152,541, filed Jun. 3, 2011, which issued on Apr. 16, 2013, as U.S. Pat. No. 8,419,326, which is a continuation of and claims the benefit of and priority to U.S. Non-Provisional patent application Ser. No. 12/048,402, filed Mar. 14, 2008, which issued on Jul. 12, 2011, as U.S. Pat. No. 7,976,255, which is a non-provisional of and claims the benefit of and priority to U.S. Provisional Patent Application Ser. No. 60/939,277, filed May 21, 2007 and U.S. Provisional Patent Application Ser. No. 60/896,625, filed Mar. 23, 2007, the entire contents of which are incorporated herein by reference.

BACKGROUND

The railroad industry employs a variety of auto-rack railroad cars for transporting newly-manufactured vehicles such as automobiles, vans and trucks. Auto-rack railroad cars, known in the railroad industry as auto-rack cars, often travel thousands of miles through varying terrain. One typical type of auto-rack car is compartmented, having two or three floors or decks, two sidewalls, a pair of doors at each end, and a roof. Newly manufactured vehicles are loaded into and unloaded from an auto-rack car for transport by a person (sometimes called a "loader") who drives the vehicles into or out of the auto-rack car.

One problem with auto-rack cars is the potential for damage to newly manufactured vehicles which can occur in the auto-rack car due to the unwanted movement of one or more of the transported vehicles not adequately secured in the auto-rack car. Various restraint or anchoring systems have been developed for securing the vehicles transported in auto-rack cars to prevent movement or shifting of those vehicles during transportation. The loader typically operates these vehicle restraint or anchoring systems. One known type of system employs a "tie down" restraint using chains connected to steel runners in the support surface of the auto-rack car. A ratchet tool is usually required to secure these chains taut. Certain types of these known systems utilize winch mechanisms and harnesses which must be fitted over the vehicle tires to restrain movement of the vehicle.

To solve the disadvantages of such mechanisms, a vehicle restraint system for restraining vehicles transported on auto-rack cars was developed. This vehicle restraint system is disclosed in detail in U.S. Pat. Nos. 5,312,213 and 5,302,063. This vehicle restraint system includes a plurality of restraints each detachably secured to a grating provided on a support surface of the auto-rack car. This system utilizes four restraints, one associated with each of the four wheels of a vehicle being transported.

As illustrated in FIGS. 2 and 3, the restraint 32 of this known system includes an angled face-plate 34 for alignment with, and restraining movement of, a tire 40 of an associated wheel 42 of the vehicle 44 positioned on the grating 38. The angled face-plate 34 is vertically adjustable to a lower position (shown in FIGS. 2 and 3), an intermediate position (not shown), and an upper position (shown in phantom in FIG. 2) to provide for different tire sizes. The angled face-plate 34 is attached to a load-transmitting member 36 which is adapted to transfer the load applied to the face-plate 34 to the grating 38. The restraint 32 includes a moveable paddle-shaped restraining member 39 which contacts the inside surface of the tire to prevent lateral shifting of the tire and thus of the vehicle. The paddle shaped restraining member 39 is connected to the face-plate 34 such that when the face-plate is vertically adjusted, the paddle shaped restraining member is vertically adjusted. For several years, this vehicle restraint system has been widely employed in auto-rack cars to secure vehicles.

Various problems have developed with this vehicle restraint system in relation to new types or designs of vehicles such as "cross-over" vehicles and other vehicles with different body and particularly different fender, molding or trim profiles. For example, cross-over vehicles generally include a truck or SUV-type body mounted on an automobile-type frame. These cross-over vehicles have a higher center of gravity, a much lower curb weight than conventional automobiles and SUV's, and include relatively low fenders, moldings, trim and bumpers (compared to certain trucks, vans and SUVs). Other new vehicles also have low fenders, moldings, trim and bumpers. When such vehicles are loaded in an auto-rack railroad car on the grating of the vehicle restraint system described above, it has been found that these known vehicle restraints are not adequately holding the vehicles in place or adequately preventing the movement of the vehicles to a minimum desired level of movement. This lack of restraint occurs, at least in part, because the adjustable member or face-plate 34 of such above described restraints cannot be mounted or positioned with the face-plate in the intermediate or upper positions because it will or may interfere with or contact the low bumper, fender, trim or molding of the vehicle as illustrated in phantom in FIG. 2. Vehicle manufacturers want to avoid such contact or potential contact during the transportation of the vehicles to avoid damage to the vehicles.

More specifically, it should be appreciated that vehicle manufacturers provide extremely particular instructions which warn against any contact or engagement between anything in the auto-rack railroad cars and the new vehicles because the vehicle manufacturers desire to deliver the newly manufactured vehicles to dealers and their customers in "perfect" condition. Any damage, such as scratches or dents to the fenders, bumpers, moldings, trim or other parts of the vehicle, could prevent or inhibit a customer from purchasing or taking delivery of the vehicle, and generally need to be fixed prior to sale of the vehicle. Accordingly, vehicle manufacturers prefer that the adjustable face-plate 34 of the restraint of the above system not contact and not come close to being in contact with the fenders, bumpers, trim or moldings of the newly manufactured vehicles being transported. The adjustable face-plate 34 of the above described restraint must accordingly be placed in the lowest or, at best, the intermediate position when securing many presently manufactured vehicles in the auto-rack cars. This causes the face-plate to engage the tire at a lower point on the tire, and accordingly, the vehicle is more likely to be able to jump over or hop the restraint (as illustrated in FIG. 3) if the vehicle is subjected to sufficient forces.

Even when the face-plate is in the highest position, other problems with holding the tire in place often occur, especially where the vehicles do not have locking steering columns. The cause for these problems is that the paddle-shaped restraining member 39 contacts the side of the tire 40 at too high of a position which allows the tire to turn and to be disengaged from the face-plate of the restraint 32 as generally illustrated in FIG. 3A. In certain instances, the vehicle literally "walks out" of this restraint 32 as illustrated in FIG. 3A. This illustration is generally of a photograph taken inside an auto-rack railroad car employing the above described vehicle restraint system.

It should be appreciated that each tire of vehicle has a safe zone of operation (in front and in back of the tire) for a vehicle restraint system. Each safe zone is a somewhat triangular area in front of or in back of the tire. Each safe zone defines the space in which a vehicle restraint system can operate without the potential for contacting the fenders, trim, moldings or bumpers of the vehicle. For example, safe zones 41a and 41b for a tire 40 of an automobile are generally illustrated in FIG. 3B. The above described vehicle restraint system functions outside of those safe zones for many vehicles, as generally illustrated in FIG. 2A which shows (in phantom) that when the angled face-plate 34 is in the preferred uppermost position, it is outside the safe zone 41a. Therefore, as mentioned above, the angled face-plate of the restraint 32 often needs to be placed in the lowest or intermediate position to stay within the respective safe zone and prevent damage or potential damage to the fender, trim, molding and bumper of the vehicle.

Another problem with this restraint is that for certain vehicles, the manufacturers can not install the air dams on the vehicles at the factory because the restraint would or could damage the air dams. Thus, for such vehicles, the manufacturer must ship the air dams to the dealerships for installation.

A related problem which can also cause a vehicle to be more likely to jump over or hop this restraint is that the restraint is sometimes not placed as close to the tire as potentially possible as illustrated in FIG. 2. One reason for this is that the loaders are in a hurry when they load the vehicles into the auto-rack railroad cars. When the loaders are in a hurry, they tend to place the restraint in a position close to the tire without substantially maneuvering the restraint to the closest possible position to the tire. This positioning can sometimes leave a substantial gap between the restraint and the tire. This gap coupled with a low face-plate position can allow the vehicle to build up speed causing the vehicle to hop or jump the restraint.

A similar problem arises because the restraint may need to be positioned or spaced at a distance from the tire because the tire is at a position on the grating or relative to the grating that does not allow the restraint to be placed in engagement with the tire. The restraint in certain instances is placed up to a distance of three-quarters of an inch away from the tire due to the position of the grating members or rungs relative to the tire and the three sets of locking members of this restraint. Again, in such situations, a gap is created allowing the vehicle to more easily hop or jump the restraint. This is also illustrated in FIG. 2 where the size of the gap between the tire and the face-plate is approximately half the distance between the rungs of the grating. This gap problem is compounded because certain vehicle manufacturers require that certain vehicles be transported with the transmission in neutral to prevent damage to the vehicle (such as damage to the transmission of the vehicle). In neutral, the transmission does not stop the vehicles from moving.

It should also be appreciated that the vehicles may jump or hop these restraints at a variety of different times such as during movement of the train including sudden stoppage of the auto-rack car or severe deceleration of the auto-rack car. Such instances can include sudden stopping for emergencies alone or in combination with slack action. The amount of force on the vehicles being transported relative to the auto-rack car can cause the vehicles to hop or jump over the restraint, especially if the tire is engaged by the face-plate at a relatively low point, if the restraint is spaced from the tire or if the face-plate is at a low position and spaced from the tire.

More importantly, during switching in a railroad yard, the auto-rack cars are coupled and decoupled with other railroad cars in different freight trains on a regular basis. During the coupling action, severe jolts of up to 8 to 10 miles per hour can be incurred by the auto-rack car even though regulations (and signs in the railroad yards and on the railroad cars) limit the speed to no more than 4 miles per hour. These jolts can cause extreme force on the vehicles relative to the railroad cars and, thus, cause the vehicles to jump or hop these restraints especially if the tire is engaged by the angled face-plate at a relatively low point and/or if the restraint is spaced from the tire. When a vehicle hops or jumps a restraint, the vehicle may engage another vehicle in the auto-rack car or one or more end doors of the auto-rack car. There have been significant recorded instances of this type of damage to vehicles in auto-rack cars in railroad yards in recent years. As indicated above, such damage to the vehicles necessitates the replacement of the damaged part or parts and potentially other parts of the vehicle. This damage is extremely expensive for vehicle manufacturers which charge the railroads for such damage.

This problem is compounded for vehicle manufacturers when the vehicle damaged is a specially ordered vehicle (instead of a stock vehicle) for a specific customer. The customer can wait one, two, three or more months for a specially ordered vehicle. If the specially ordered vehicle is damaged in transit, the customer may need to wait for another specially ordered vehicle to be manufactured. This can harm the dealer's and manufacturer's businesses. The restraints are also often damaged when the vehicles jump the restraint or run into the restraints with sufficient forces. The railroads have to replace these damaged restraints or have these damaged restraints reconstructed. This causes additional expenses to be incurred by the railroads.

It should thus be recognized that while the vehicle restraint system described above, which has been widely commercially implemented, secures many vehicles being transported in auto-rack cars, in many instances this vehicle restraint system does not adequately protect the vehicles or prevent the movement of the vehicles and thus prevent damage to the vehicles or the restraints themselves. The automobile industry and the railroad industry have sought improvements of this vehicle restraint system.

Various improvements have been proposed. For example, U.S. Pat. Nos. 6,926,480, 7,004,696, 7,128,508, and 7,150,592 disclose supplemental restraints which are configured to work with these restraints. In another example, U.S. Pat. No. 6,835,034 discloses a second restraint configured to work in conjunction with the above described restraints. One concern with such additional devices is that the loaders of the vehicles on the auto-rack cars need to position (when loading) and remove (when unloading) both the restraints and these additional devices. This takes additional time and effort during the loading and unloading process. Additionally, these multiple devices add more cost and complications. In another example, U.S. Pat. No. 6,851,523 discloses an alternatively configured restraint. This restraint has not been commercialized.

Accordingly, there is a continuing need for an improved vehicle wheel restraint which is easy to install and remove, is attachable to the grating existing in the auto-rack cars, and which holds the vehicles more securely.

SUMMARY

The present invention solves the above problems by providing a vehicle wheel chock for an auto-rack car which more fully secures a vehicle being transported in an auto-rack car and reduces or eliminates the movement of the vehicles being transported in the auto-rack car. The present disclosure contemplates that for most vehicles, one vehicle wheel chock will be positioned adjacent to each tire of the vehicle being transported (i.e., four chocks in total to secure the vehicle). However, it should be appreciated that for certain vehicles, only two chocks (on opposing tires on opposite sides of the vehicle) may be employed. After a vehicle is loaded in an auto-rack car on the gratings, each chock is positioned directly adjacent to each respective tire of the vehicle and is attached to the grating under the tire. It should be appreciated that the vehicle wheel chock of the present invention can be employed in other transportation vehicles such as tractor trailers and shipping containers.

The vehicle wheel chock or chock of various embodiments of the present invention generally includes a body having a front portion, a central portion and a rear portion, a tire engaging assembly at the front portion of the body for engaging the tire of the vehicle, and a locking assembly including a locking member pivotally connected to the central portion of the body and lockable at the rear portion of the body to secure the chock to the grating. In other embodiments, the vehicle wheel chock or chock generally includes a body having a front portion, a central portion and a rear portion, a tire engaging assembly at the front portion of the body for engaging the tire of the vehicle, and a locking assembly including a locking member pivotally connected to the rear portion of the body and lockable at the central portion of the body to secure the chock to the grating. The chock also includes front grate engagers or teeth connected to and extending downwardly and forwardly from the front portion of the body and rear grate engagers or teeth extending downwardly from the locking member. These grate engagers or teeth are configured to co-act to securely attach the chock to the grating.

The tire engaging assembly has multiple configurations for functioning with different size vehicles and different height, shape and size tires, fenders, moldings, trim and bumpers. More specifically, the tire engaging assembly includes the front portion of the body, an inner tire engager pivotally connected to the body and an outer tire engager pivotally connected to the body. Each tire engager is movable from a down or retracted position to an up or extended position. In a first configuration, the inner tire engager and the outer tire engager are both in down or retracted positions and the rear sides of both the inner tire engager and the outer tire engager are configured for engagement with the treaded surface of the tire. In a second configuration, the inner tire engager is in an up or extended position, the outer tire engager is in a down or retracted position, the front side of the inner tire engager is configured for engagement with the treaded surface of the tire, and the rear side of the outer tire engager is configured for engagement with the treaded surface of the tire. In a third configuration, the inner tire engager and the outer tire engager are both in the up or extended positions and the front sides of both the inner tire engager and the outer tire engager are configured for engagement with the treaded surface of the tire.

The inner and outer tire engagers each have a relatively narrow width or profile and when in the same positions extend in substantially the same plane. Thus, each configuration enables the tire engaging assembly to extend between the tire and the adjacent fender, molding, trim or bumper of a different vehicle and engage a significant portion of the tire while not touching the fender, molding, trim or bumper. This chock enables a loader to position the chock closer to the tire and at a higher position along the tire. The chock is thus configured to be used with small, medium and large and/or heavy vehicle wheels and substantially reduces the problem of the vehicle wheels jumping over the chocks and/or breaking the chocks. This significantly reduces the financial loss due to damaged vehicles and damaged chocks. This substantially reduces the time and cost of reconstructing or replacing broken chocks.

Other objects, features and advantages of the present invention will be apparent from the following detailed disclosure, taken in conjunction with the accompanying sheets of drawings, wherein like reference numerals refer to like parts.

BRIEF DESCRIPTION OF THE FIGURES

FIG. 4 is a top front perspective view of the chock of one embodiment of the present invention, and illustrating the inner tire engager in a retracted position, the outer tire engager in a retracted position, and the locking member in a locked position.

FIG. 5 is a side elevation view of the chock of the embodiment of FIG. 4, and illustrating the inner tire engager in a retracted position, the outer tire engager in a retracted position, and the locking member in a locked position.

FIG. 5A is a side elevation view of the chock of the embodiment of FIG. 4, and illustrating the inner tire engager in a retracted position, the outer tire engager in a retracted position, and the locking member in a locked position on the grating.

FIG. 6 is a bottom view of the chock of the embodiment of FIG. 4, and illustrating the outer tire engager in a retracted position and the locking member in a locked position.

FIG. 7 is a top front perspective view of the chock of the embodiment of FIG. 4, and illustrating the inner tire engager in a retracted position, the outer tire engager in a retracted position, and the locking member in an unlocked position.

FIG. 8 is a side elevation view of the chock of the embodiment of FIG. 4, and illustrating the inner tire engager in a retracted position, the outer tire engager in a retracted position, and the locking member in an unlocked position.

FIG. 10A is a top front perspective view of the chock of the embodiment of FIG. 4, and illustrating the inner tire engager in an extended position, the outer tire engager in a retracted position, and the locking member in a locked position engaging the grating.

FIG. 48 is a top view of the chock of the embodiment of FIG. 47, and illustrating the inner tire engager in an extended position, the outer tire engager in an extended position, the locking member in a locked position, and the handle of the locking assembly in a resting position.

FIG. 52A is an enlarged top rear perspective view of the body of the chock of the embodiment of FIG. 47.

FIG. 53 is an enlarged front perspective view of the inner tire engager of the chock of the embodiment of FIG. 47.

FIG. 54 is an enlarged front perspective view of the outer tire engager of the chock of the embodiment of FIG. 47.

FIG. 55 is an enlarged front perspective view of the locking assembly of the chock of the embodiment of FIG. 47.

FIG. 56 is an enlarged top view of the locking member of the chock of the embodiment of FIG. 47, and illustrating the locking pin in the locked position and the handle in the resting position.

DETAILED DESCRIPTION

Figure 1:
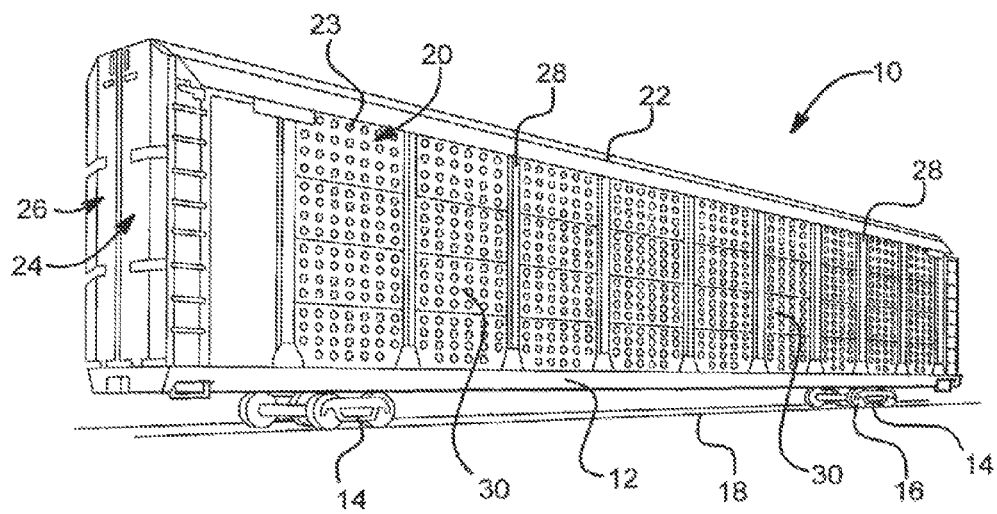
FIG. 1 is a perspective view of an auto-rack railroad car configured to transport a plurality of vehicles.
Figure 2:
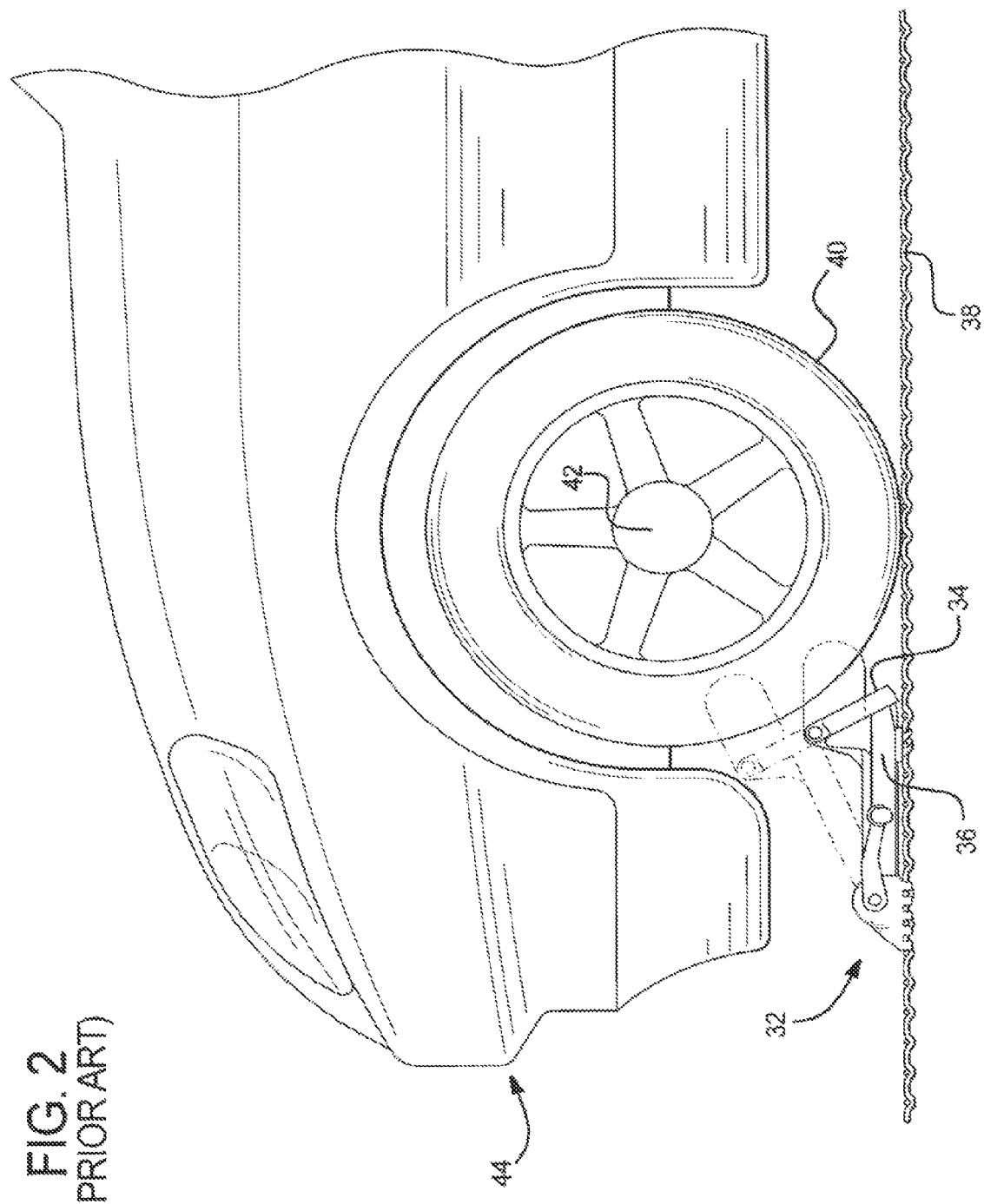
FIG. 2 is a side view of a fragmentary vehicle and a prior art restraint in an auto-rack car illustrating a grating on which the vehicle rests, the restraint releasably attached to the grating, the face-plate of the restraint in its lowest position, and the face-plate of the restraint shown in phantom in the highest position which would interfere with the fender of the vehicle.
Figure 2A:
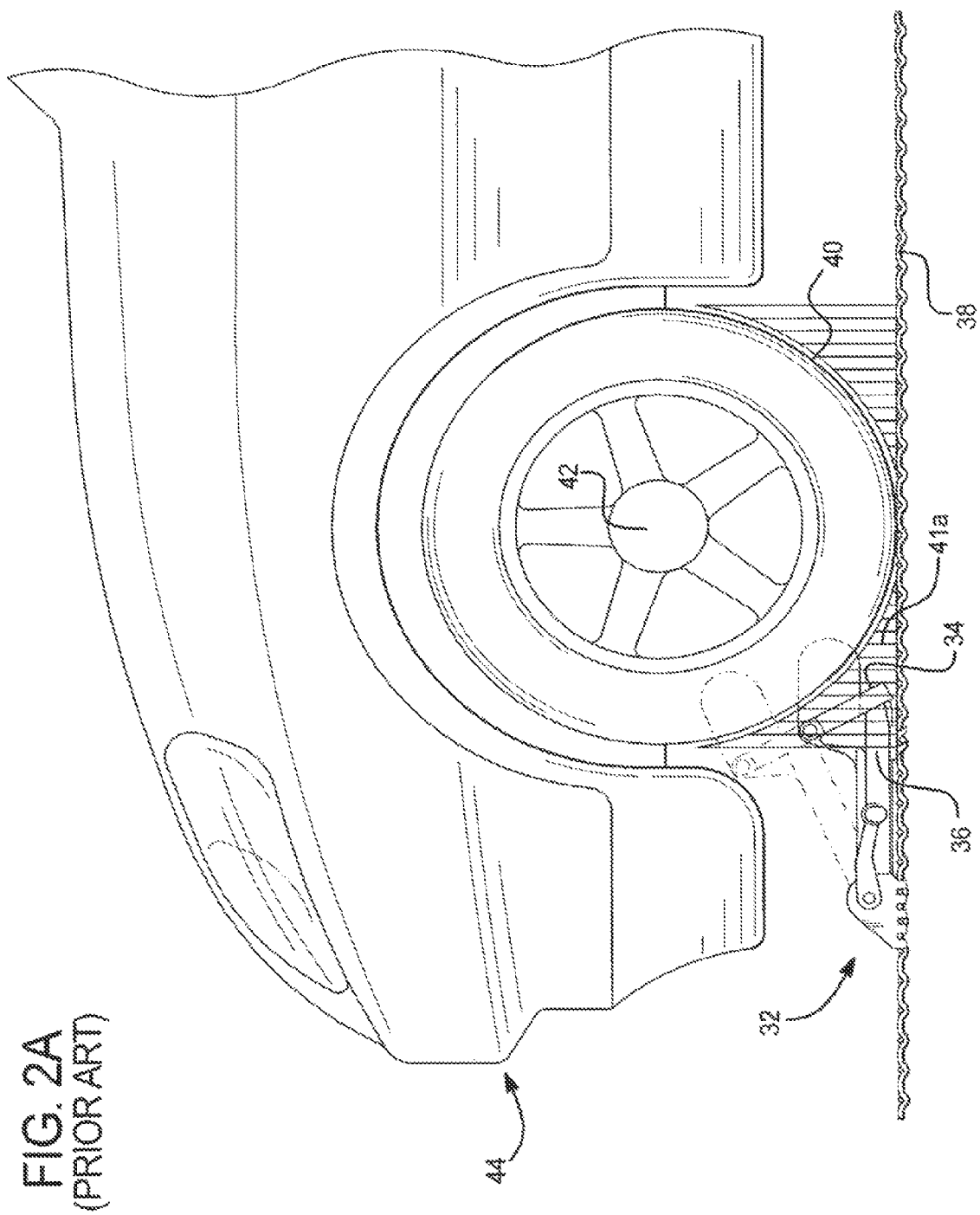
FIG. 2A is a fragmentary side view of a vehicle and a prior art restraint in an auto-rack car illustrating the restraint in its lowest position, and the face-plate of the restraint shown in phantom in the highest position and outside of a safe zone for the vehicle.

Referring now to the drawings and particularly to FIG. 1, a typical auto-rack car 10 includes a frame 12 supported by trucks 14, each of which have several wheels 16 which roll along railroad tracks 18. The frame 12 supports two sidewalls 20 and a roof 22. The auto-rack car 10 includes a pair of co-acting clamshell doors 24 and 26 mounted on each end of the auto-rack car 10. The doors 24 and 26 are opened to facilitate the loading and unloading of vehicles into and out of the auto-rack car 10 and are closed during transport or storage of the vehicles.

The sidewalls 20 include a series of steel vertical posts 28 which are mounted on, and extend upwardly from, the frame 12. The roof 22 is mounted on, and supported by, these vertical posts. The vertical posts are evenly spaced along the entire length of both sidewalls 20 of the auto-rack car 10. A plurality of rectangular galvanized steel side wall panels 30 which extend horizontally and are vertically spaced apart are mounted between each pair of vertical posts 28. These side wall panels are supported at their corners by brackets (not shown) that are suitably secured to the vertical posts. The average side wall panel has a multiplicity of round sidewall panel holes 23. These side wall panel holes 23 provide the auto-rack car with natural light as well as proper ventilation. Proper ventilation prevents harm from the toxic vehicle fumes to the person or persons (i.e., loaders) loading or unloading the vehicles into or out of the auto-rack car.

The auto-rack car may be a tri-level car having first, second and third levels. Normally, eighteen passenger vehicles can be transported in a tri-level auto-rack car, six on each level. The auto-rack car can also have two levels for vehicles instead of three. The bi-level auto-rack car has a lower level and an upper level. The bi-level auto-rack car is generally used to transport larger vehicles, such as vans, mini-vans, pickup trucks, four-by-four and cross-over vehicles. The bi-level auto-rack car can usually transport twelve of these vehicles, six on each level. The auto-rack car may also be a single-level car.

FIGS. 4 to 18 illustrate a first embodiment of the vehicle wheel chock of the present invention which is generally indicated by numeral 50. Each of the embodiments of the vehicle wheel chocks disclosed herein are generally referred to herein as the chock. The chock 50 is configured to be attachable to a grating or wire grid such as wire grid 46 (see FIGS. 4A, 5A, 10A, 13, 14, 15, and 16) which has parallel spaced-apart steel wires 47 crossing and welded to parallel spaced-apart steel wires 48. This grating or wire grid is described in more detail in U.S. Pat. Nos. 5,312,213 and 5,302,063. The chock 50 is configured to be positioned adjacent to a tire of a wheel of a vehicle (not shown). The chock 50 may be attached at any suitable location on the grating or wire grid, depending on the location of the vehicle wheel.

The illustrated embodiment of the chock 50 includes: (a) a body 52 having a front portion 54, a central portion 56, and a rear portion 58; (b) a plurality of grate engagers or teeth 60 extending downwardly and forwardly from the front portion 54 for engaging the grating or wire grid 46; (c) a tire engaging assembly at the front portion 54 for securely engaging the tire of the vehicle; (d) a locking assembly 64 having a locking member 66 pivotally connected to the central portion 56 of the body 52 and lockable at the rear portion 58 of the body 52 for securely attaching the chock 50 to the grating or wire grid 46; and (e) a plurality of grate engagers or teeth 68 extending downwardly from the locking member 66 for engaging the grating or wire grid 46 when the locking member 66 is in the locked position. Generally, the tire engaging assembly at the front portion 54 of the body 52 includes pivotable interacting and interlocking inner and outer tire engagers 70 and 76, respectively, configurable in multiple different positions to respectively engage different size tires (not shown) of multiple different vehicles (not shown) without engaging the different fenders, moldings, trim or bumpers (not shown) of those vehicles as discussed in further detail below. In this illustrated embodiment, the locking member 66 of the locking assembly 64 is pivotally connected to the central portion 56 of the body 52 and is moveable between: (a) an unlocked or released position (shown in FIGS. 7, 8, 9, 10, 11, and 12) which facilitates attachment and detachment of the chock 50 from the grating or wire grid 46; and (b) a locked position (shown in FIGS. 4 to 6, 10A and 13 to 16) wherein the chock 50 is secured to the grating or wire grid 46. When the locking member 66 is in the locked position, the plurality of grate engagers or teeth 60 extending downwardly and forwardly from the front portion 54 of the body 52 prevent the upward and forward movement of the chock 50 relative to the grating or wire grid 46, and the plurality of grate engagers or teeth 68 extending downwardly from the locking member 66 prevent the rearward movement of the chock 50 relative to the grating or wire grid 46.

More specifically, in the illustrated embodiment, the front portion 54, the central portion 56, and rear portion 58 of the body 52 are integrally formed. In one embodiment, the body 52 is molded of a liquid thermoset plastics material primarily composed of a plural component liquid monomer mixture which can be molded by a reaction injection molding (RIM) process. An example of such a product is produced by Metton America Corporation and sold under the trademark METTON. The body can alternatively be made from other suitable materials such as nylon, a glass filled nylon, a Dicyclopentadiene, an Acrylonitrile-butadine-styrene, or a polycarbonate. It should further be appreciated that the body could be made from any one or more suitable materials, including other metals, plastics, ceramics and composite materials or combinations thereof. It should also be appreciated that the body illustrated in FIGS. 4 to 16, is in one configuration, but that the body may be alternatively configured in accordance with the present invention.

In the illustrated embodiment, part of the front portion 54 of the body 52 functions as part of the tire engaging assembly and is configured to mate with and co-act with the inner and outer tire engagers 70 and 76 as described below. In various embodiments, the front side of inner tire engager 70 and the front side of the outer tire engager 76 are each configured to mate with and co-act with the top and forward side of the front portion 54 of the body 52 when the inner and outer tire engagers 70 and 76 are in the retracted positions such that the back side of inner tire engager 70 and the back side of outer tire engager are positioned to engage the tire as best illustrated in FIGS. 4, 4A, 5, 5A, 7, 8, and 9. The top side of the front portion 54 of the body 52 and the front side of inner tire engager 70 are also configured co-act when the inner tire engager 70 is in the extended position such that the front side of inner tire engager 70, the top side of the body 52, and the back side of outer tire engager are positioned to engage the tire as illustrated in FIGS. 10, 10A, 11 and 12. The top side of the front portion 54 of the body 52, the front side of inner tire engager 70, and the front side of the outer tire engager 76 are also configured co-act when the inner tire engager 70 and the outer tire engager 76 are both in the extended position such that the front side of inner tire engager 70, the front side of the outer tire engager 76, and the top side of the body 52 are positioned to engage the tire as illustrated in FIGS. 13, 14, 15, 16, and 17.

Figure 10:
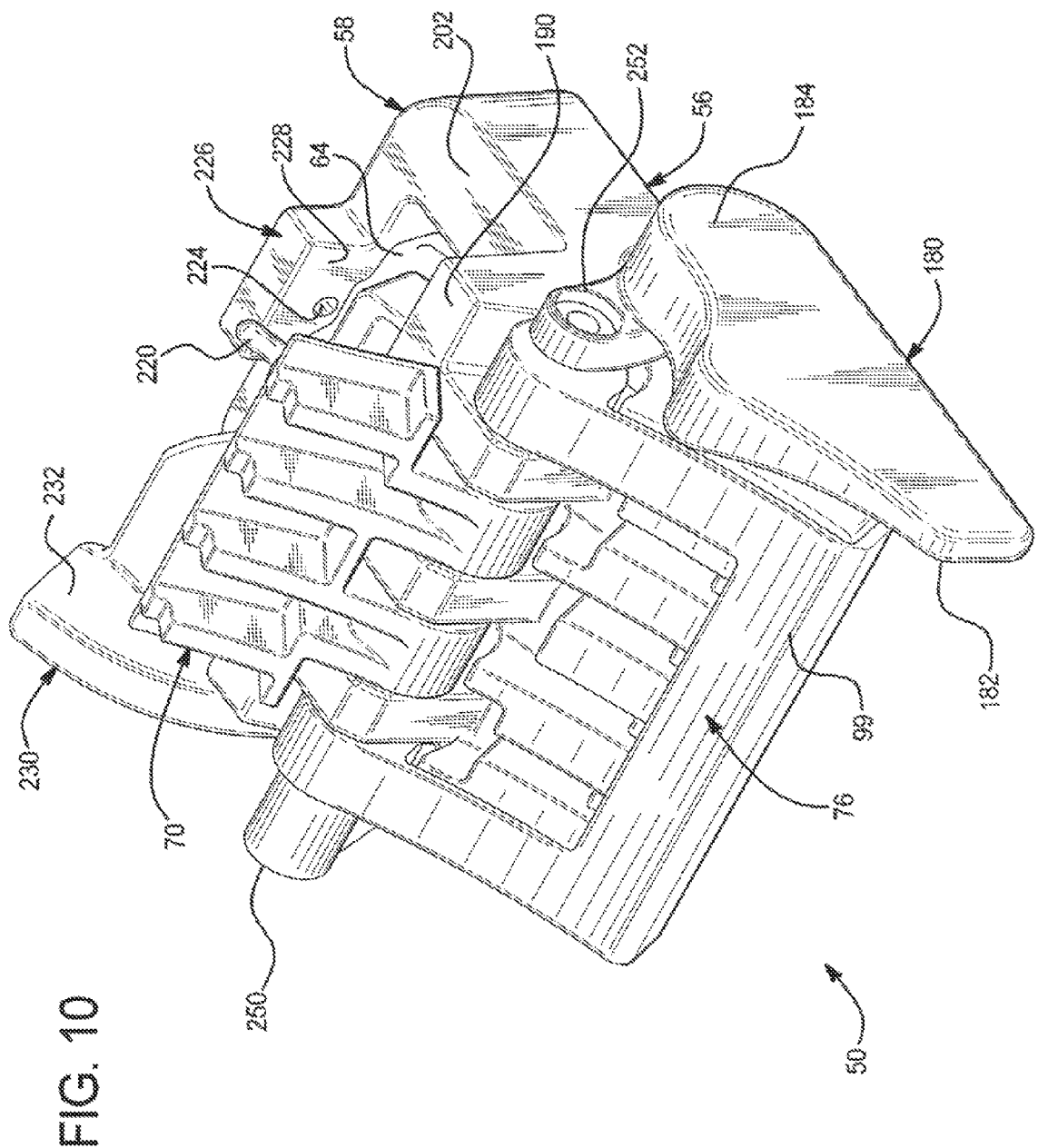
FIG. 10 is a top front perspective view of the chock of the embodiment of FIG. 4, and illustrating the inner tire engager in an extended position, the outer tire engager in a retracted position, and the locking member in an unlocked position.
Figure 12:
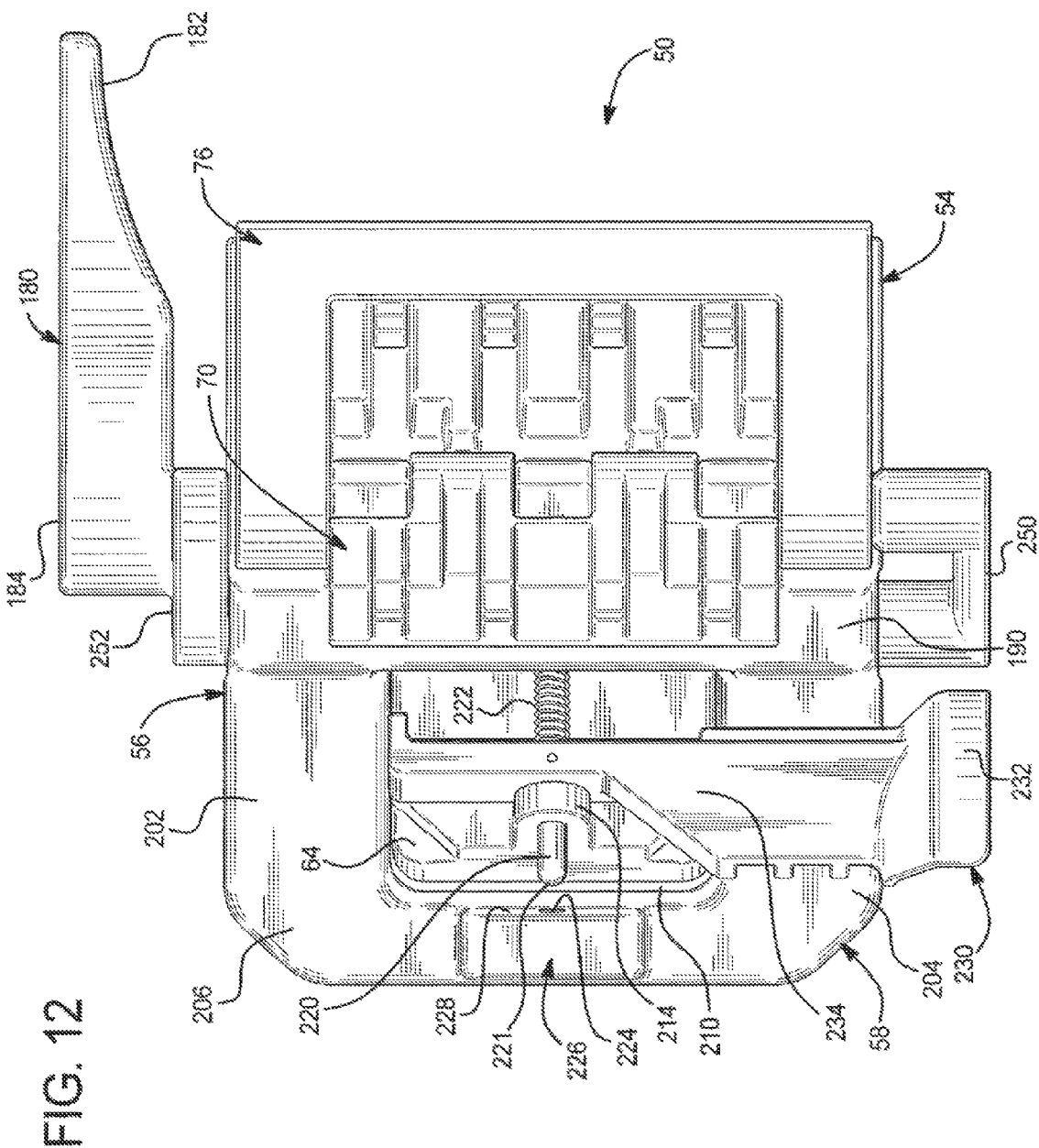
FIG. 12 is a top view of the chock of the embodiment of FIG. 4, and illustrating the inner tire engager in an extended position, the outer tire engager in a retracted position and the locking member in an unlocked position.

In the illustrated embodiment, the inner tire engager 70 includes a body 80 and two spaced apart arms 82 and 84 connected to and extending from the body 80 (see FIGS. 4, 4A, 7, and 9). The arms 82 and 84 have hands or pivot ends 86 and 88. The outer tire engager 76 includes a body 90 and two spaced apart arms 92 and 94 connected to and extending from the body 90 (see FIGS. 4, 4A, 7, and 9). The arms 92 and 94 have hands or pivot ends 96 and 98. The arms 92 and 94 and the body 90 of the outer tire engager 76 define a central open area sized and shaped to receive the inner tire engager 70 as best seen in FIGS. 10, 10A, and 12. In other words, when the inner tire engager 70 and the other tire engager 76 are both in either the retracted position or the extended position, they co-act to form a wall for engaging the tire. In one embodiment, the inner and outer tire engagers are both molded from a liquid thermoset plastics material primarily composed of a plural component liquid monomer mixture which can be molded by a reaction injection molding (RIM) process. An example of such a product is produced by Metton America Corporation and sold under the trademark METTON. The tire engagers can alternatively be made from a nylon, a glass filled nylon, a Dicyclopentadiene, an Acrylonitrile-butadine-styrene, or a polycarbonate. It should further be appreciated that the tire engagers could be made from any one or more suitable materials, including other metals, plastics, ceramics and composite materials or combinations thereof. It should also be appreciated that the shape and size of the inner and outer tire engagers may vary in accordance with the present invention.

The tire engagers 70 and 76 co-act with the front portion 54 of the body 52 to form the tire engaging assembly. More specifically, as best seen in FIGS. 4, 4A, 7, 9, 10A, and 13, the front portion 54 of the body 52 includes: (a) upwardly extending tire engager supports 102, 104, and 106 which are configured to pivotally support the inner and outer tire engagers 70 and 76; (b) semi-cylindrical pivot areas 101 and 107 (see FIG. 4A) extending respectively inwardly from the outer sides of the body 52 to the tire engager support 102 and 106 and configured to receive pivot ends 96 and 98 (see FIG. 4A) of the outer tire engager 70; (c) semi-cylindrical pivot areas 103 and 105 (see FIG. 4A) extending respectively between tire engager supports 102, 104, and 106 and configured to receive the pivot ends 86 and 88 (see FIGS. 4A and 13) of the inner tire engager 70; (d) laterally spaced apart upwardly extending reinforcing ribs or supports 112, 114, 116, 118, 120, 122, and 124 (see FIG. 13) which are configured to support the inner and outer tire engagers 70 and 76 when they are in the retracted positions; and (e) laterally spaced-apart tire engager receipt areas or recesses 113, 115, 117, 119, 121, and 123 (see FIG. 13) configured to receive the inner and outer tire engagers 70 and 76 when they are in the retracted positions.

Figure 13:
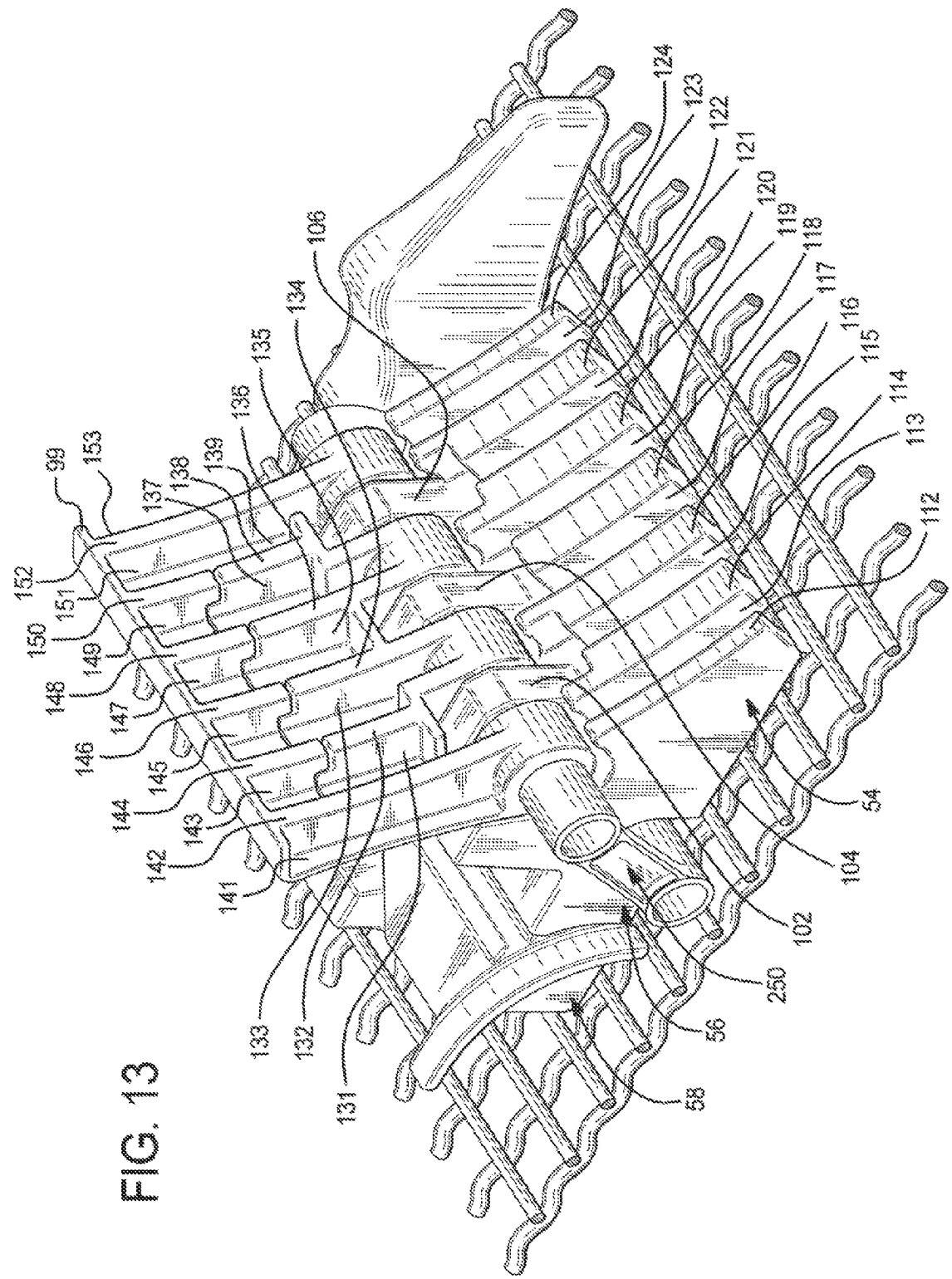
FIG. 13 is a front perspective of the chock of the embodiment of FIG. 4, and illustrating the inner tire engager in an extended position, the outer tire engager in an extended position, and the locking member in a locked position engaging the grating.
Figure 14:
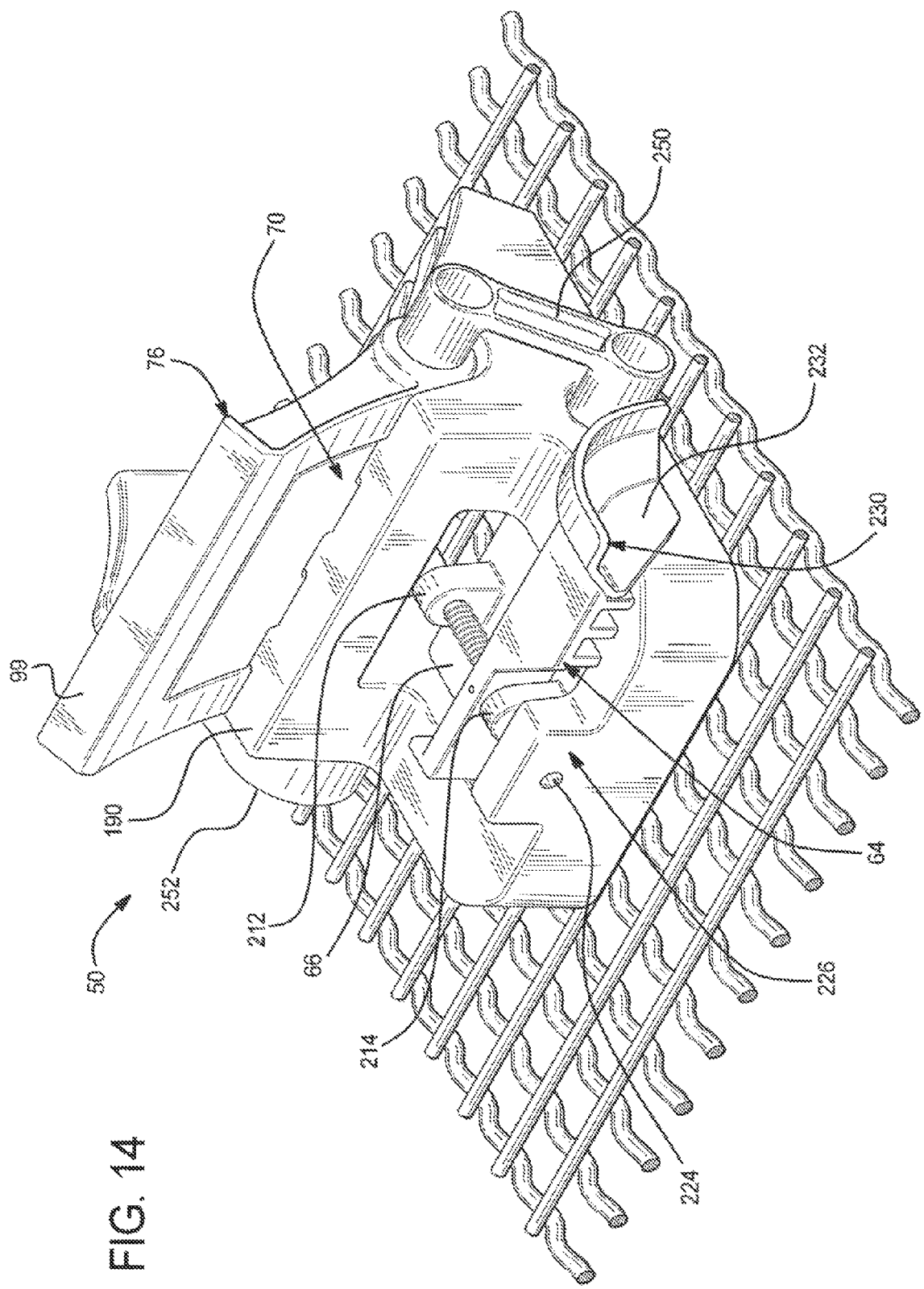
FIG. 14 is top rear perspective view of the chock of the embodiment of FIG. 4, and illustrating the inner tire engager in an extended position, the outer tire engager in an extended position, and the locking member in a locked position engaging the grating.
Figure 15:
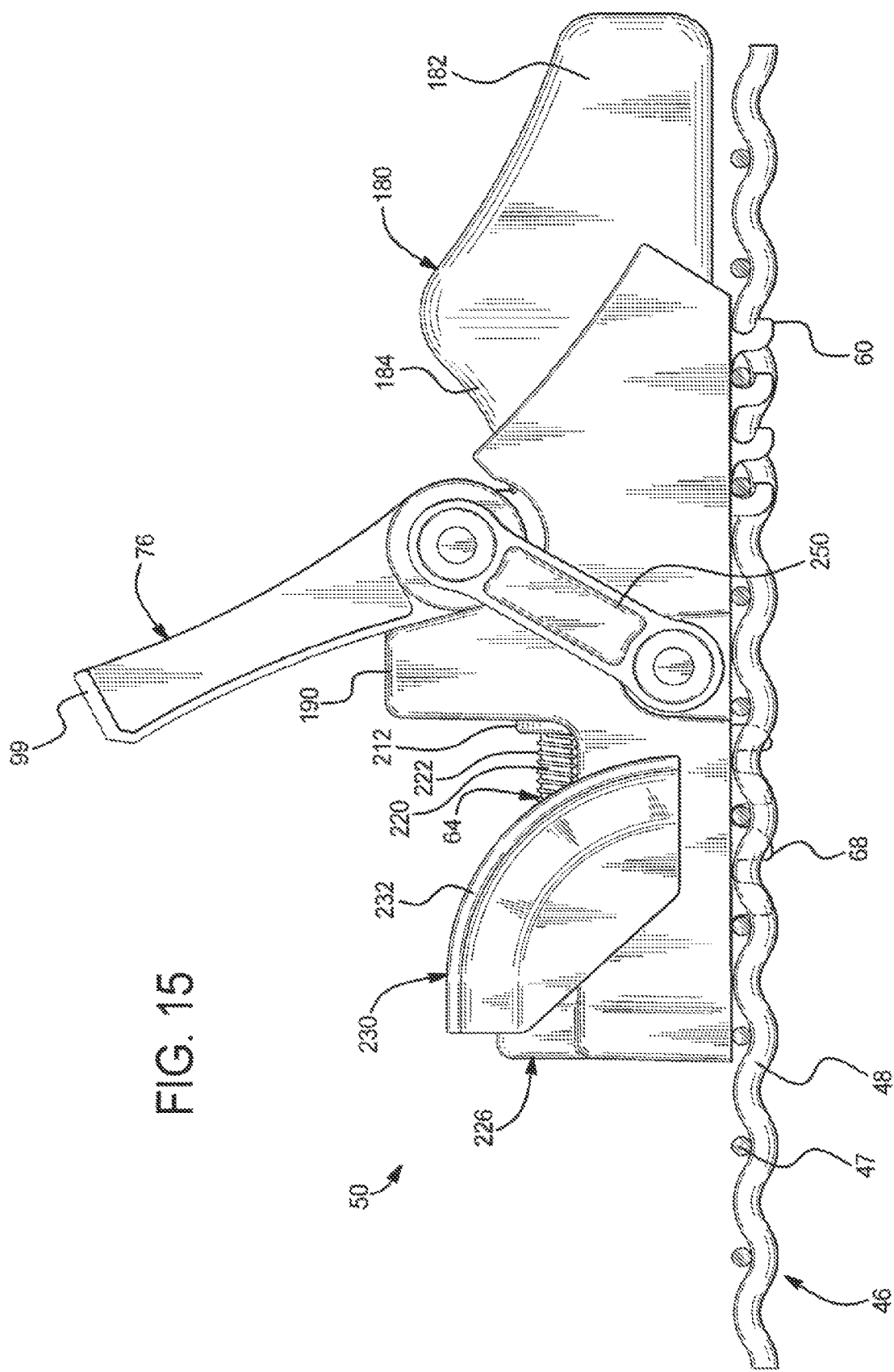
FIG. 15 is a side view of the chock of the embodiment of FIG. 4, and illustrating the inner tire engager in an extended position, the outer tire engager in an extended position, and the locking member in a locked position engaging the grating.
Figure 16:
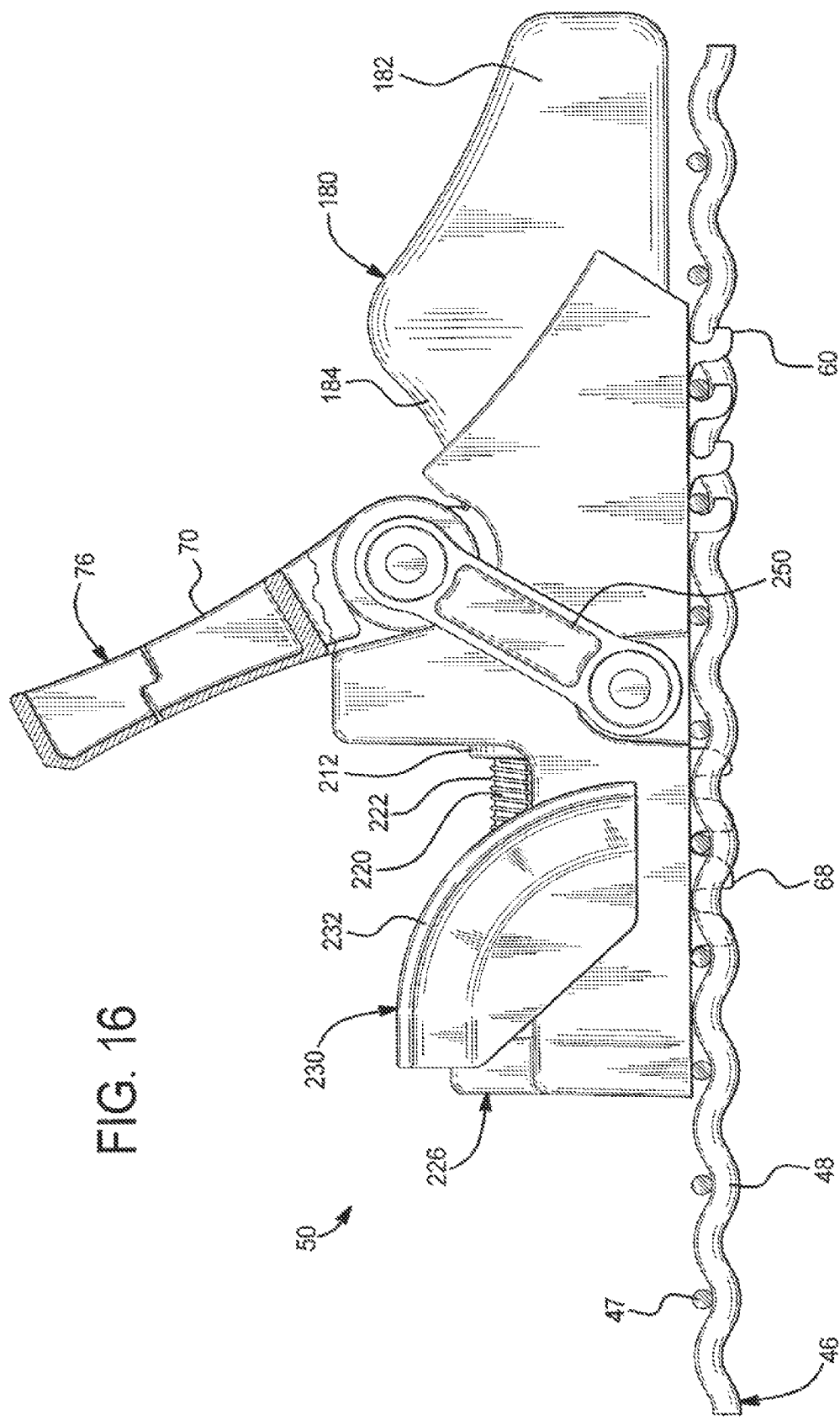
FIG. 16 is a side view of the chock of the embodiment of FIG. 4, and illustrating the inner tire engager in an extended position, the outer tire engager in an extended position, the inter-connection between the inner and outer tire engagers, and the locking member in locked position engaging the grating.
Figure 17:
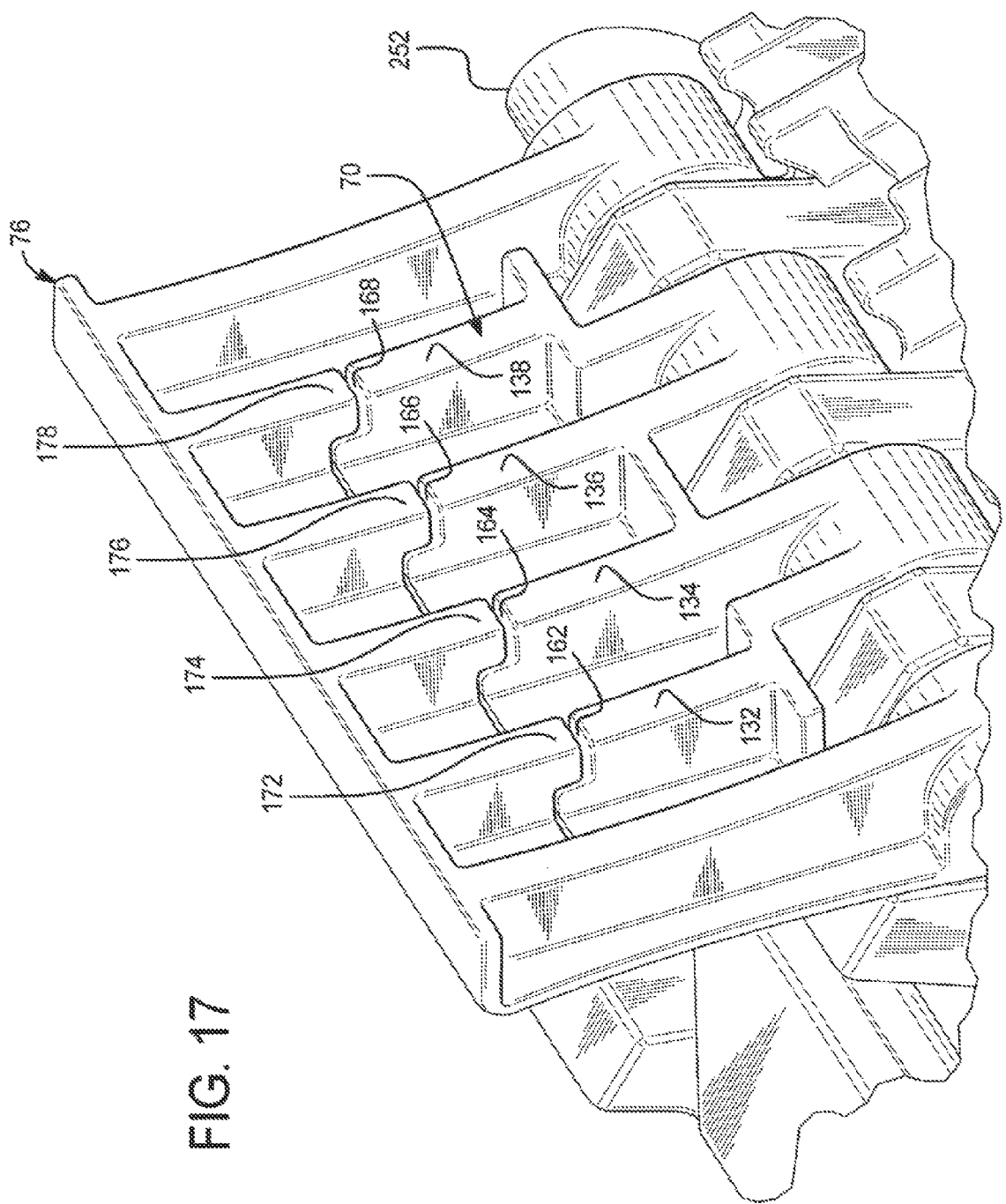
FIG. 17 is an enlarged fragmentary perspective view of the chock of the embodiment of FIG. 4, and illustrating the inter-connection between the inner and outer tire engagers.
Figure 18:
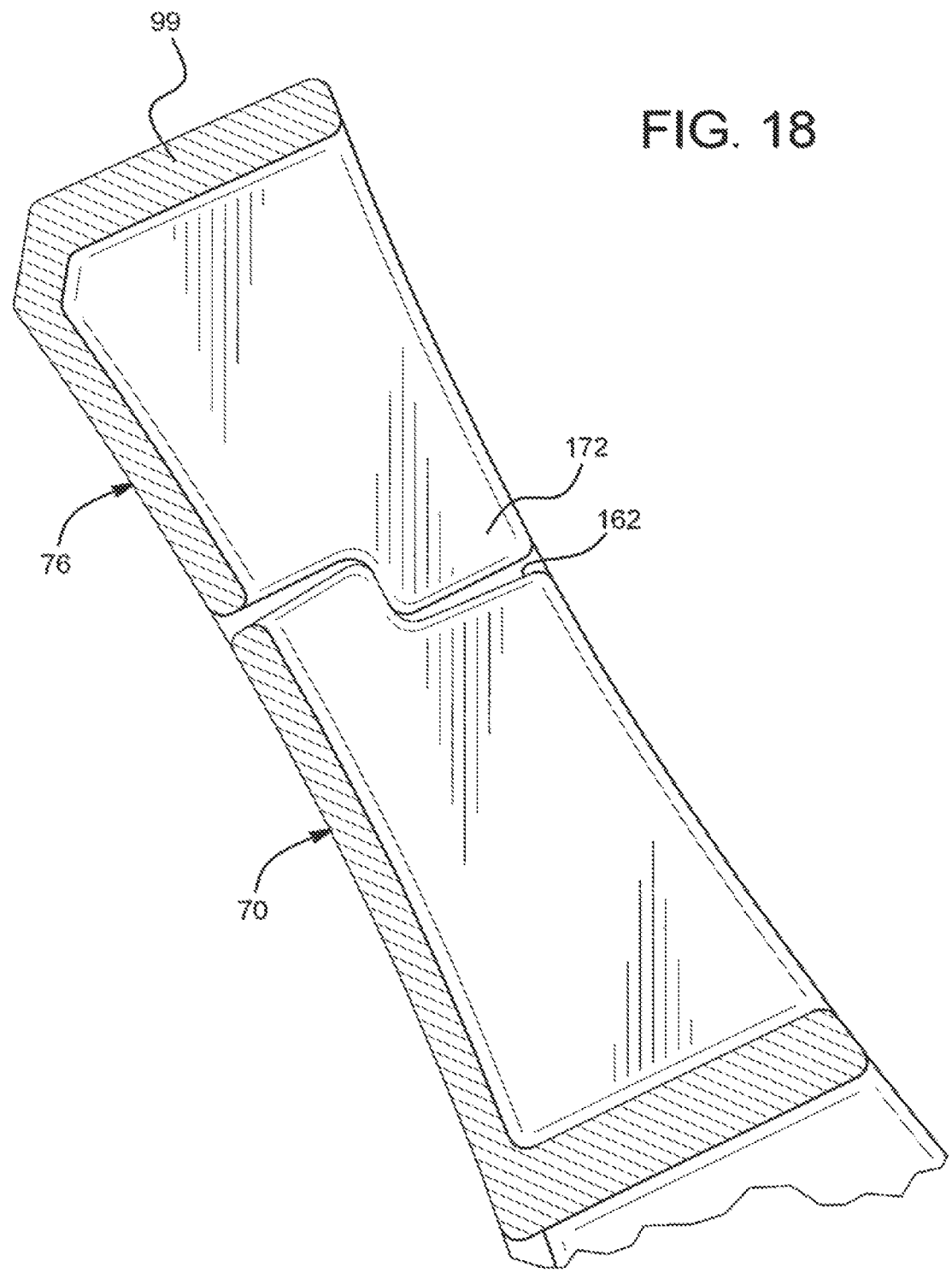
FIG. 18 is a further enlarged fragmentary perspective view of the inner and outer tire engagers of the chock of the embodiment of FIG. 4, and illustrating the inter-connection between the inner and outer tire engagers.
Figure 19:
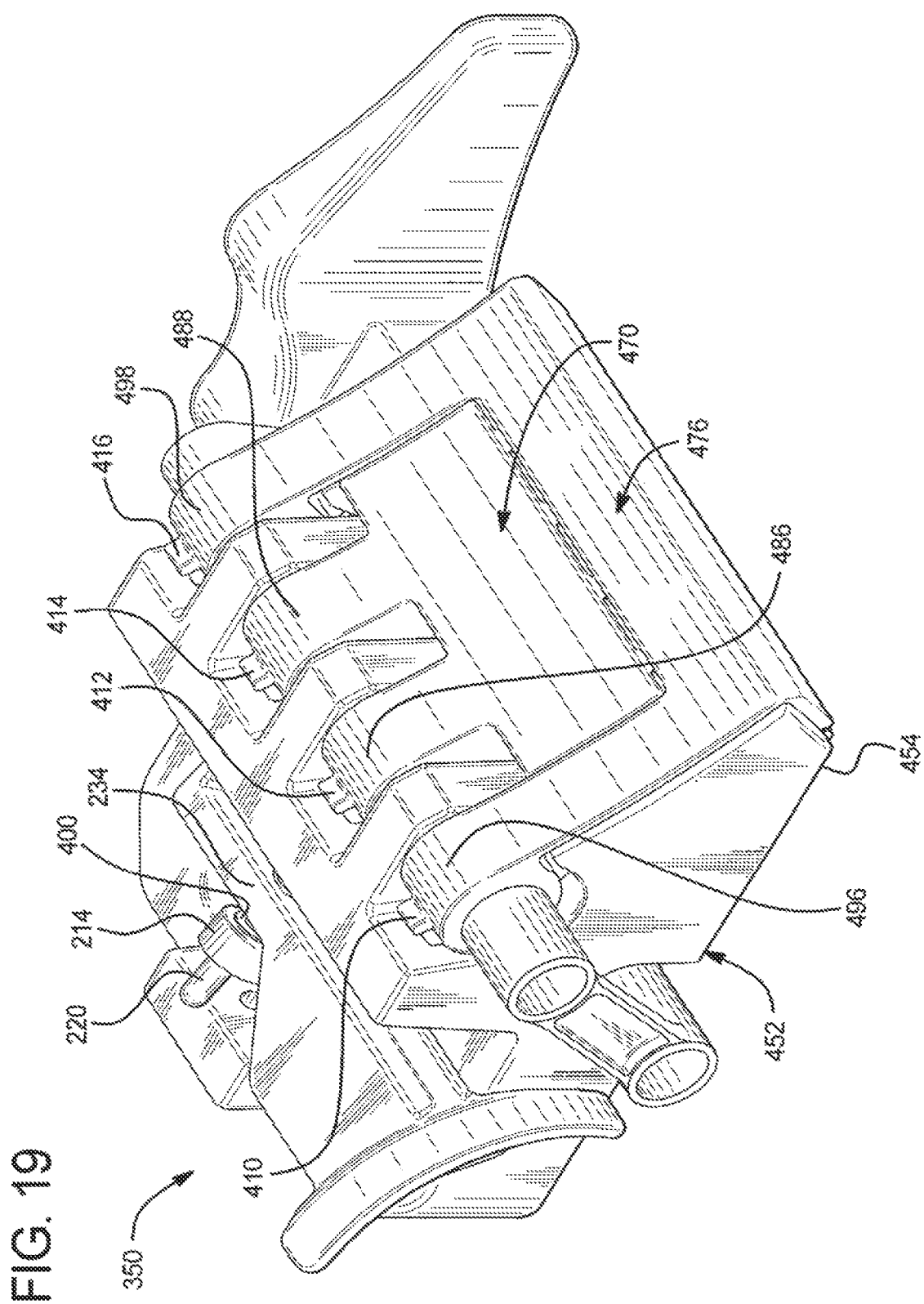
FIG. 19 is a top front perspective view of the chock of another embodiment of the present invention, and illustrating the inner tire engager in a retracted position, the outer tire engager in a retracted position, and the locking member in an unlocked position.

As also seen in FIG. 13, the front side of the inner tire engager 70 includes laterally spaced apart outwardly extending reinforcing ribs or supports 132, 134, 136, and 138 configured to be received in the spaced-apart tire engager receipt areas or recesses 115, 117, 119, and 121 when the inner tire engager 70 is in the retracted position as shown in FIGS. 4, 4A, 5, 5A, 6, 7, 8, and 9. The inner tire engager 70 also includes laterally spaced-apart body receipt areas or recesses 131, 133, 135, 137, and 139 configured to the receive laterally spaced-apart upwardly extending reinforcing ribs or supports 114, 116, 118, 120, and 122 of the body 52 when the inner tire engager 70 is in the retracted position.

As further seen in FIG. 13, the front side of the outer tire engager 76 includes laterally spaced-apart downwardly extending reinforcing ribs or supports 142, 144, 146, 148, 150, and 152 configured to be received in the spaced-apart tire engager receipt areas or recesses 113, 115, 117, 119, 121, and 123 when the outer tire engager 76 is in the retracted position. The outer tire engager 76 includes laterally spaced-apart body receipt areas or recesses 141, 143, 145, 147, 149, 151, and 153 configured to receive laterally spaced-apart upwardly extending reinforcing ribs or supports 112, 114, 116, 118, 120, 122, and 124 of the body 52 when the outer tire engager 76 is in the retracted position.

In the illustrated embodiment, the outer tire engager 76 also includes a lip 99 for providing additional structural support of the outer tire engager 76. When the outer tire engager 76 is in the retracted position, the lip 99 extends downwardly and toward the body 52. When the outer tire engager 76 is in the extended position, the lip 99 extends outwardly toward the tire.

The inner tire engager 70 and the outer tire engager 76 are each pivotally attached to the body 52 by a suitable first pivot member such as a first bolt and nut assembly (not shown in relation to the embodiment). Specifically, the pivot member extends through pivot ends 96 and 98 of the outer tire engager 76, pivot ends 86 and 88 of the inner tire engager, tire engager supports 102, 104, and 106 of the body 52 to enable the inner and outer tire engagers 70 and 76 to independently pivot relative to the body 52, and pivot connection bars or brackets 250 and 252. In the illustrated embodiment, pivot connection bars or brackets 250 and 252 are employed to provide additional structural integrity. Pivot connection bar or bracket 250 also functions as a handle to enable a loader to easily carry and manipulate the chock 50. These pivot connection bars or brackets 250 and 252 are also configured to facilitate the replacement of the inner and outer tire engagers 70 and 76 in the event such tire engagers break. It should be appreciated that such inner and outer tire engagers are configured in certain embodiments to break upon a designed amount of pressure placed on such tire engagers by a tire as further explained below.

In various embodiments, the inner and outer tire engagers 70 and 76 are coupled, interconnected or interlocking. In one such embodiment which is generally illustrated in FIGS. 10, 11, 12, and 13, and best illustrated in FIGS. 16, 17, and 18, the reinforcing ribs or supports 132, 134, 136, and 138 of the inner tire engager 70 respectively include indentations, slots or steps 162, 164, 166, and 168 configured to respectively receive connecting protrusions, pins or steps 172, 174, 176, and 178 extending from the reinforcing ribs or supports 144, 146, 148, and 150 of the outer tire engager 76. This configuration enables the inner and outer tire engagers 70 and 76 to co-act such that when the inner and outer tire engagers 70 and 76 are in the retracted position and the outer tire engager 76 is moved from the retracted position to the extended position, the outer tire engager 76 causes the inner tire engager 70 to also move from the retracted position to the extended position. This enables a loader to easily move both the inner and outer tire engagers 70 and 76 to their respective extended positions. If the loader desires to just move the inner tire engager 70 to its extended position (and to have the outer tire engager 76 in the retracted position), after this rotation of both tire engagers, the outer tire engager 76 can be disengaged or decoupled from the inner tire engager 70 and rotated back to its retracted position, leaving the inner tire engager 70 in its extended position as illustrated in FIGS. 10, 10A, 11, and 12. This construction also facilitates a continuous surface for engagement with the tire when the tire engagers are in either the extended or retracted positions. It should be appreciated that the size and shape of the steps 162, 164, 166, and 168 and the steps 172, 174, 176, and 178 can be varied in accordance with the present disclosure. It should also be appreciated that this configuration provides part of the interacting or interlocking function of the inner and outer tire engagers. These steps and the interaction between these steps are further illustrated in FIGS. 17 and 18.

It should thus be appreciated that various embodiments of the tire engaging assembly has three configurations. Each configuration of the tire-engaging assembly is formed in a suitable manner for engagement with the treaded surface of the vehicle tire which keeps the profile close to the tire and away from the fenders, body panels and trim of the vehicle.

In one alternative embodiment which is not illustrated, one or more of the front and back sides of the inner tire engager, the front and back sides of the outer tire engager, and the top side of the front portion of the body include one or both of longitudinally extending ridges and notches (not shown). These longitudinally extending ridges and notches provide for better engagement with or gripping the tire. In one embodiment, corresponding longitudinally extending ridges and notches are configured in the front sides of the tire engagers and the front portion of the body such that the ridges and notches mate when the tire engagers are in the retracted positions.

In one embodiment, the chock 50 includes a paddle 180 attached to the central portion 56 of the body 52 to prevent lateral movement of the tire. In the illustrated embodiment, the paddle 180 is attached to the body 52 by the first pivot member such as a bolt and nut assembly (not shown in FIGS. 4 to 45) and by a second pivot member such as a bolt and nut assembly (not shown in FIGS. 4 to 45), but shown in relation to the embodiments of FIGS. 47 to 57 as discussed below. The paddle 180 includes a forward tire engaging portion 182 configured to engage the side of the tire and a rear stabilizing portion 184 integrally connected to the connection bar or bracket 252 for stability. When the tire exerts pressure on the forward tire engaging portion 182 of the paddle 180, the connection bar 252 coacts with the body 52 and serves to stabilize the paddle 180. It should be appreciated that the paddle 180 does not move with the tire engagers and is configured to engage the side of the tire at a relatively low position regardless of the position of the tire engagers.

The central section 56 of the body 52 also serves to support the inner and outer tire engagers 70 and 76 when each of them are in the extended position. More specifically, when the inner tire engager 70 is in the extended position, it rests against the support section 190 of the central portion 56 of the body 52. Likewise, when the outer tire engager 76 is in the extended position, it rests against the support section 190 of the central portion 56.

It should be appreciated that the chock and specifically one or both of the tire engagers of the tire engaging assembly are constructed to break when too much force is applied respectively against the inner and/or outer tire engagers. This construction prevents damage to the suspension of the vehicle which is difficult to detect. More specifically, in severe impact situations, if the chock (or a portion of the chock) does not break upon impact by the tire, the impact can be absorbed by one or more of the components of the suspension system of the vehicle, which can cause damage to those components. Such damage cannot be easily detected from outside manual inspection of the vehicle. In such cases, where the detection does not occur, the vehicle can be sold in a damaged state and can lead to later problems with the purchasers. Thus, in severe impact situations, vehicle manufacturers desire the chock to give or break, which may cause damage to the exterior components of the vehicle (i.e., bumpers, fenders, etc.). In such situations, such damage can be readily detected and the vehicles can be fixed prior to sale of the vehicle. Additionally, when an unloader sees damaged chocks, the unloader will know that the vehicle must be carefully inspected for damage. If there is any damage, the costs for the related repairs of the vehicles can be borne by the appropriate party according to the transportation agreements. The construction disclosed herein of the chock also facilitates easy and cost efficient reconstruction of such broken chocks.

Turning now to the locking assembly 64, the central portion 56 and the rear portion 58 of the body 52 are configured support the locking assembly 64. More specifically, the rear portion 58 of the body 52 includes spaced-apart side walls 202 and 204 and a rear wall or base 206 interconnecting and extending between the side walls or bases 202 and 204. The side walls or bases 202 and 204 are connected to the central portion 56 of the body 52 and extend rearwardly from the central portion. The central portion 56 and the side walls 202 and 204 and rear wall or base 206 of the rear portion 58 of the body 52 define a locking member receiving area 210 (see FIGS. 6, 9, and 12) in which the locking member 66 of the locking assembly 64 is movably positioned.

The locking member 66 is generally rectangular and sized and configured to be positioned in the locking member receiving area 210. In one embodiment, the locking member is molded of a liquid thermoset plastics material primarily composed of a plural component liquid monomer mixture which can be molded by a reaction injection molding (RIM) process. An example of such a product is produced by Metton America Corporation and sold under the trademark METTON. The locking member can alternatively be made from a nylon, a glass filled nylon, a Dicyclopentadiene, an Acrylonitrile-butadine-styrene, or a polycarbonate. It should further be appreciated that the locking member could be made from any one or more suitable materials, including other metals, plastics, ceramics and composite materials or combinations thereof. It should also be appreciated that the locking member illustrated in FIGS. 4 to 16, show one configuration of the locking member, but that the locking member may be alternatively configured in accordance with the present invention.

More specifically, the locking member 66 is pivotally connected to the central portion 56 of the body 52 by a second pivot member (not shown) such as a second bolt and nut assembly. The central portion 56 of the body 52 includes two recess areas 56a and 56b (see FIG. 6) configured to facilitate pivotal attachment of the locking member 66 to the body 52. These recess areas 56a and 56b are configured to receive pivot connection members or brackets 250 and 252, respectively. The second pivot member extends through the body 52, the front end of the locking member 66, and the connection bars or brackets 250 and 252 respectively disposed in recess areas 56a and 56b. It should be appreciated that if part of the tire engaging assembly or locking assembly breaks, the chock can be reconstructed by replacing the broken components in the field such as by unfastening the two pivot members (such as the bolts and nuts), replacing the broken components and refastening the pivot members.

Figure 11:
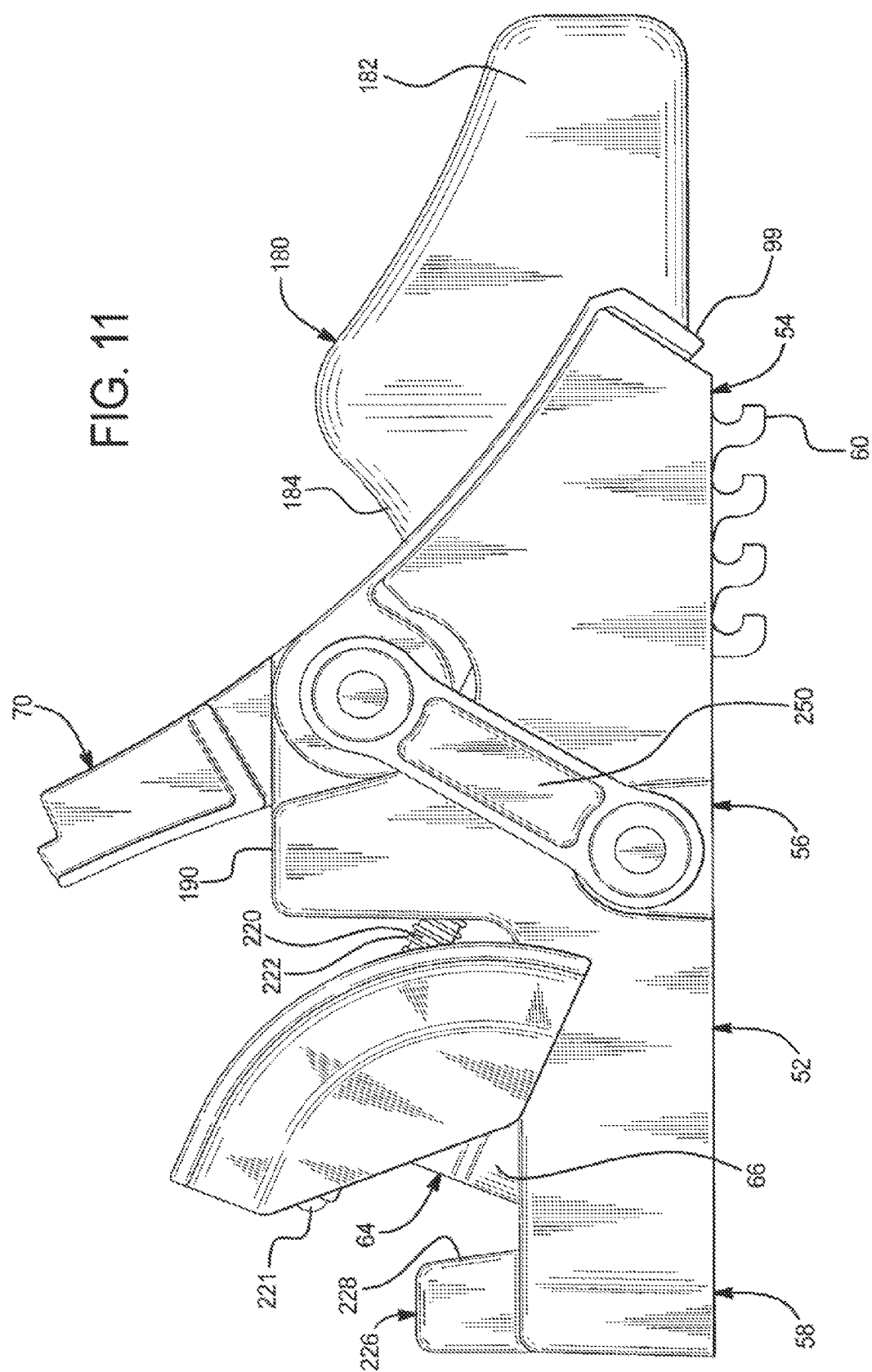
FIG. 11 is a side elevation view of the chock of the embodiment of FIG. 4, and illustrating the inner tire engager in an extended position, the outer tire engager in a retracted position, and the locking member in an unlocked position.

The locking member 66 includes front and rear upwardly projecting bosses 212 and 214 configured to receive and support a locking pin 220 for axial movement. The locking pin 220 is positioned in the bosses 212 and 214 and a compression spring 222 is journaled about the locking pin 220 between the bosses 212 and 214. The compression spring 222 biases the locking pin 220 rearwardly to its normal or resting position. The free end 221 of the locking pin 220 extends rearwardly from boss 212 and is configured to be received in a locking notch 224 in locking bar 226. Locking bar 226 extends upwardly from the rear wall or base 206 of the rear portion 58 of the body 52. The locking bar 226 includes a sloped front biasing wall 228 as best seen in FIGS. 8 and 11. When the locking member 66 is pivoted downwardly from the unlocked position, toward the locked position, the free end 221 of the locking pin 220 engages the sloped front wall 228 of the locking bar 226 which causes the locking pin 220 to be biased against the compression spring 222 journaled about the locking pin 220. When the free end 221 of the locking pin 220 reaches the locking notch 224, the compression spring 222 causes the locking pin 220 to move into the locking notch 224 and thus secure the locking member 66 in the locked position.

The locking assembly 64 also includes a handle 230 secured to the locking pin 220 for moving the locking pin 220 axially against the compression spring 220 to facilitate the unlocking of the locking member 66. In this illustrated embodiment, the handle 230 includes a foot peddle 232 attached by an arm 234 which is attached to the locking pin 220. The foot peddle 232 is sized and configured to enable a loader to lock and unlock the locking member 66 of the locking assembly 64. In an alternative embodiment, the handle has two foot peddles (not shown) extending from opposite sides of the locking member.

In operation, to disengage the locking pin 220 from the locking notch 224, the loader applies a force against the rear side of the foot peddle 232 which causes a transverse force against the compression spring 222, and then moves or rotates the locking member 66 upwardly to the unlocked position. To engage the locking pin 220 into the locking notch 224, the loader applies a force against the top front side of the foot peddle 232 which causes the locking member 66 to move downwardly such that the locking pin 220 engages the locking bar 226 until it reaches the locking notch 224.

As discussed above, the chock 50 includes a plurality of downwardly projecting grate engagers or teeth 60 which extend downwardly from the front section 54 of the body 52 and are arranged in four grate engagers or parallel spaced rows each having four teeth. Each grate engager or tooth 60 has a curved or rounded surface which faces downwardly and forwardly. The curved surfaces permit pivoting of the body 52 between an upper inclined released position and a downward horizontal locked position where the grate engagers or teeth project between the parallel spaced wires and engage the wires of the grating or wire grid. The grate engagers or teeth 60 are formed in body 52 during the molding process. The grate engagers or teeth 60 are arranged in a plurality of laterally spaced apart rows with each row having a plurality of teeth (e.g., four in the illustrated embodiment). In one embodiment, the grate engagers or teeth 60 are made from a suitable metal. It should be appreciated that the grate engagers or teeth can be made from any suitably strong material. It should also be appreciated that the number of grate engagers can vary.

The locking member 66 of the chock 50 also has a plurality of downwardly projecting grate engagers or teeth 68 having rounded front corner surfaces for entering and engaging the grating or wire grid. The grate engagers or teeth 68 are arranged in a plurality of laterally spaced-apart rows with each row having a plurality of teeth (e.g., four in the illustrated embodiment). In one embodiment, the grate engagers or teeth 68 are made from a suitable metal. It should be appreciated that the grate engagers or teeth can be made from any suitably strong material.

The chock 50 is used by positioning the chock 50 on the grating or wire grid 46 adjacent a tire and then hooking the grate engagers or teeth 60 onto the cross wires while the locking member 66 is in the unlocked position. When the locking member 66 is pivoted to its locked position, the teeth 68 on the locking member 66 enter into and engage the grating or wire grid 46 to secure the chock 50 so that it cannot shift rearwardly to release the grate engagers or teeth from the cross wires.

It should be appreciated that this illustrated embodiment of the chock of the present invention provides an advantage over the device described in U.S. Pat. No. 6,851,523, such as by pivoting the locking member 66 at the central portion 56 of the body 52 and locking at the rear portion of the body. This enables the loader to use his/her foot to lock and unlock the chock. This configuration enables the loader to kick the kick plate toward the tire instead of toward the body panel which prevents damage or chipping of the body panel. More specifically, if the loader is missing the foot peddle or kick plate with his/her foot, the loader will contact the tire with their foot instead of a body panel of the vehicle.

In various alternative embodiments of the present invention such as those described below, the locking member 66 is pivotally attached to the rear portion 58 of the body 52 and pivots forward to be lockable at the central portion 56 of the body 52. Various such alternative embodiments are discussed below and illustrated in FIGS. 27 to 57.

An alternative embodiment illustrated of the chock is illustrated in FIGS. 19 to 26, where the chock is indicated by numeral 350. This alternative embodiment includes an alternative locking assembly, an alternative tire engaging assembly, and an alternative method of attaching the grate engagers or teeth to the body and locking member.

More specifically, FIGS. 19, 20, 22, and 23 illustrate an alternative locking assembly of the chock. This alternative locking assembly includes a slip ring, clip or retainer 400 attached to and positioned around the locking pin 220 between boss 214 and arm 234 for maintaining the locking pin and limiting movement of the locking pin 220 to the desired movement. It should be appreciated that other alternative configurations or modifications of the locking assembly can be made in accordance with the present invention.

Figure 25:
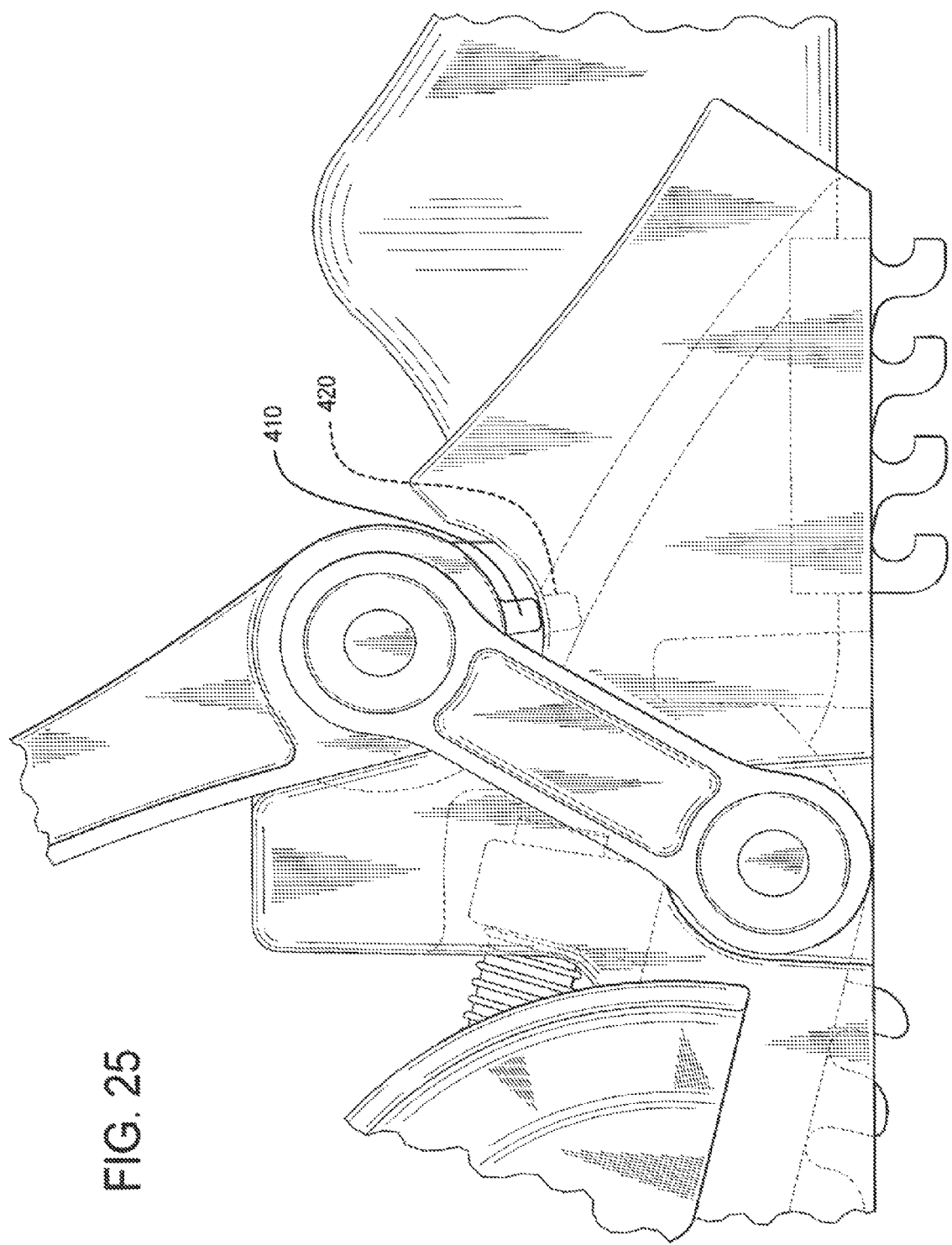
FIGS. 25 and 26 are enlarged fragmentary side views of the alternative tire engaging assembly of the chock of FIG. 19.
Figure 26:
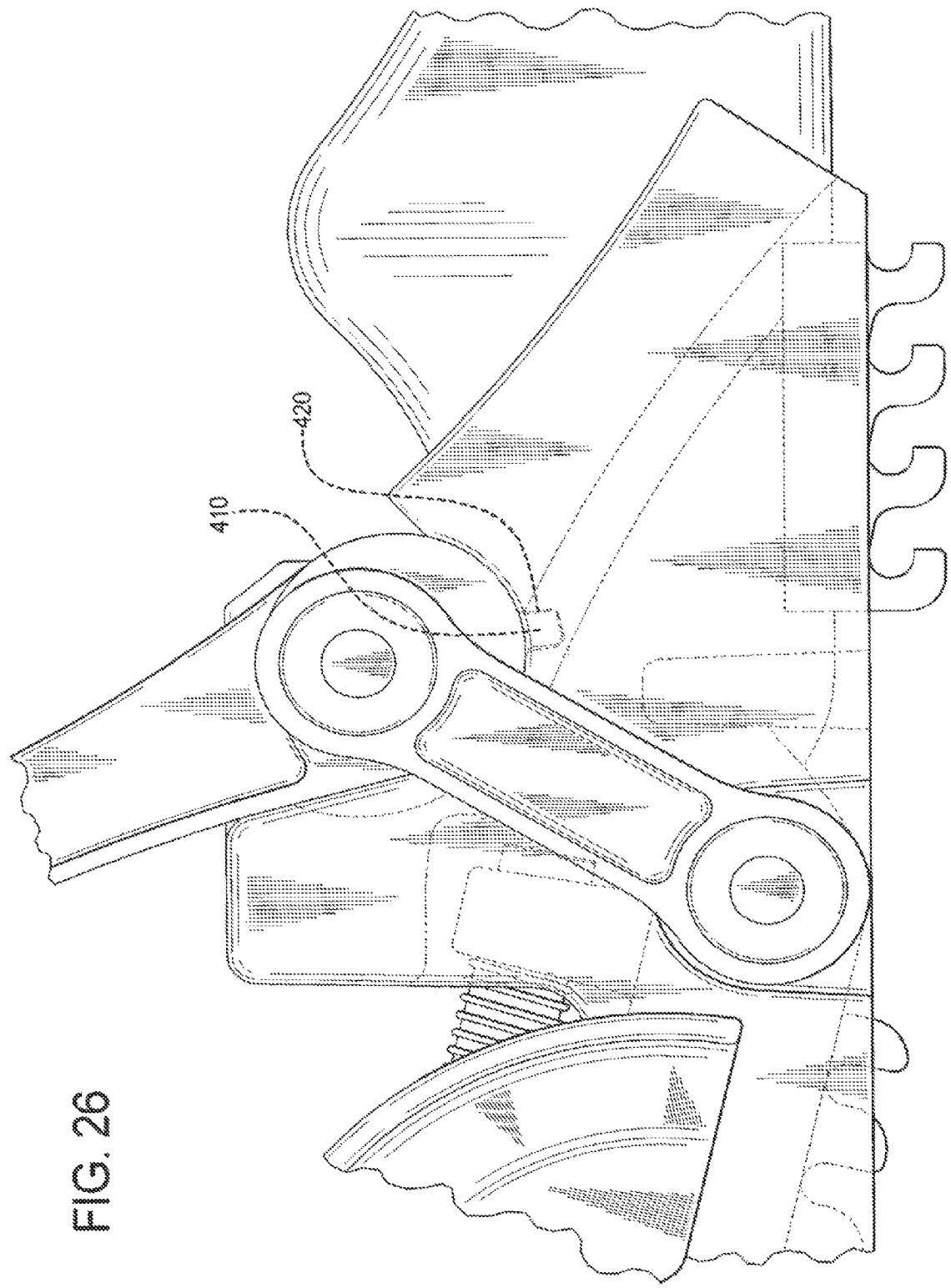
Figure 27:
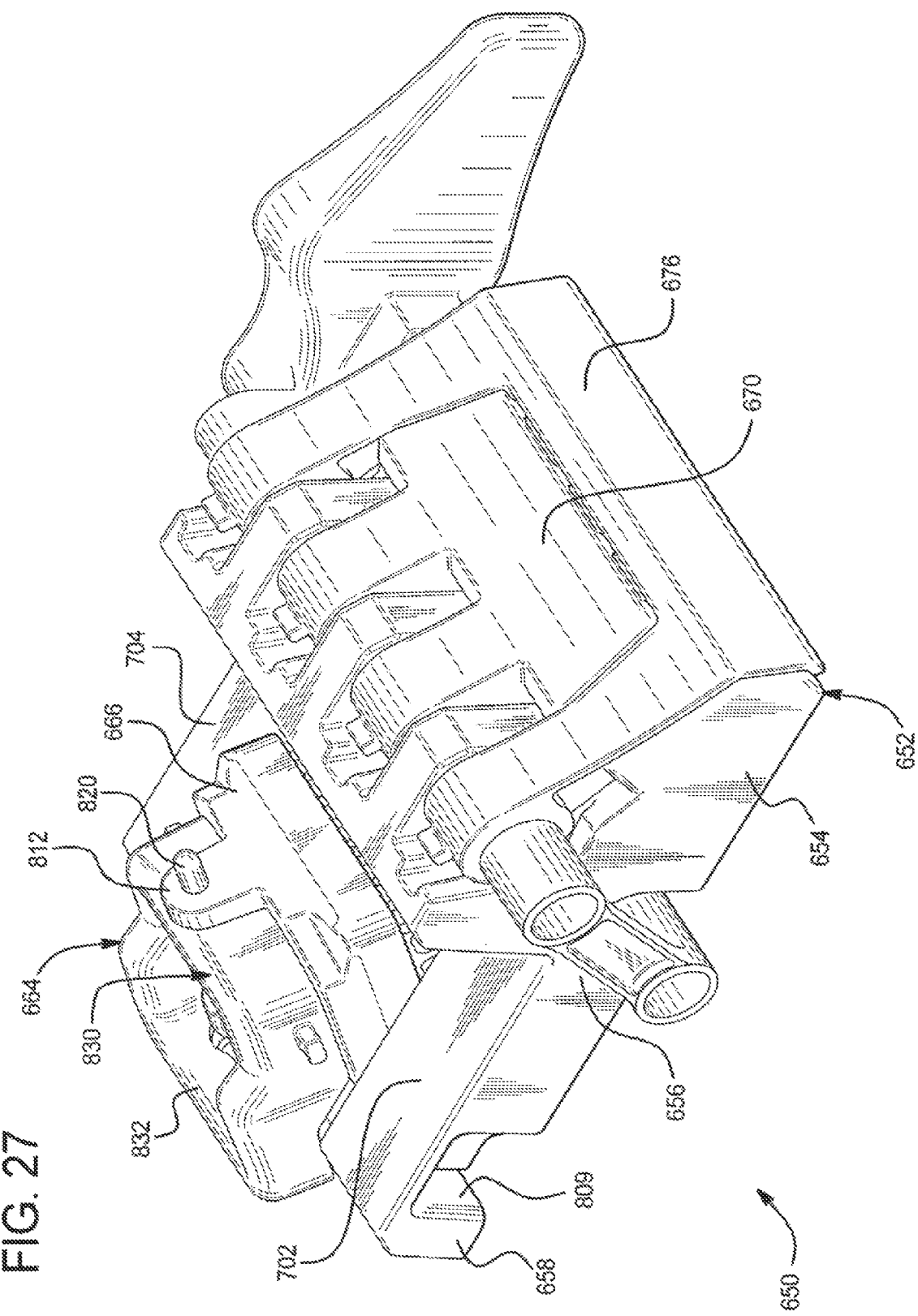
FIG. 27 is a top front perspective view of the chock of an alternative embodiment of the present invention, and illustrating the inner tire engager in a retracted position, the outer tire engager in a retracted position, and the locking member in an unlocked position.
Figure 28:
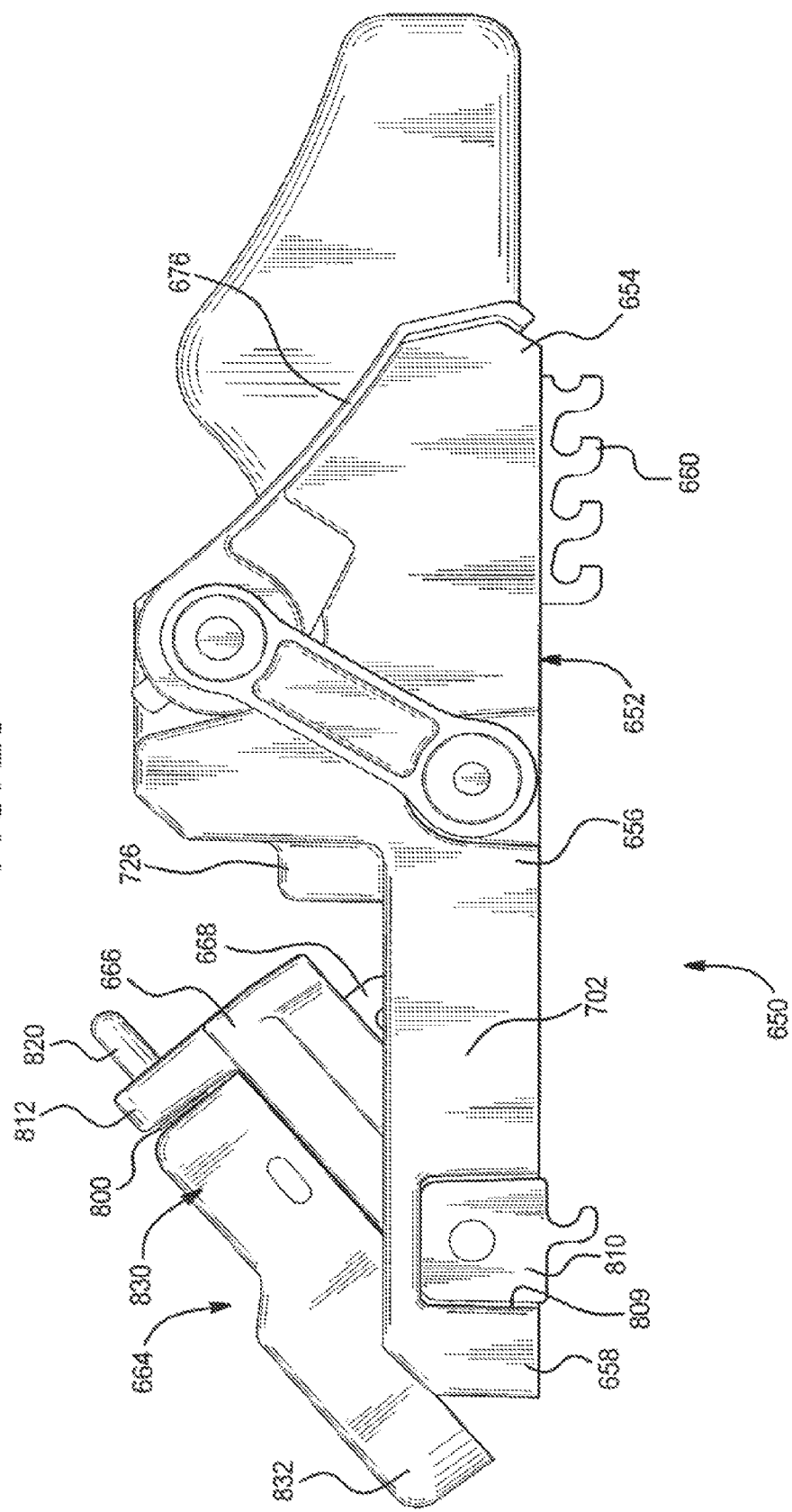
FIG. 28 is a side elevation view of the chock of the embodiment of FIG. 27, and illustrating the inner tire engager in a retracted position, the outer tire engager in a retracted position, and the locking member in an un-locked position.
Figure 29:
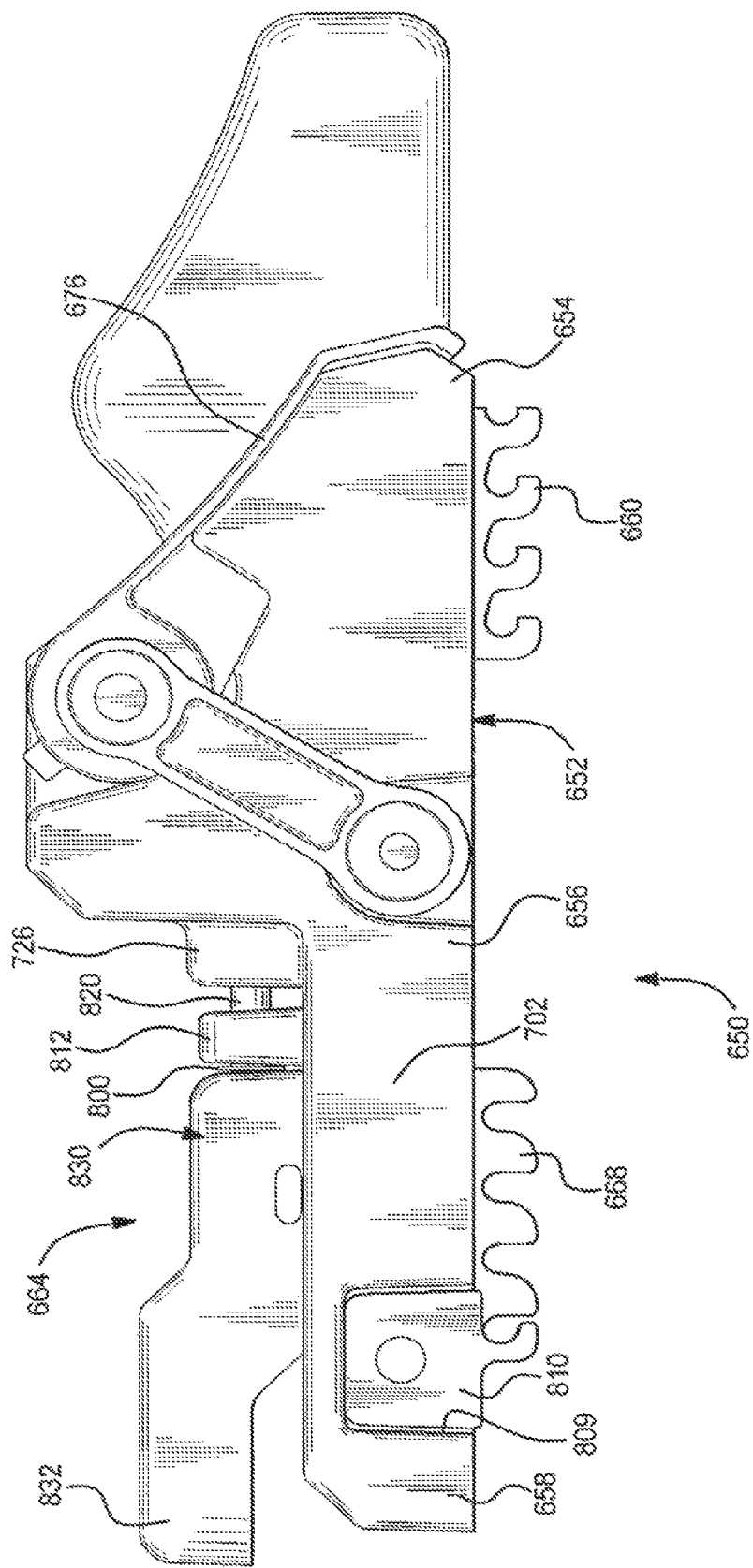
FIG. 29 is a side elevation view of the chock of the embodiment of FIG. 27, and illustrating the inner tire engager in a retracted position, the outer tire engager in a retracted position, and the locking member in a locked position.
Figure 30:
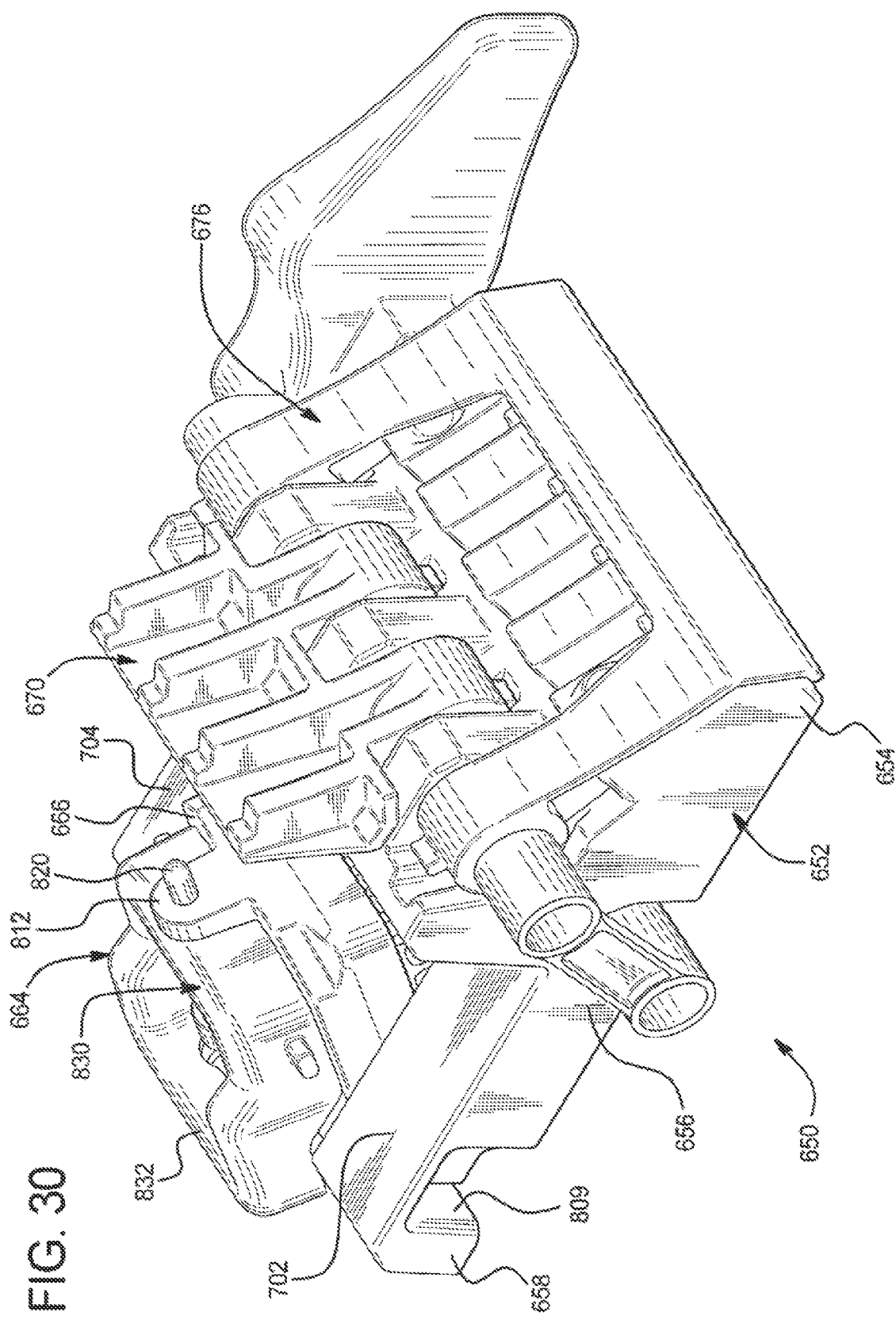
FIG. 30 is a top front perspective view of the chock of the embodiment of FIG. 27, and illustrating the inner tire engager in an extended position, the outer tire engager in a retracted position, and the locking member in an unlocked position.
Figure 31:
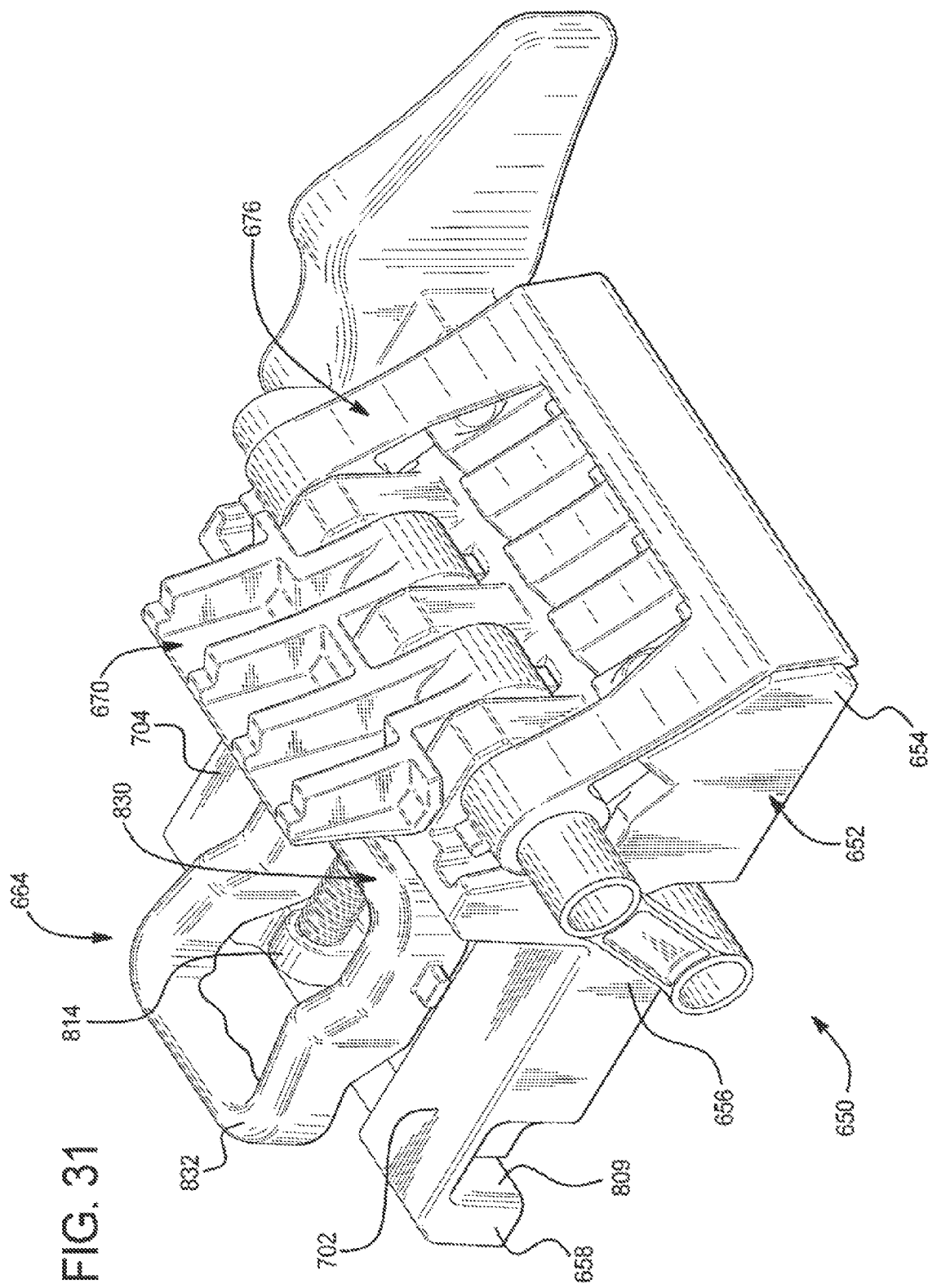
FIG. 31 is a top front perspective view of the chock of the embodiment of FIG. 27, and illustrating the inner tire engager in an extended position, the outer tire engager in a retracted position, and the locking member in a locked position.
Figure 32:
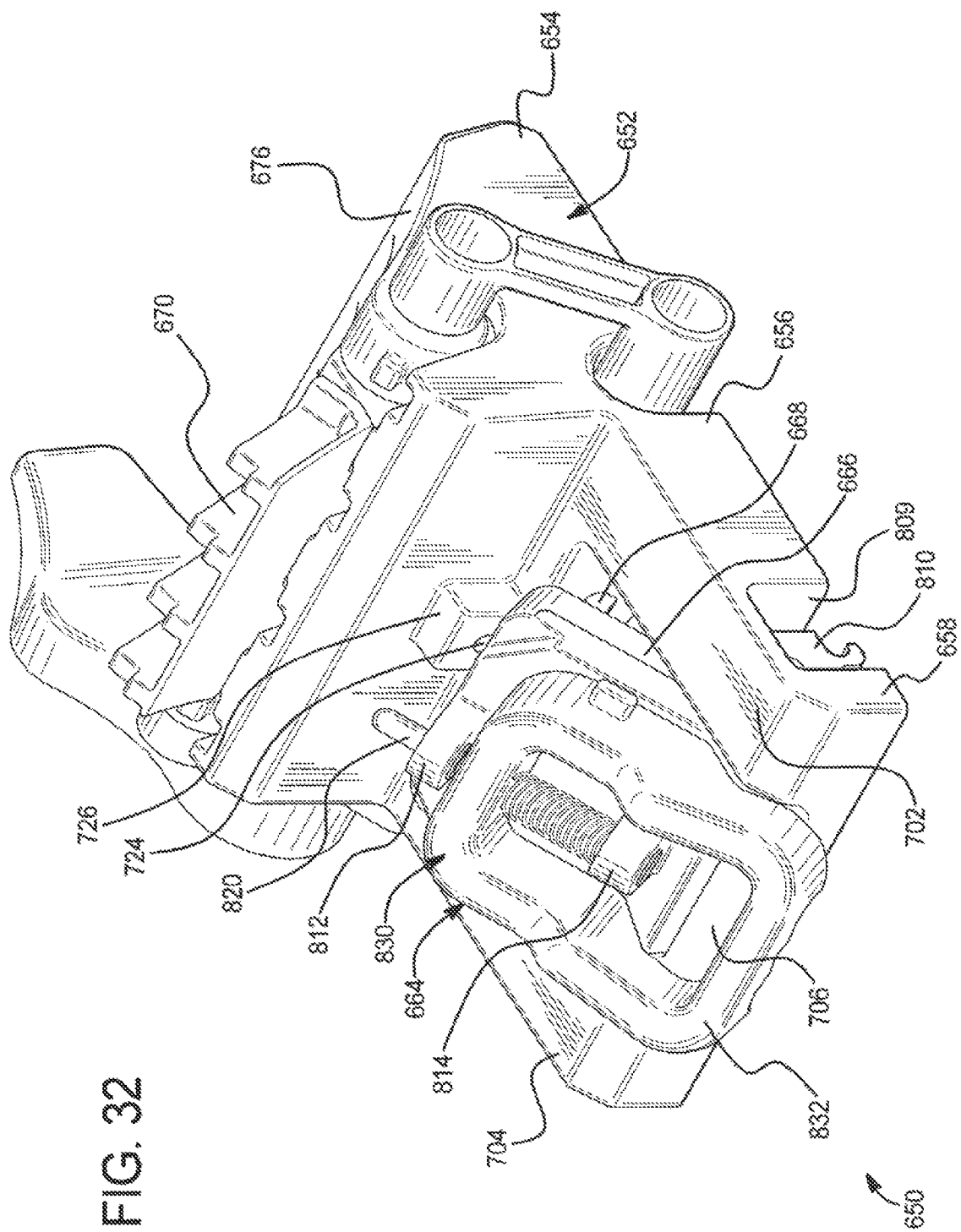
FIG. 32 is a top rear perspective view of the chock of the embodiment of FIG. 27, and illustrating the inner tire engager in an extended position, the outer tire engager in a retracted position, and the locking member in an unlocked position.
Figure 33:
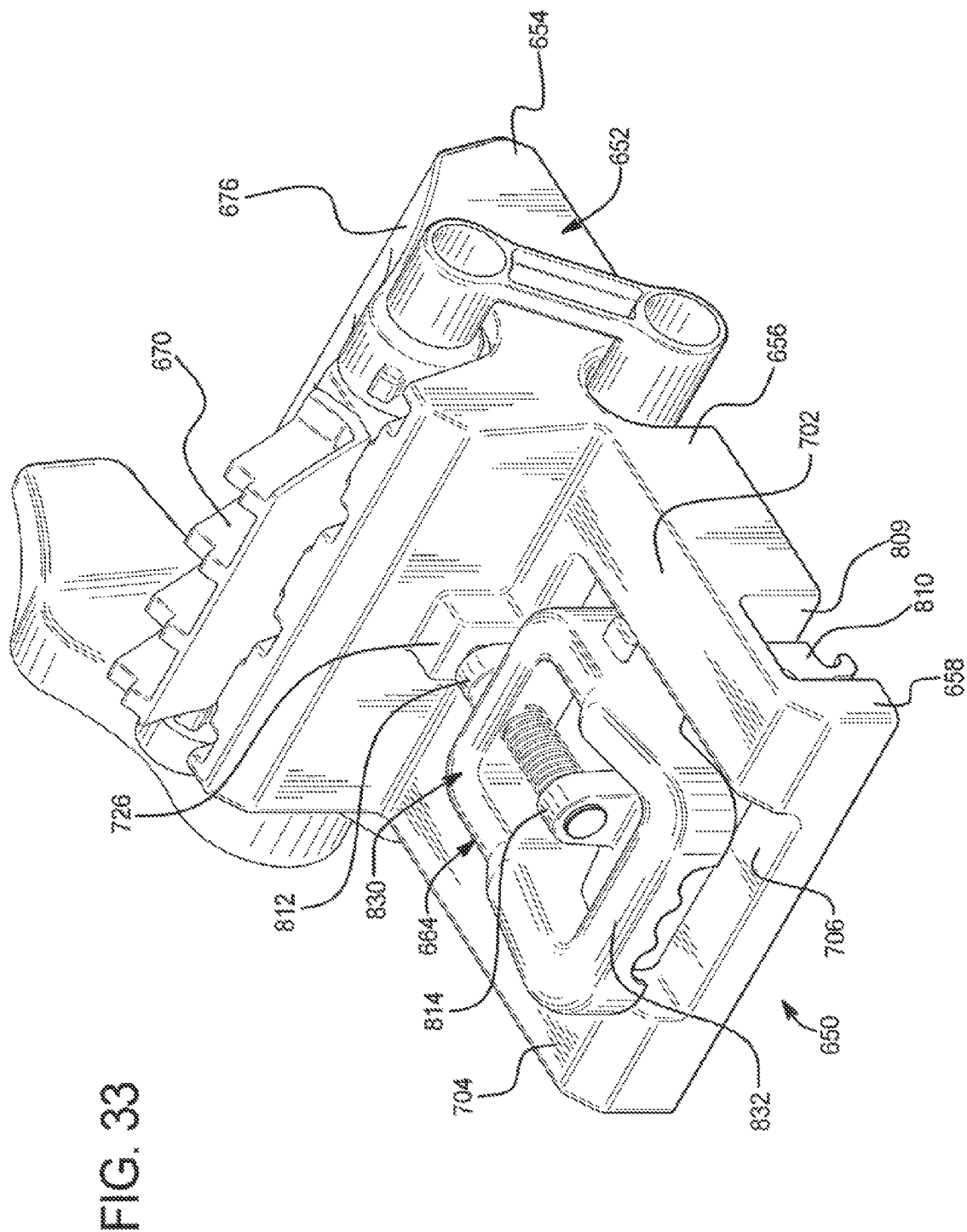
FIG. 33 is a top rear perspective view of the chock of the embodiment of FIG. 27, and illustrating the inner tire engager in an extended position, the outer tire engager in a retracted position, and the locking member in a locked position.
Figure 34:
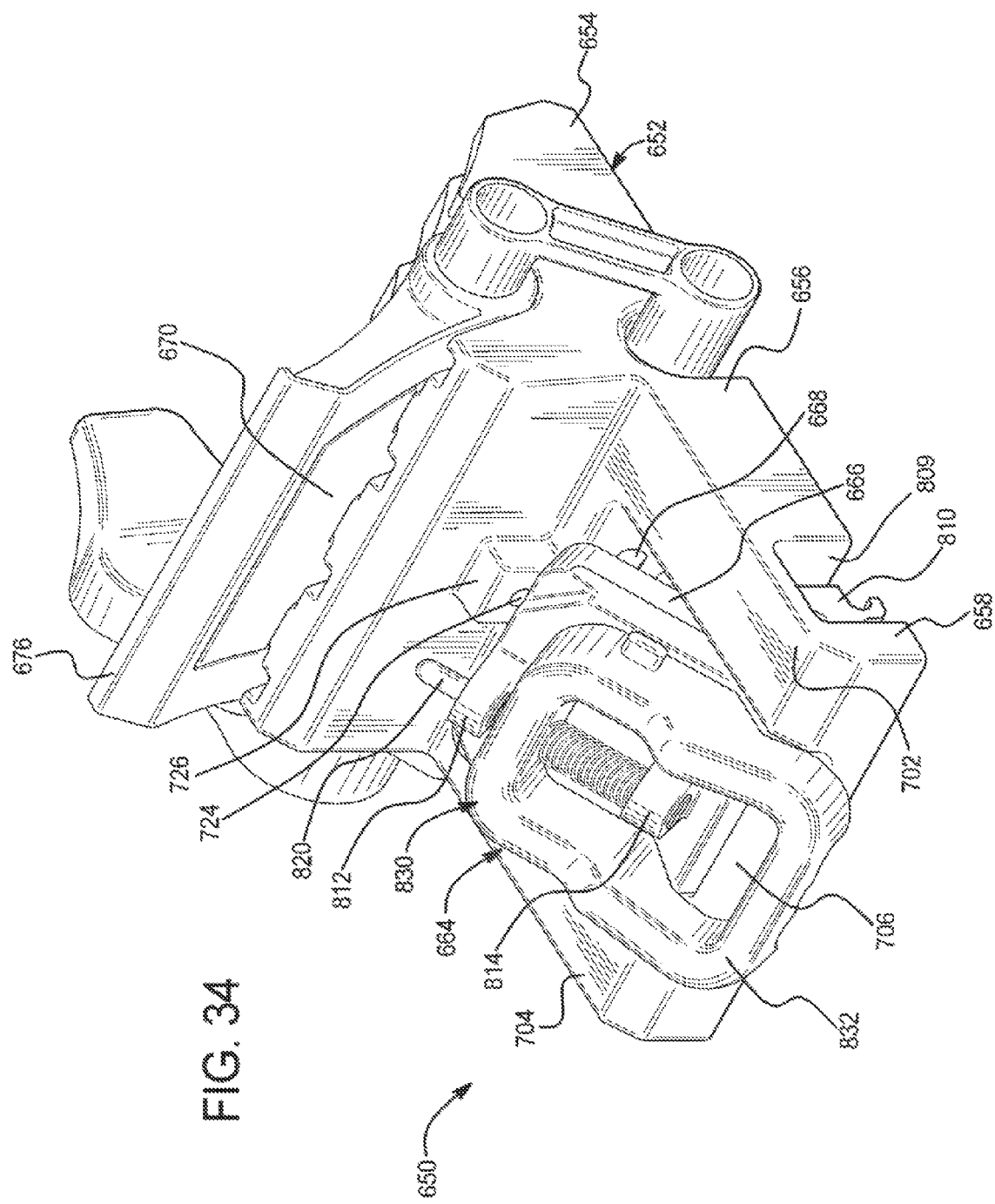
FIG. 34 is a top rear perspective view of the chock of the embodiment of FIG. 27, and illustrating the inner tire engager in an extended position, the outer tire engager in an extended position, and the locking member in an unlocked position.
Figure 35:
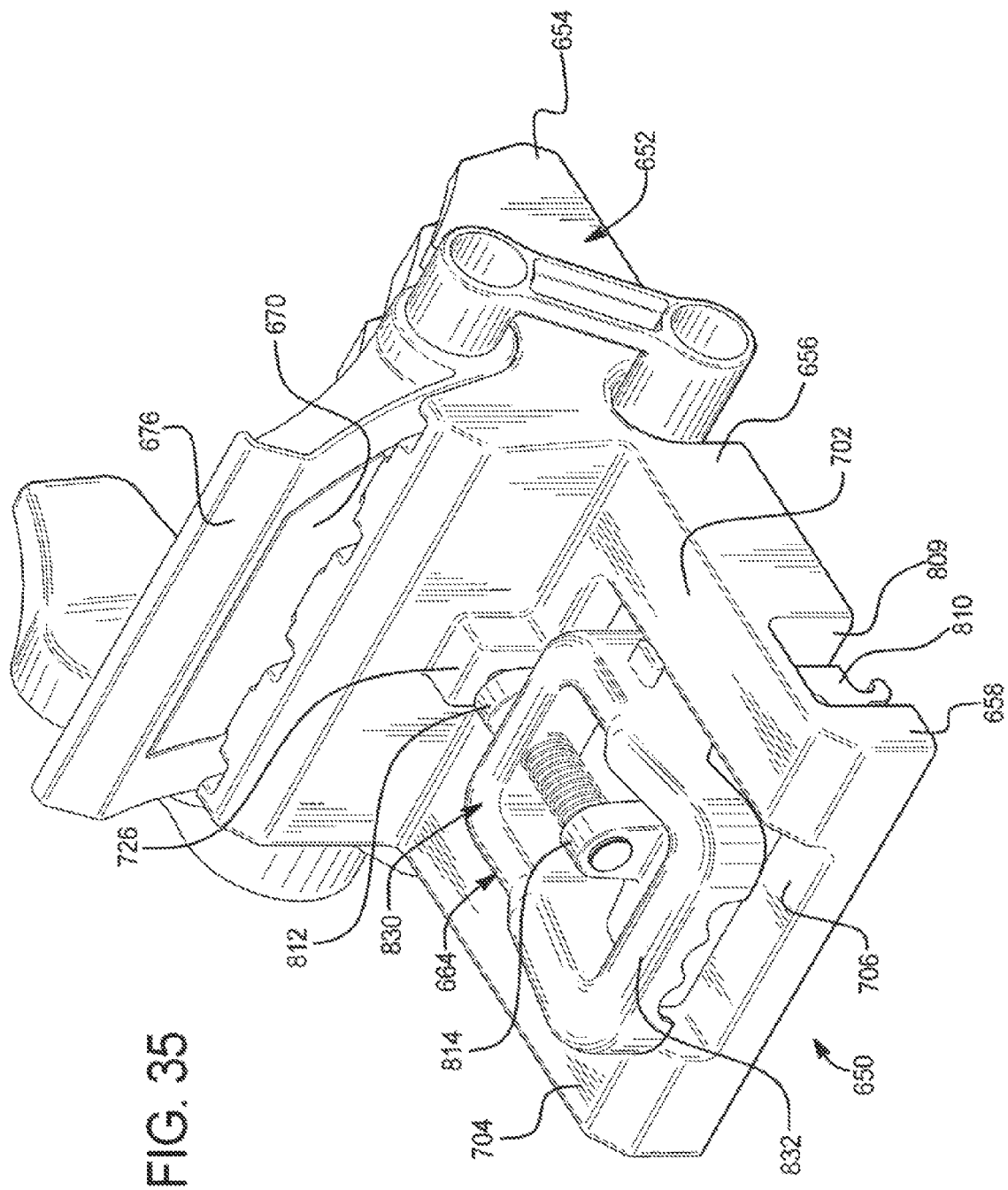
FIG. 35 is a top rear perspective view of the chock of the embodiment of FIG. 27, and illustrating the inner tire engager in an extended position, the outer tire engager in an extended position, and the locking member in a locked position.
Figure 36:
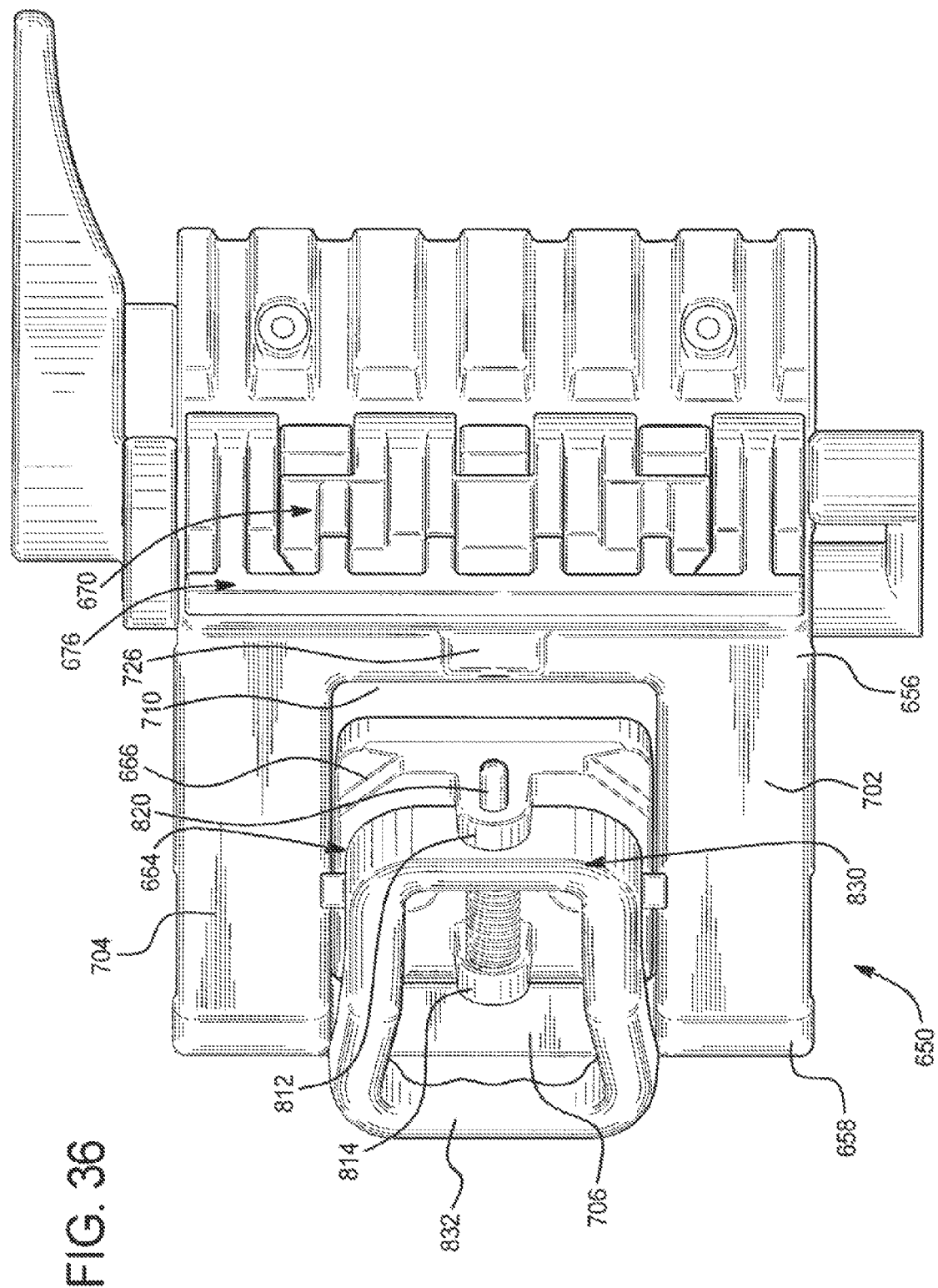
FIG. 36 is a top view of the chock of the embodiment of FIG. 27, and illustrating the inner tire engager in an extended position, the outer tire engager in an extended position, and the locking member in an unlocked position.

FIGS. 19, 24, 25, and 26 also illustrate an alternative tire engaging assembly. This alternative tire engaging assembly includes tire engager securing or locking tongues or members 410 and 416 respectively attached to the pivot members 496 and 498 of the outer tire engager 476. This alternative tire engaging assembly also includes tire engager securing or locking tongues or members 412 and 414 respectively attached to the pivot members 486 and 488 of the inner tire engager 470. The tire engager securing or locking tongues or members 410, 412, 414, and 416 are configured to be received in respective tire engaging securing or locking slots 420, 422, 424 (see FIGS. 24, 25 and 26), and 428 (not shown) in the top side of the front portion 454 of the body 452, and particularly in the bottom of the pivot recess areas. As further illustrated in FIG. 24, the pivot members 486, 488, 496 and 498 respectively define oval pivot member adjustment slots 430 (not shown), 432, 434, and 436 which enable each of the inner and outer tire engagers to be moved to a first extended position where their securing or locking tongues members are not positioned in the respective securing or locking slots as generally illustrated in FIG. 25, and then into a second extended position where their securing members are positioned in the respective securing or locking slots as generally illustrated in FIG. 26. The tire engager securing or locking tongues or members are received in the respective tire engaging securing or locking slots to prevent undesired rotation or pivoting of the respective inner and outer tire engagers after they have been positioned in the extended positions by a loader. It should thus be appreciated that alternative configurations of the tire engaging assembly may be employed in accordance with the present invention.

Figure 20:
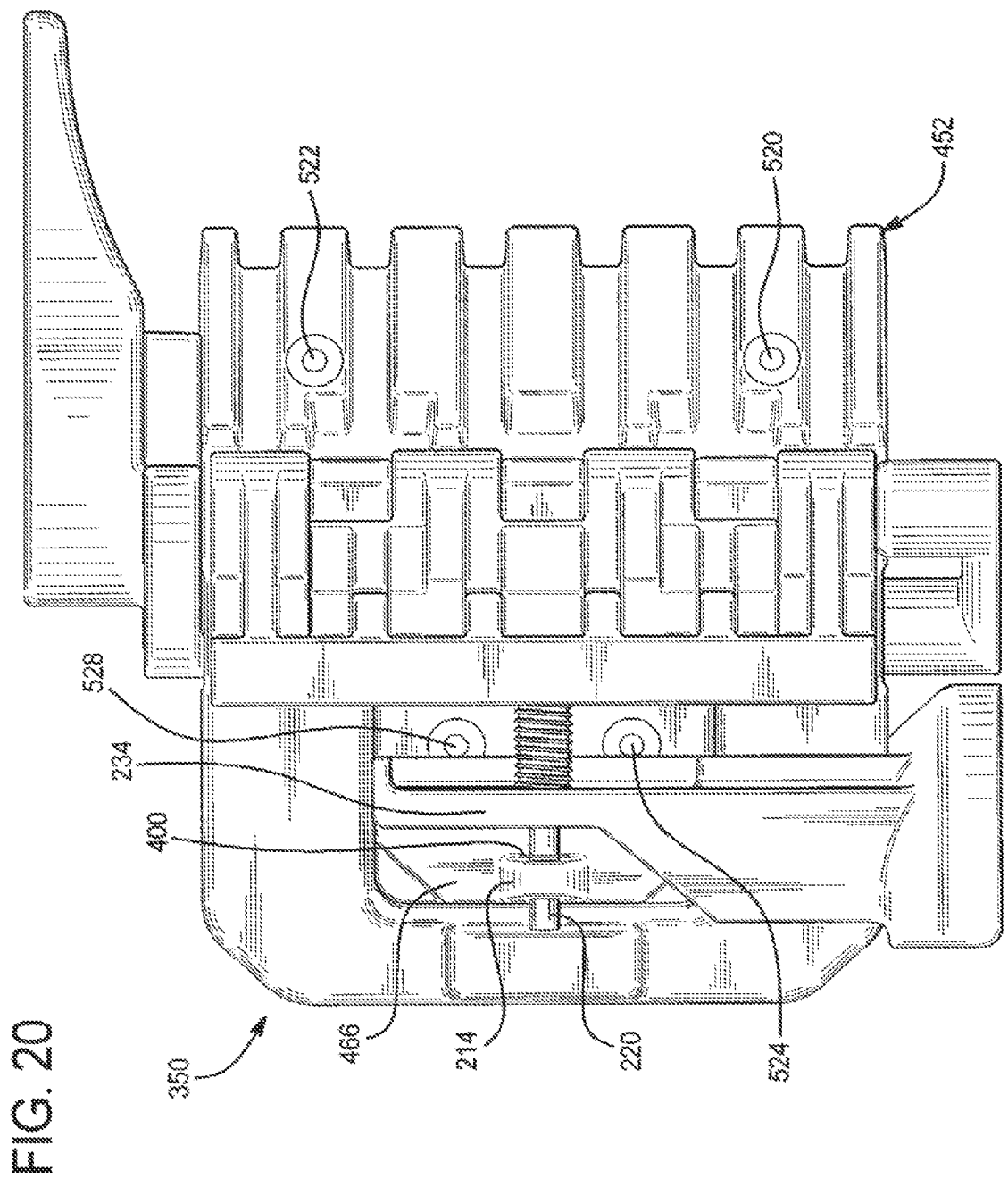
FIG. 20 is a top view of the chock of FIG. 19, and illustrating the inner tire engager in an extended position, the outer tire engager in an extended position, and the locking member in a locked position.
Figure 21:
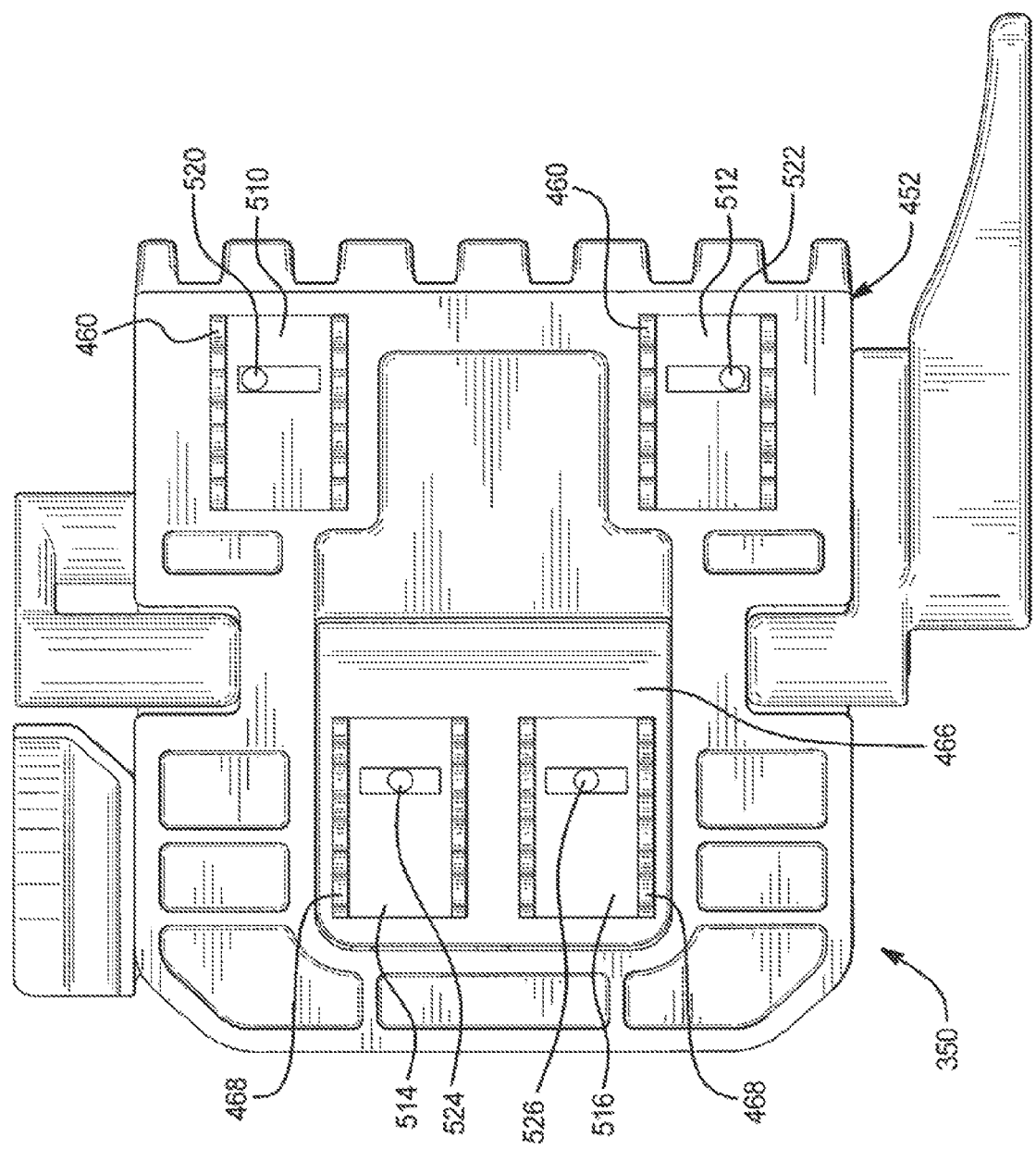
FIG. 21 is a bottom view of the chock of FIG. 19, and illustrating the locking member in a locked position.
Figure 22:
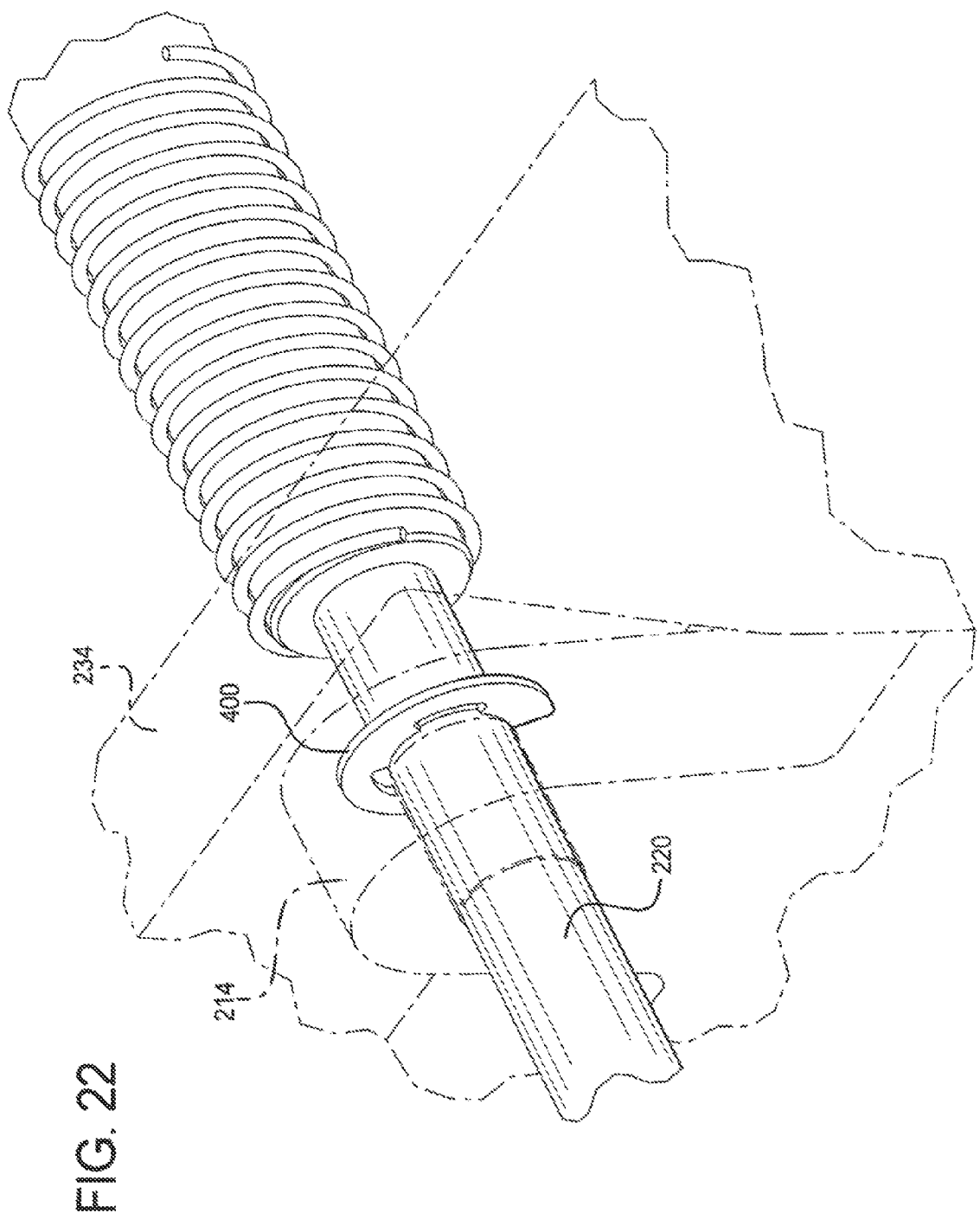
FIGS. 22 and 23 are enlarged fragmentary perspective views of the alternative locking assembly of the chock of FIG. 19.
Figure 23:
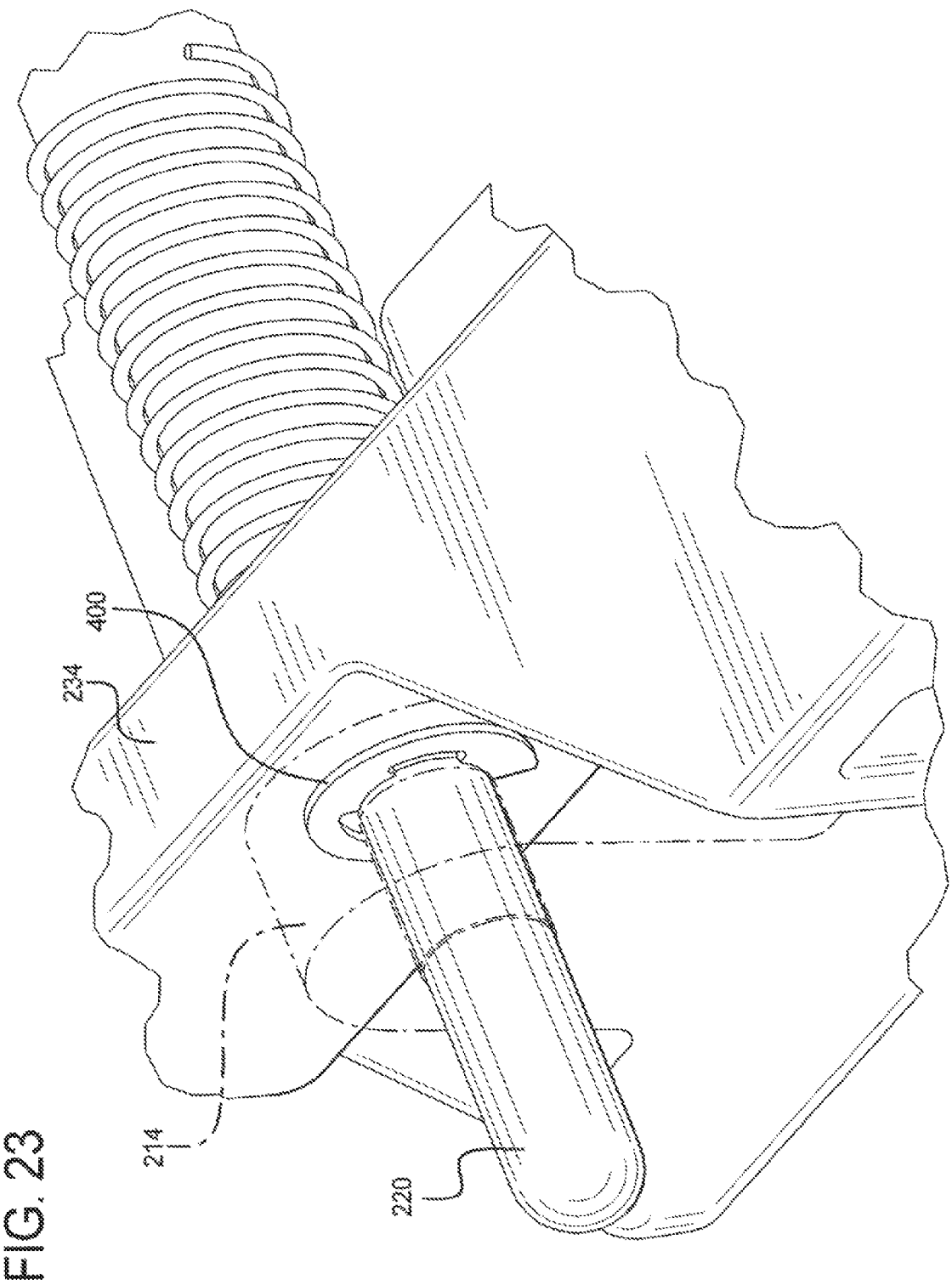
Figure 24:
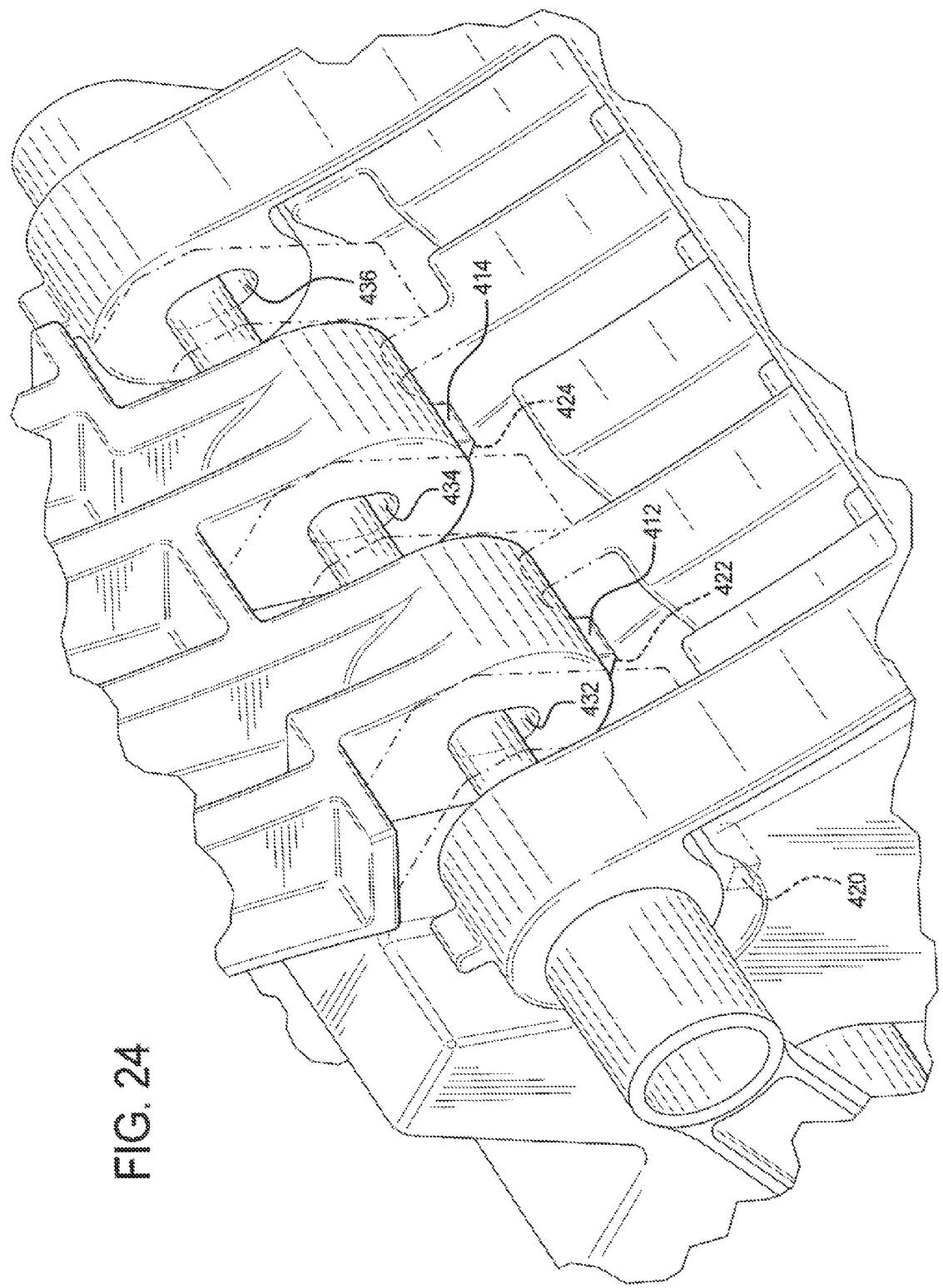
FIG. 24 is an enlarged fragmentary perspective view of the alternative tire engaging assembly of the chock of FIG. 19.

FIGS. 20 and 21 illustrate an alternative method of attaching the grate engagers or teeth to the body and the locking member. More specifically, in the above described embodiments, the grate engagers or teeth 60 and 68 are respectively molded into the body 452 and the locking member 466. In this alternative embodiment, the grate engagers or teeth 460 and 468 are respectively attached to mounting plates 510, 512, 514, and 516 which are secured by suitable fasteners 520, 522, 524, and 526 (such as bolts and nuts) to the body 452 and the locking member 466. It should be appreciated that the fasteners extend through openings formed in the body 452 and the locking member 466. It should also be appreciated that any suitable configuration for the mounting plates may be employed. It should further be appreciated that additional and/or alternative fasteners may be employed.

It should further be appreciated that the present invention includes a method of securing a vehicle in an auto-rack railroad car which includes, for each tire of a vehicle, positioning the inner and outer tire engagers of a chock in the appropriate retracted or extended positions for the tire, placing the chock adjacent to the tire on the grating or wire grid, and locking the locking member.

It should be appreciated that, when not in use, the chocks can be stored in a suitable storage box such as the kind described in U.S. Pat. No. 7,150,592.

It should also be appreciated that, when not in use, the chocks can be stored in a suitable vertically extending storage pan having a cross bar and attached to the side wall of the auto-rack railroad car. Such storage pans are currently in auto-rack railroad cars for storage of the existing chocks. One alternative embodiment of the present invention shown in FIGS. 27 to 46 is specifically configured to be positioned in such a storage pan and includes a plurality of storage clasps configured to engage the cross bar as further discussed below. A further alternative embodiment of the present invention shown in FIGS. 47 to 57 is also specifically configured to be positioned in such a storage pan with the use of a storage pan bracket illustrated in FIGS. 58 to 60 as further discussed below.

More specifically and referring now to FIGS. 27 to 42, this embodiment of the vehicle wheel chock is generally indicated by numeral 650. The illustrated embodiment of the chock 650 includes: (a) a body 652 having a front portion 654, a central portion 656 and a rear portion 658; (b) a plurality of grate engagers or teeth 660 extending downwardly and forwardly from the front portion 654 for engaging the grating or wire grid; and (c) a tire engaging assembly at the front portion 654 for securely engaging the tire of the vehicle. Similar to the above embodiments, the tire engaging assembly includes pivotable inner and outer tire engagers 670 and 676, respectively, configurable in multiple different positions to respectively engage different size tires (not shown) of multiple different vehicles (not shown) without engaging the different fenders, moldings, trim or bumpers (not shown) of those vehicles as discussed in further detail below. As with the above embodiments, the inner tire engager 670 and the outer tire engager 676 are each pivotally attached to the body 652 by a suitable first pivot member such as a first bolt and nut assembly (not shown).

This illustrated embodiment of the chock 650 also includes: (a) a locking assembly 664 having a locking member 666 pivotally connected to the rear portion 658 of the body 652 and lockable at the central portion 656 of the body 652 for securely attaching the chock 650 to the grating or wire grid; and (b) a plurality of grate engagers or teeth 668 extending downwardly from the locking member 666 for engaging the grating or wire grid when the locking member 666 is in the locked position. The locking member 666 is moveable between: (a) an unlocked or released position (shown in FIGS. 27, 28, 30, 32, 34, 36, 38, and 41) which facilitates attachment and detachment of the chock 650 from the grating or wire grid; and (b) a locked position (shown in FIGS. 29, 31, 33, 35, 37, 39, and 42) wherein the chock 650 is secured to the grating or wire grid. When the locking member 666 is in the locked position, the plurality of grate engagers or teeth 660 extending downwardly and forwardly from the front portion 654 of the body 652 prevent the upward and forward movement of the chock 650 relative to the grating or wire grid, and the plurality of grate engagers or teeth 668 extending downwardly from the locking member 666 prevent the rearward movement of the chock 650 relative to the grating or wire grid.

This illustrated embodiment of the chock 650 further includes a storage assembly having storage clasps 810 and 813 suitably attached to each side of the rear portion 658 of the body 652. As further discussed below, these storage clasps function to hold the chock in a vertically extending storage pan (see FIGS. 43, 44 and 45) and do not function to hold the chock 650 to the grating or wire grid (see FIG. 4B).

Turning now more specifically to the locking assembly 664, the central portion 656 and the rear portion 658 of the body 652 are configured support the locking assembly 664. More specifically, the rear portion 658 of the body 652 includes spaced-apart side walls 702 and 704 and a rear wall or base 706 interconnecting and extending between the side walls or bases 702 and 704. The side walls or bases 702 and 704 are connected to the central portion 656 of the body 652 and extend rearwardly from the central portion. The central portion 656 and the side walls 702 and 704 and rear wall or base 706 of the rear portion 658 of the body 652 define a locking member receiving area 710 (see FIGS. 36, 37, 38, 39) in which the locking member 666 of the locking assembly 664 is movably positioned. The illustrated locking member 666 is generally rectangular and sized and configured to be positioned in the locking member receiving area 710.

More specifically, the locking member 666 is pivotally connected to the rear portion 656 of the body 652 by a second pivot member (not shown). The rear portion 656 of the body 652 facilitates pivotal attachment of the locking member 666 to the body 652 by the second pivot member. The second pivot member extends through the body 652 and the rear end of the locking member 666.

The locking member 666 includes front and rear upwardly projecting bosses 812 and 814 configured to receive and support a locking pin 820 for axial movement. The locking pin 820 is positioned in the bosses 812 and 814 and a compression spring (not shown) is journaled about the locking pin 820 between the bosses 812 and 814. The compression spring biases the locking pin 220 forwardly to its normal or resting position. The free end of the locking pin 820 extends forwardly from boss 812 and is configured to be received in a locking notch 724 in locking bar 726. Locking bar 726 extends upwardly from the central portion 656 of the body 652. The locking bar 726 includes a rearwardly facing biasing wall. The biasing wall is illustrated with a minor angle; however, it should be appreciated that the biasing wall may have a larger angle. When the locking member 666 is pivoted downwardly from the unlocked position, toward the locked position, the free end of the locking pin 820 engages the biasing wall of the locking bar 726 which causes the locking pin 820 to be biased against the compression spring. When the free end of the locking pin 820 reaches the locking notch 724, the compression spring causes the locking pin 820 to move into the locking notch 724 and thus secure the locking member 666 in the locked position.

The locking assembly 664 includes a handle 830 secured to the locking pin 820 for moving the locking pin 820 axially to facilitate the unlocking of the locking member 666. The handle 830 has a gripping member 832 at its rear end to enable a loader to easily operate the locking assembly 664. In the illustrated embodiment, the handle 830 is directly attached to the locking pin 820. The handle 830 is sized and configured to enable a loader to lock and unlock the locking member 666 of the locking assembly 664. In operation, to disengage the locking pin 820 from the locking notch 824, the loader pulls on the rear side of the handle 830 (against the force of the compression spring to disengage the locking pin from the locking notch) and then moves or rotates the locking member 666 upwardly to the unlocked position. This locking assembly 664 includes a slip ring, clip or retainer 800 attached to and positioned around the locking pin 820 between boss 812 and the handle 830 for maintaining the locking pin 820 and limiting movement of the locking pin 820 to the desired movement. It should be appreciated that other alternative configurations or modifications of the locking assembly can be made in accordance with the present invention.

Similar to the above embodiments, the chock 650 includes a plurality of downwardly projecting grate engagers or teeth 660 which extend downwardly from the front section 654 of the body 652 and are arranged in four parallel spaced rows each having four teeth. Each grate engager or tooth 660 has a curved or rounded surface which faces downwardly and forwardly. The curved surfaces permit pivoting of the body 652 between an upper inclined released position and a downward horizontal locked position where the grate engagers or teeth project between the parallel spaced wires and engage the wires of the grating or wire grid. In one embodiment, the grate engagers or teeth 660 are made from a suitable metal. It should be appreciated that the grate engagers or teeth can be made from any suitably strong material. It should also be appreciated that the number of grate engagers can be varied in accordance with the present disclosure. It should further be appreciated that the components of the chock 650 are respectively made from the same materials as described above, but could alternatively be made from other suitable materials. Similar to the above embodiments, the locking member 666 of the chock 650 also has a plurality of downwardly projecting grate engagers or teeth 668 having rounded front corner surfaces for entering and engaging the grating or wire grid. The grate engagers or teeth 668 are arranged in a plurality of laterally spaced-apart rows with each row having a plurality of teeth (e.g., four in the illustrated embodiment). In one embodiment, the grate engagers or teeth 668 are made from a suitable metal. It should be appreciated that the grate engagers or teeth can be made from any suitably strong material.

The chock 650 is used by positioning the chock 650 on the grating or wire grid adjacent a tire and then hooking the grate engagers or teeth 660 onto the cross wires while the locking member 666 is in the unlocked position. When the locking member 666 is pivoted to its locked position, the teeth 668 on the locking member 666 enter into and engage the grating or wire grid to secure the chock 650 so that it cannot shift rearwardly to release the grate engagers or teeth from the cross wires.

As mentioned above, this embodiment of the chock 650 has a storage assembly including a plurality of storage clasps 810 and 813 suitably attached to the rear portion 658 of the body 652. More specifically, the rear portion 658 of the body 652 includes a plurality of storage clasp pockets 809 and 811 respectively configured to receive and maintain the storage clasps 810 and 813. While the storage clasp pockets 809 and 811 and the upper mounting portions of the storage clasps 810 and 813 are rectangular, they can alternatively be any suitable shape. The storage clasps are preferably made of a suitable steel, but could be made from any other suitable material. The storage clasps are respectively suitably attached to the body in the pockets.

Figure 43:
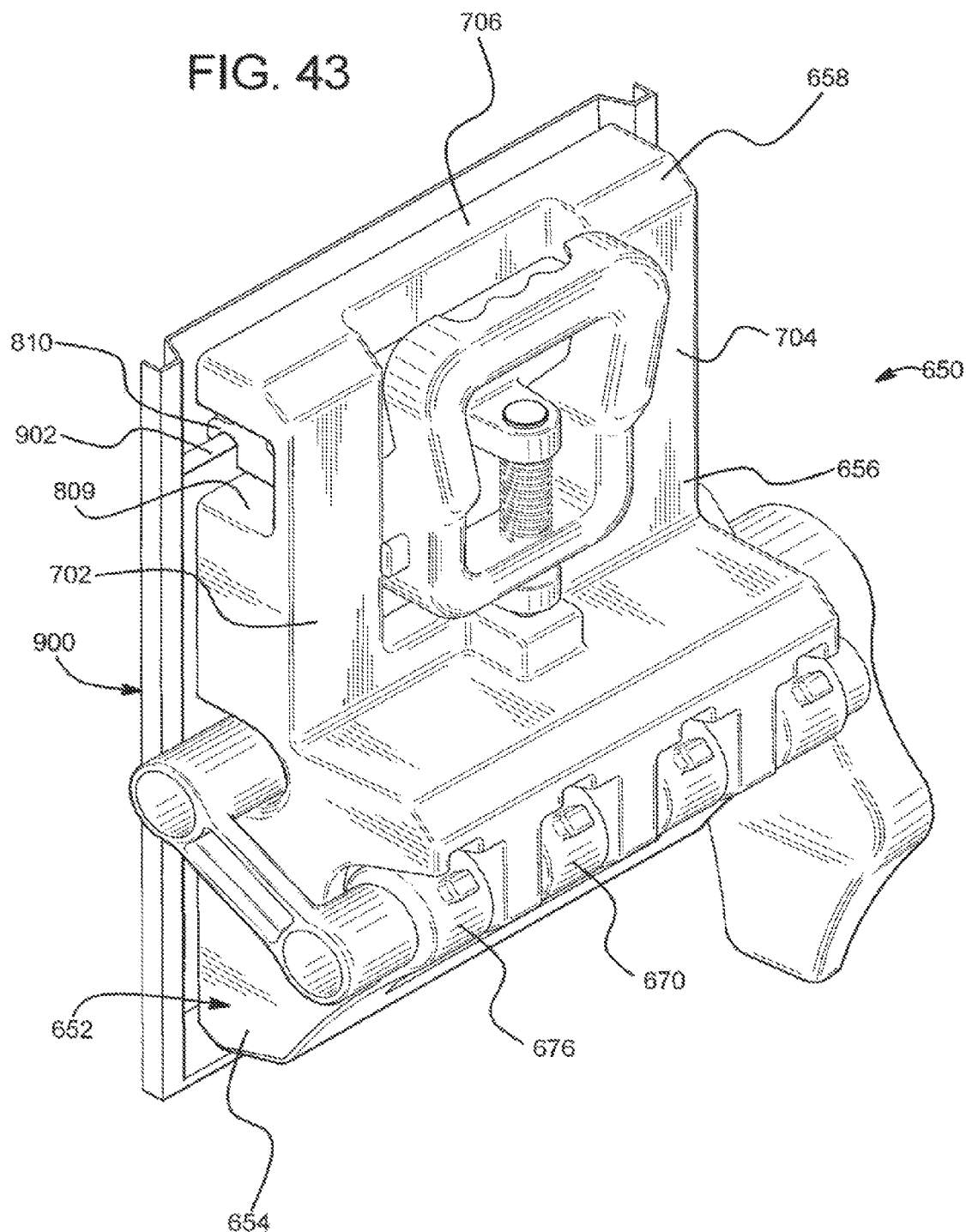
FIG. 43 is a perspective view of the chock of the embodiment of FIG. 27 positioned in a vertically extending storage pan mounted (as it would extend on the wall of an auto-rack car), and illustrating one of the storage clasps of the storage assembly of the chock engaging a storage bar in the storage pan.
Figure 44:
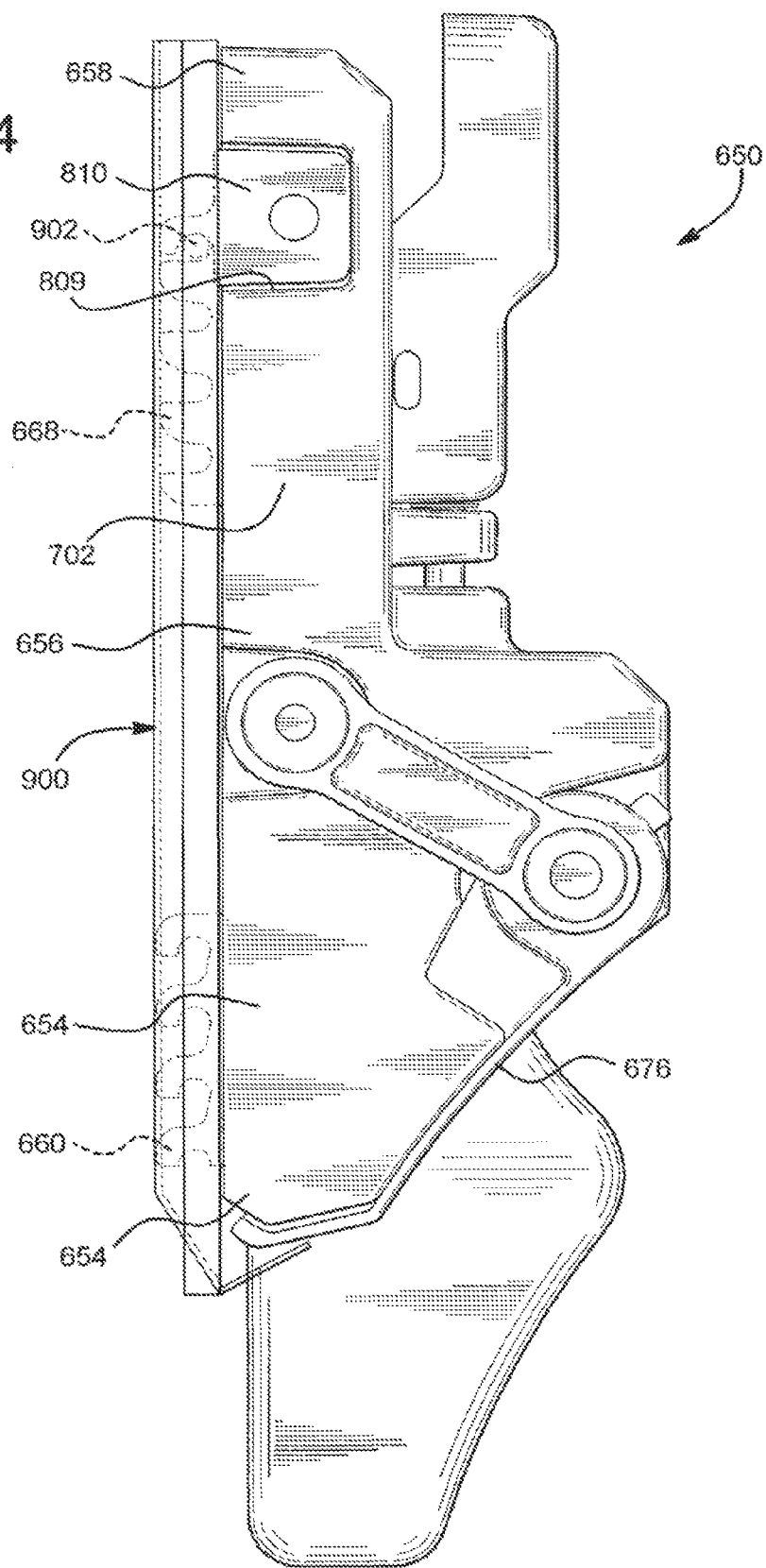
FIG. 44 is a side view of the chock of the embodiment of FIG. 27 positioned in a horizontally extending storage pan (prior to mounting on a wall of auto-rack railroad car), and illustrating one of the storage clasps of the storage assembly engaging a storage bar in the storage pan.
Figure 45:
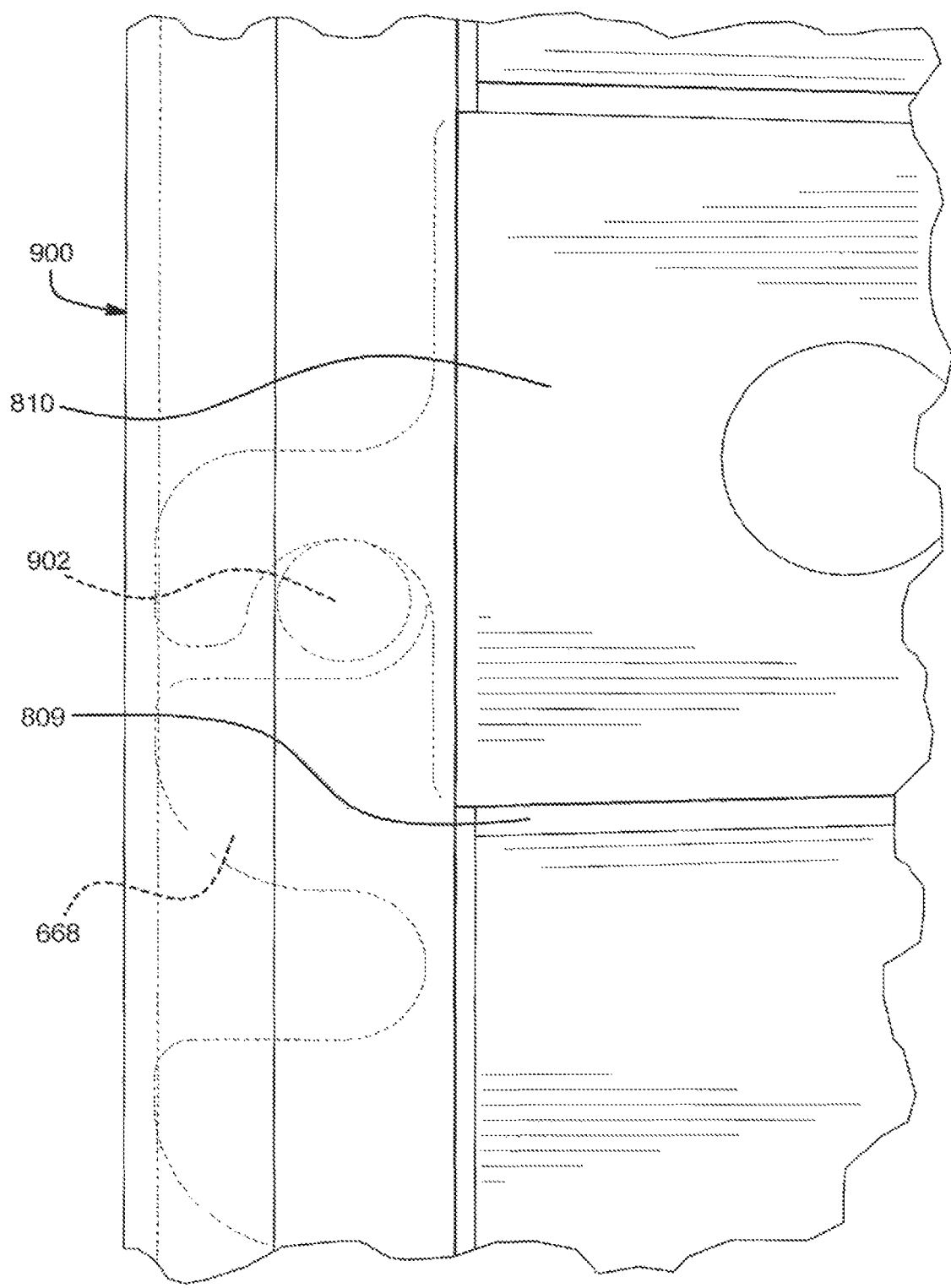
FIG. 45 is an enlarged fragmentary side view of one of the storage clasps of the chock of the embodiment of FIG. 27, positioned in a storage pan, and engaging a storage bar in the storage pan.

Turning now to FIGS. 43, 44, and 45, the chock 650 is positioned in a vertically positioned storage pan (which although not shown, is suitably attached to the inside wall and the side walls of the auto-rack car). The lower clasping portion of the storage clasp 810 of the storage assembly of the chock 650 is engaging the storage cross bar 902 in the storage pan 900. When the chock is not in use, this configuration and placement in the storage pan prevents unwanted movement of the chock and thus damage to the chock and vehicles in the auto-rack railroad car. This embodiment is thus configured to utilize the current storage pans in auto-rack railroad cars.

Figure 46:
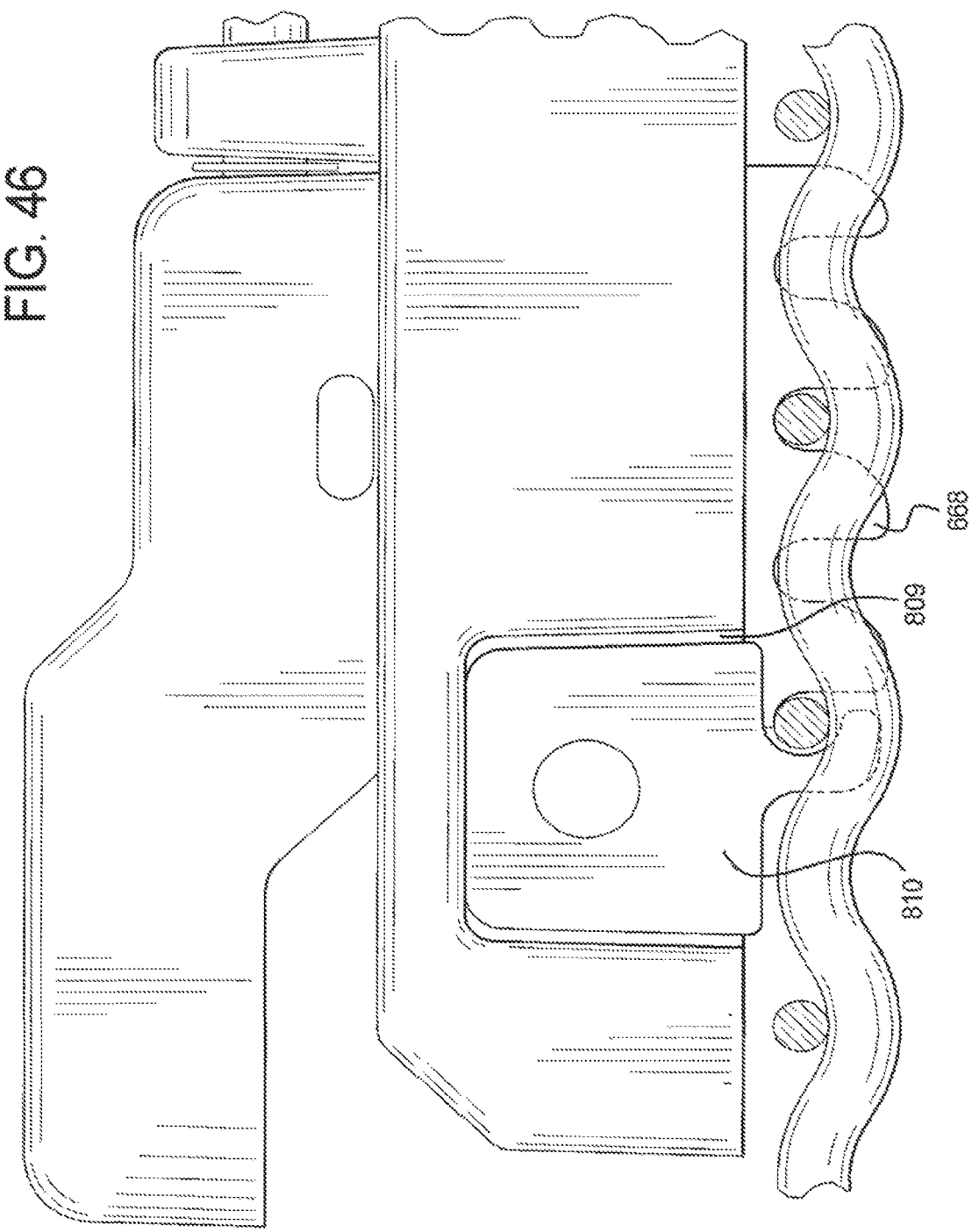
FIG. 46 is an enlarged fragmentary view of the storage clasp of the chock of the embodiment of FIG. 27 positioned on a grating, and illustrating that the storage clasp does not engage any of the grating members and does not hold the chock in place on the grating.

Turning now to FIG. 46, the chock 650 is shown positioned on a grating 46. The lower clasping portion of the storage clasp 810 is not intended to engage the grating members to hold the chock in place on the grating. The lower clasping portion is spaced from the grating members. It should be appreciated that the lower clasping portion can be further positioned or moved more toward the rear of the body 652 so as to not interfere with the grate engagers or teeth 668 of the locking assembly.

It should be appreciated that the chock illustrated in FIGS. 27 to 46 of the present invention provides advantages over the device described in U.S. Pat. No. 6,851,523, such as by providing an alternative locking assembly and by providing the storage clasps. This enables the loader to easily lock and unlock the chock and enables the storage of the chock in the storage pan.

Referring now to FIGS. 47 to 57, a further embodiment of the chock of the present invention is illustrated. The chock of this embodiment is generally indicated by numeral 1050. This illustrated embodiment of the chock 1050 includes: (a) a body 1052 having a front portion 1054, a central portion 1056, and a rear portion 1058; (b) a plurality of grate engagers or teeth 1060 extending downwardly and forwardly from the front portion 1054; (c) a tire engaging assembly at the front portion 1054; (d) a locking assembly 1064 having a locking member 1066 pivotally connected to the rear portion 1058 of the body 1052 and lockable at the central portion 1056 of the body 1052; and (e) a plurality of grate engagers or teeth 1068 extending downwardly from the locking member 1066. Generally, the tire engaging assembly at the front portion 1054 of the body 1052 includes pivotable interacting and interlocking inner and outer tire engagers 1070 and 1076, respectively, configurable in multiple different positions to respectively engage different size tires of multiple different vehicles without engaging the different fenders, moldings, trim or bumpers of those vehicles. Generally, the locking member 1066 of the locking assembly 1064 is pivotally connected to the rear portion 1058 of the body 1052 and is moveable between: (a) an unlocked or released position which facilitates attachment and detachment of the chock 1050 from the grating or wire grid; and (b) a locked position wherein the chock 1050 is secured to the grating or wire grid. When the locking member 1066 is in the locked position, the plurality of grate engagers or teeth 1060 extending downwardly and forwardly from the front portion 1054 of the body 1052 prevent the upward and forward movement of the chock 1050 relative to the grating or wire grid, and the plurality of grate engagers or teeth 1068 extending downwardly from the locking member 1066 prevent the rearward movement of the chock 1050 relative to the grating or wire grid.

Figure 3:
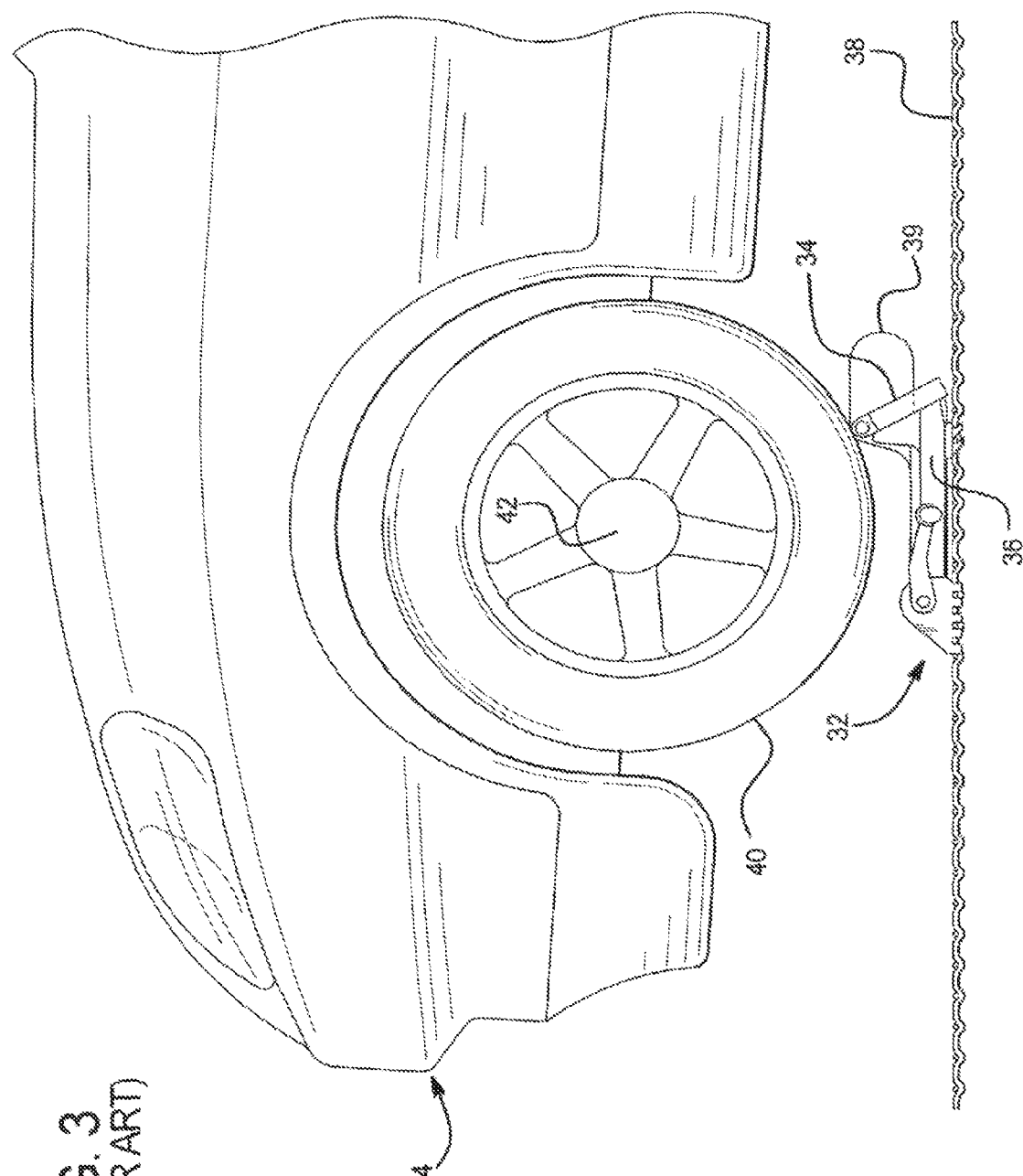
FIG. 3 is a side view of a vehicle which has jumped the prior art restraint illustrated in FIG. 2.
Figure 3A:
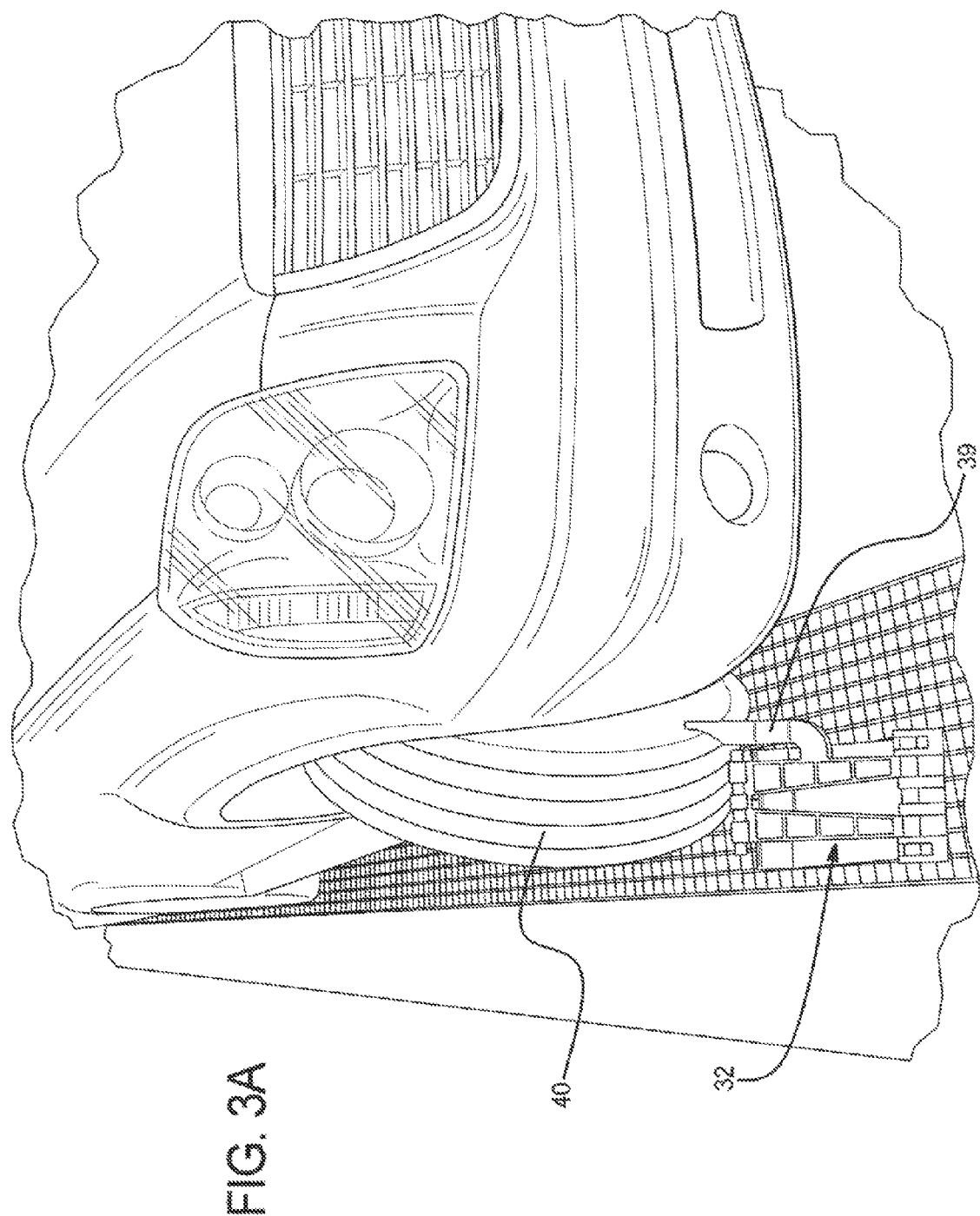
FIG. 3A is a perspective fragmentary view of a vehicle that has literally walked out of the prior art restraint illustrated in FIG. 2.
Figure 3B:
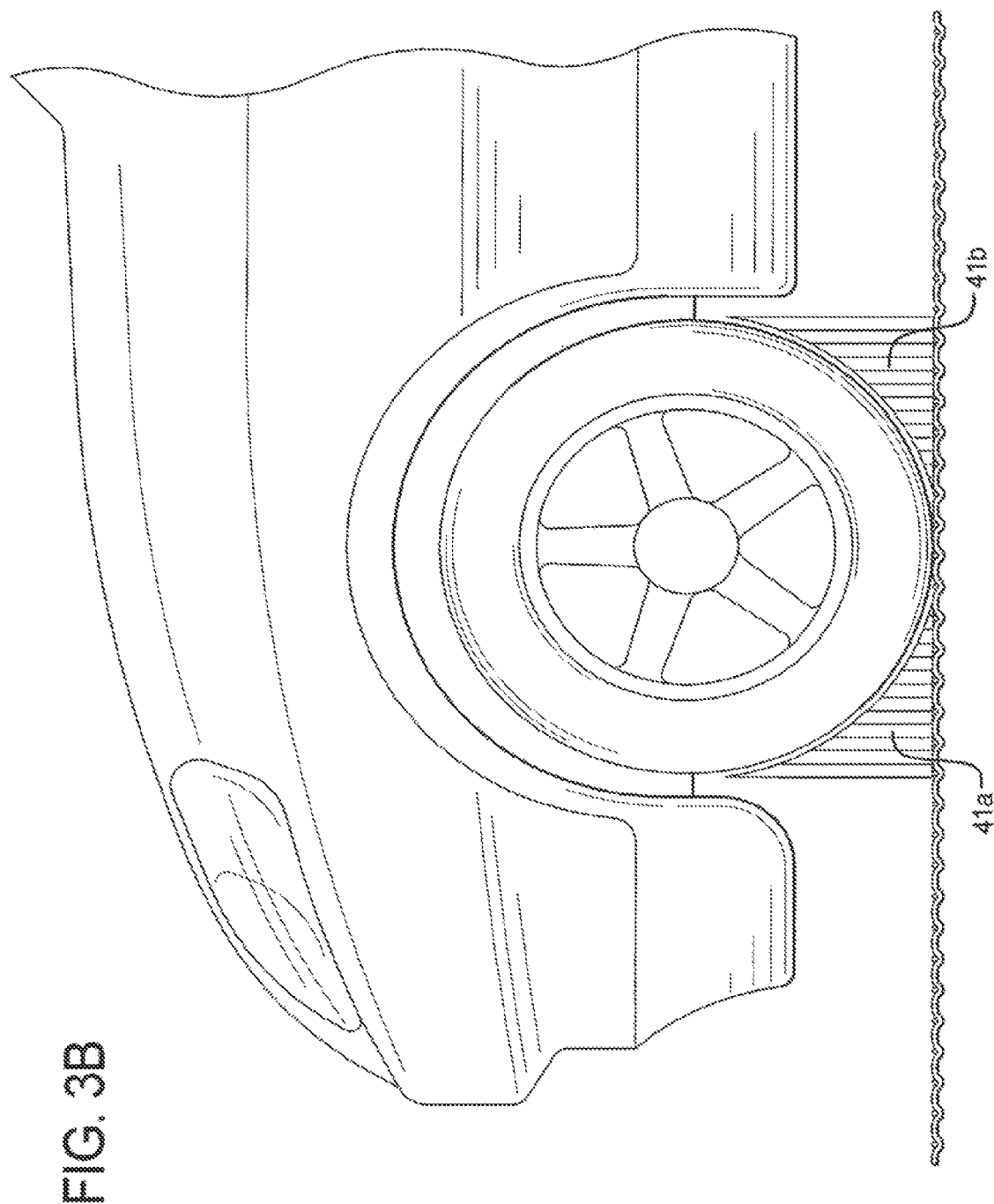
FIG. 3B is a fragmentary side view of a vehicle showing the safe zones around one of the tires of the vehicle.
Figure 4A:
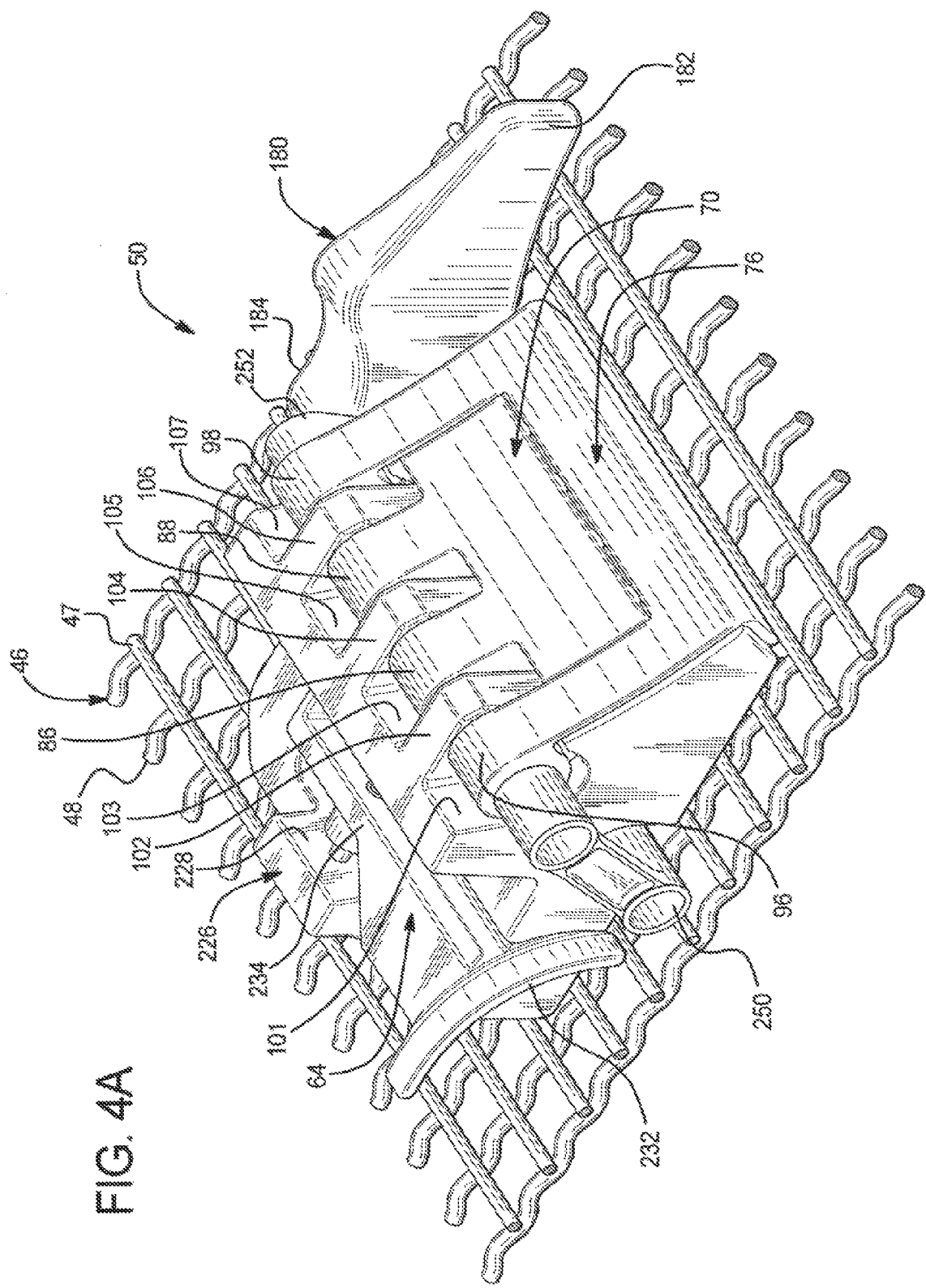
FIG. 4A is a top front perspective view of the chock of one embodiment of the present invention, and illustrating the inner tire engager in a retracted position, the outer tire engager in a retracted position, and the locking member in a locked position on the grating.
Figure 9:
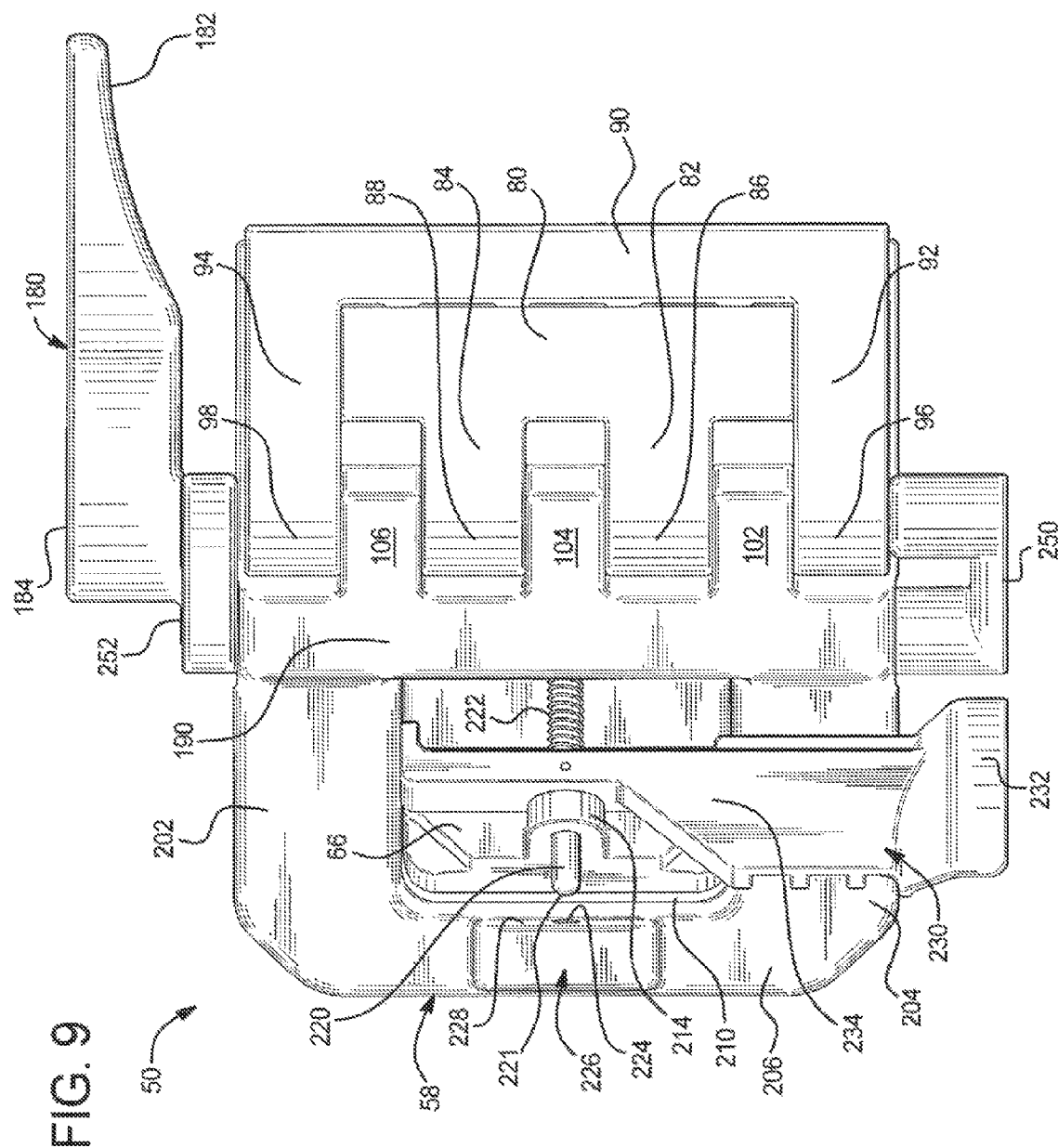
FIG. 9 is a top view of the chock of the embodiment of FIG. 4, and illustrating the inner tire engager in a retracted position, the outer tire engager in a retracted position, and the locking member in an unlocked position.

It should be appreciated that the chock 1050 is configured to operate completely in one of the safe zones adjacent to the tire (as generally illustrated in FIG. 3B) for almost all currently commercially sold vehicles in North America. The present disclosure thus provides a universal chock for these vehicles. This chock enables vehicle manufacturers to continue to ship new vehicles in auto-rack railroad cars on the existing gratings. More specifically, the tire engagers of the chock are configured to remain in the safe zone regardless of the positions of the tire engagers as generally illustrated in FIG. 47A which shows chock 1050 in safe zone 41*a*.

It should also be appreciated that because the chock of the present disclosure operates in the safe zone, the vehicle manufacturers can install air dams on the vehicles at the factory instead of having the dealers install the air dams at the dealership. This substantially saves on overall manufacturing cost and the transportation costs for the air dams.

More specifically, in this illustrated embodiment, the front portion 1054, the central portion 1056, and rear portion 1058 of the body 1052 are integrally formed. In one embodiment, the body 1052 is molded of a liquid thermoset plastics material primarily composed of a plural component liquid monomer mixture which can be molded by a reaction injection molding (RIM) process. The body can alternatively be made from other suitable materials such as nylon, a glass filled nylon, a Dicyclopentadiene, an Acrylonitrile-butadine-styrene, or a polycarbonate. It should further be appreciated that the body could be made from any one or more suitable materials, including other metals, plastics, ceramics and composite materials or combinations thereof. It should also be appreciated that the body illustrated in FIGS. 47 to 52, may be alternatively configured in accordance with the present invention. It should also be appreciated that the body may be formed in multiple sections which are suitably attached.

In this illustrated embodiment, part of the front portion 1054 of the body 1052 functions as part of the tire engaging assembly and is configured to mate with and co-act with the inner and outer tire engagers 1070 and 1076. The front side of inner tire engager 1070 and the front side of the outer tire engager 1076 are each configured to mate with and co-act with the top and forward side of the front portion 1054 of the body 1052 when the inner and outer tire engagers 1070 and 1076 are respectively in the retracted positions such that the back side of inner tire engager 1070 and the back side of outer tire engager are positioned to engage a tire. The top side of the front portion 1054 of the body 1052 and the front side of inner tire engager 1070 are also configured co-act when the inner tire engager 1070 is in the extended position such that the front side of inner tire engager 1070, the top side of the front portion 1054, and the back side of outer tire engager are positioned to engage the tire. The top side of the front portion 1054 of the body 1052, the front side of inner tire engager 1070, and the front side of the outer tire engager 1076 are also configured co-act when the inner tire engager 1070 and the outer tire engager 1076 are both in the extended position such that the front side of inner tire engager 1070, the front side of the outer tire engager 1076, and the top side of the front portion 1054 are positioned to engage the tire.

Figure 51:
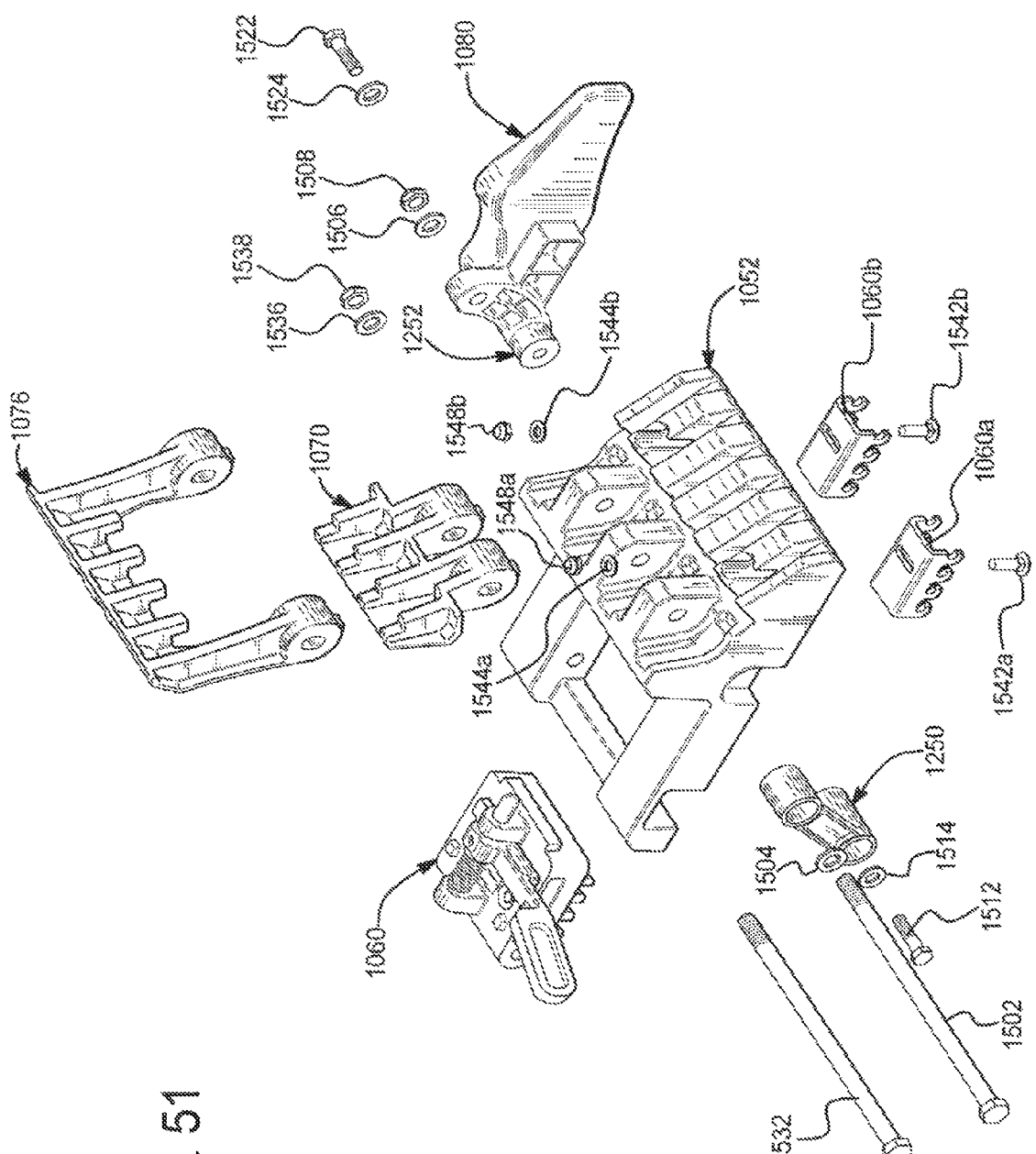
FIG. 51 is an exploded perspective view of the chock of the embodiment of FIG. 47.

As best illustrated in FIGS. 51 and 53, the inner tire engager 1070 includes a body 1080 and two spaced apart arms 1082 and 1084 connected to and extending from the body 1080. The arms 1082 and 1084 have hands or pivot ends 1086 and 1088, respectively.

As best illustrated in FIGS. 51 and 54, the outer tire engager 1076 includes a body 1090 and two spaced apart arms 1092 and 1094 connected to and extending from the body 1090. The arms 1092 and 1094 have hands or pivot ends 1096 and 1098. The arms 1092 and 1094 and the body 1090 of the outer tire engager 1076 define a central open area sized and shaped to receive the inner tire engager 1070.

Figure 47:
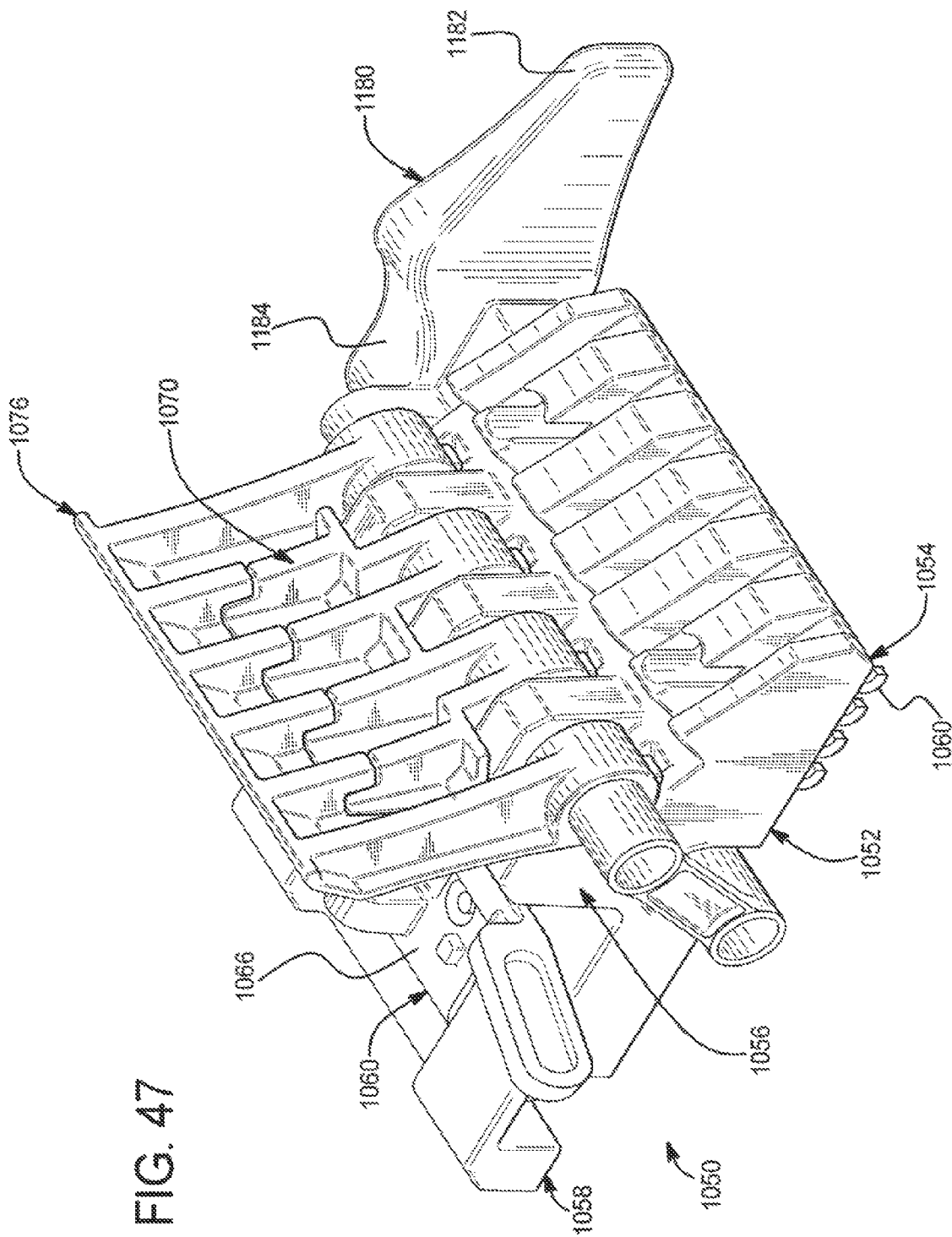
FIG. 47 is a top front perspective view of the chock of an alternative embodiment of the present invention, and illustrating the inner tire engager in an extended position, the outer tire engager in an extended position, and the locking member in a unlocked position.
Figure 47A:
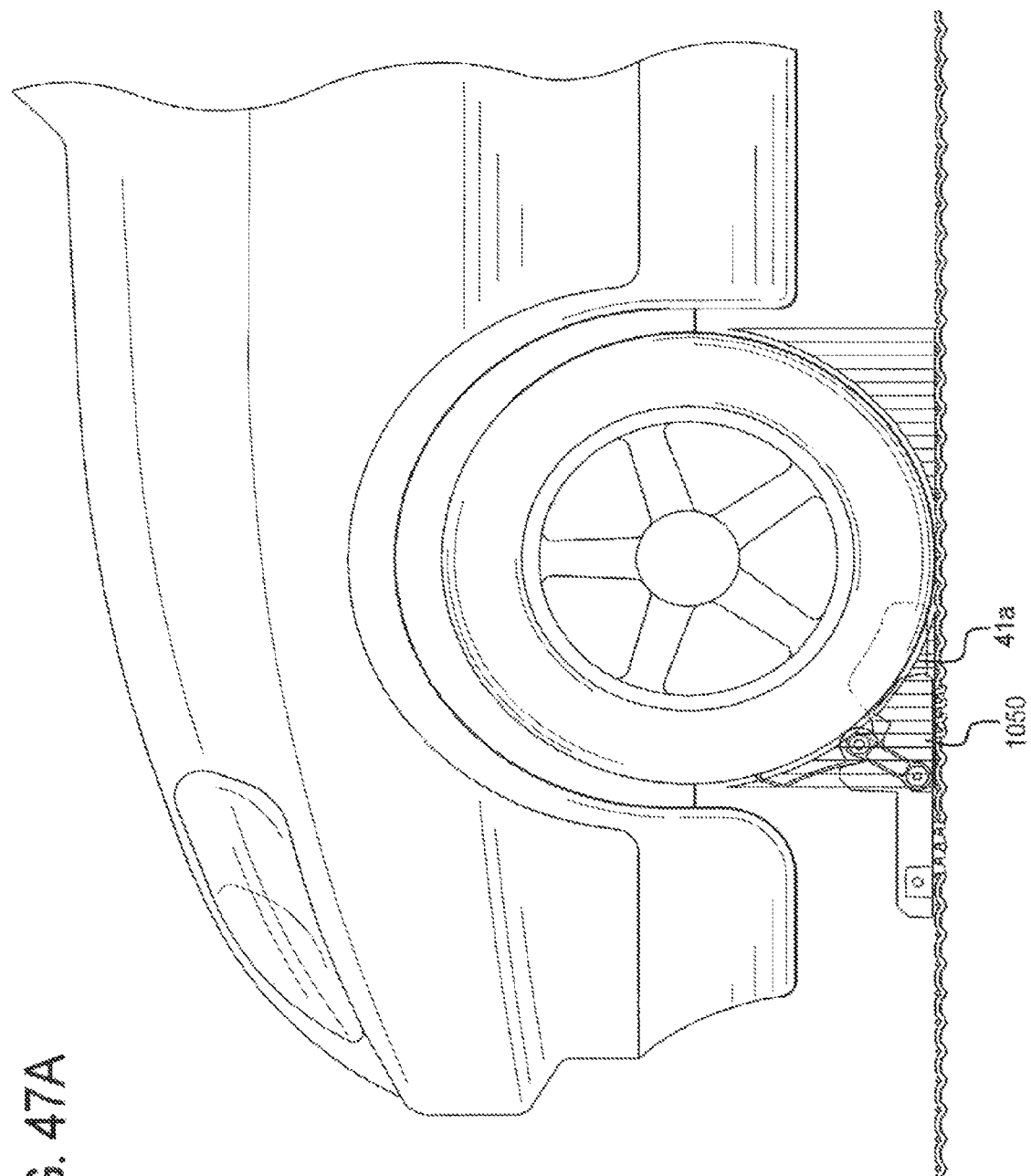
FIG. 47A is a fragmentary side view of a vehicle having a chock of the present disclosure adjacent to the tire and operating in the safe zone.

When the inner tire engager 1070 and the other tire engager 1076 are both in either the retracted position or the extended position (as best seen in FIG. 47), they co-act to form a wall for engaging the tire. In one embodiment, the inner and outer tire engagers are both molded from a liquid thermoset plastics material primarily composed of a plural component liquid monomer mixture which can be molded by a reaction injection molding (RIM) process. The tire engagers can alternatively be made from a nylon, a glass filled nylon, a Dicyclopentadiene, an Acrylonitrile-butadine-styrene, or a polycarbonate. In one embodiment, the tire engagers are made from the same material and in alternative embodiments, the tire engagers may be made from different materials or different strength materials. In one such embodiment, the outer tire engager is made from a glass filled polyurethane and the inner tire engager is made from a glass filled nylon. It should further be appreciated that the tire engagers could be made from any one or more suitable materials, including other metals, plastics, ceramics and composite materials or combinations thereof. It should also be appreciated that the configurations and sizes of the inner and outer tire engagers or portions thereof may vary in accordance with the present invention.

The tire engagers 1070 and 1076 co-act with the front portion 1054 of the body 1052 to form the tire engaging assembly. More specifically, as best seen in FIGS. 47, 51, 52 and 52A, the front portion 1054 of the body 1052 includes: (a) upwardly extending tire engager supports 1102, 1104, and 1106 which are configured to pivotally support the inner and outer tire engagers 1070 and 1076; (b) semi-cylindrical pivot areas 1101 and 1107 extending respectively inwardly from the outer sides of the body 1052 to the tire engager supports 1102 and 1106, respectively and configured to receive pivot ends 1096 and 1098 of the outer tire engager 1070; and (c) semi-cylindrical pivot areas 1103 and 1105 extending respectively between tire engager supports 1102, 1104, and 1106 and configured to receive the pivot ends 1086 and 1088 of the inner tire engager 1070. The pivot areas 1101, 1103, 1105, and 1107 respectively include or define securing slots 1420, 1422, 1424, and 1426 for receiving securing tongues 1410, 1412, 1414, and 1416 as further discussed below, and tongue clearance areas 1101a, 1103a, 1105a, and 1107a which allow the inner and outer tire engagers to rotate without interference between the securing tongues 1410, 1412, 1414, and 1416 and the upper surface of the front portion 1054 of the body 1052. The front portion 1054 of the body 1052 also includes: (a) laterally spaced apart upwardly extending reinforcing ribs or supports 1112, 1114, 1116, 1118, 1120, 1122, and 1124 which are configured to support the inner and outer tire engagers 1070 and 1076 when they are in the retracted positions; and (b) laterally spaced-apart tire engager receipt areas or recesses 1113, 1115, 1117, 1119, 1121, and 1123 configured to receive the inner and outer tire engagers 1070 and 1076 when they are in the retracted positions.

As best seen in FIGS. 47, 51, and 53, the front side of the inner tire engager 1070 includes laterally spaced apart outwardly extending reinforcing ribs or supports 1132, 1134, 1136, and 1138 configured to be received in the spaced-apart tire engager receipt areas or recesses 1115, 1117, 1119, and 1121 when the inner tire engager 1070 is in the retracted position. The inner tire engager 1070 also includes laterally spaced-apart body receipt areas or recesses 1131, 1133, 1135, 1137, and 1139 (see FIG. 53) configured to receive laterally spaced-apart upwardly extending reinforcing ribs or supports 1114, 1116, 1118, 1120, and 1122 of the body 1052 when the inner tire engager 1070 is in the retracted position.

As best seen in FIGS. 47, 51 and 54, the front side of the outer tire engager 1076 includes laterally spaced-apart downwardly extending reinforcing ribs or supports 1142, 1144, 1146, 1148, 1150, and 1152 (See FIG. 54) configured to be received in the spaced-apart tire engager receipt areas or recesses 1113, 1115, 1117, 1119, 1121, and 1123 when the outer tire engager 1076 is in the retracted position. The outer tire engager 1076 includes laterally spaced-apart body receipt areas or recesses 1141, 1143, 1145, 1147, 1149, 1151, and 1153 configured to receive laterally spaced-apart upwardly extending reinforcing ribs or supports 1114, 1116, 1118, 1120, and 1122 of the body 1052 when the outer tire engager 1076 is in the retracted position.

Figure 59:
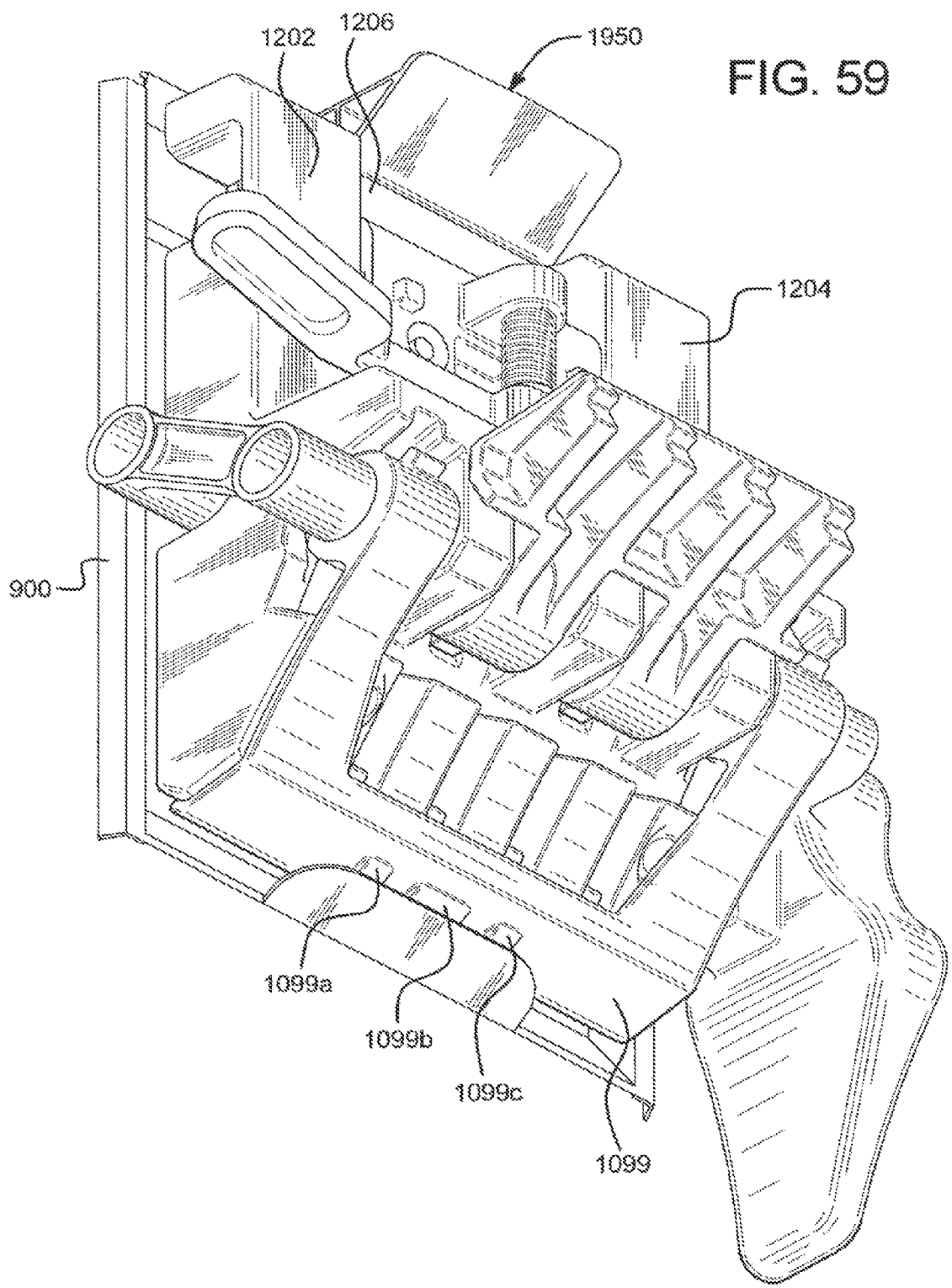
FIG. 59 is a perspective view of a chock held in a storage pan attached to a side wall of an auto-rack railroad car by the bracket of FIG. 58.
Figure 60:
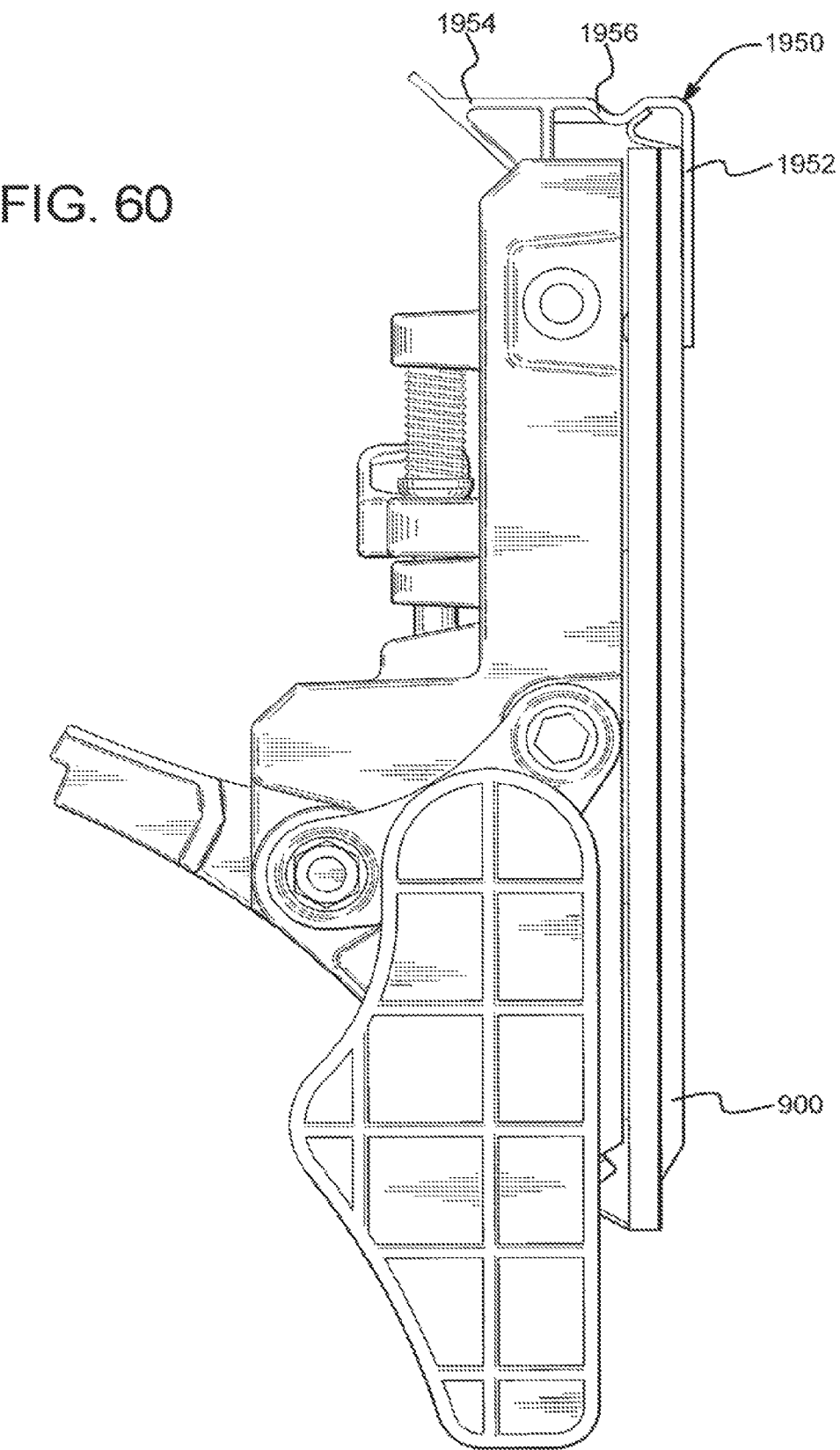
FIG. 60 is a side view of a chock held in a storage pan attached to a side wall of an auto-rack railroad car by the bracket of FIG. 58.

The outer tire engager 1076 also includes a lip 1099 (see FIG. 54) for providing additional structural support of the outer tire engager 1070. When the outer tire engager 1076 is in the retracted position, the lip 1099 extends downwardly and toward the body 1052. When the outer tire engager 1076 is in the extended position, the lip 1099 extends outwardly toward the tire. The outer tire engager 1076 also includes storage member locking fingers 1099a, 1099b and 1099c extending from the outer surface of the lip 1099 for engaging the bottom portion of the storage pan as best illustrated in FIGS. 54, 59 and 60 and as further described below.

Figure 50:
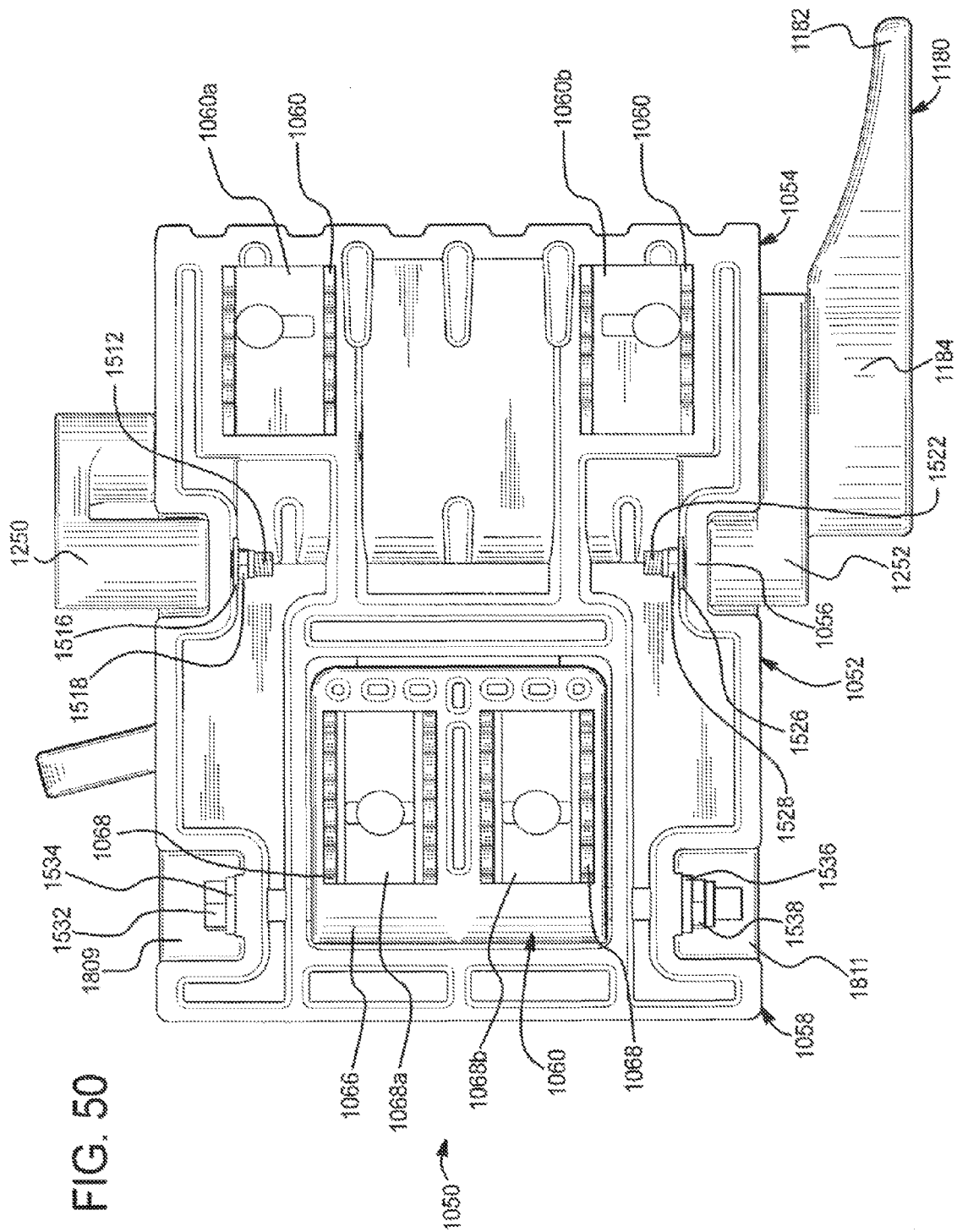
FIG. 50 is a bottom view of the chock of the embodiment of FIG. 47, wherein the outer tire engager is in an extended position and the illustratory locking member in a locked position.

The inner tire engager 1070 and the outer tire engager 1076 are each pivotally attached to the body 1052 by a suitable first pivot member. More specifically, in the illustrated embodiment as best seen in FIG. 51, the first pivot member includes a bolt 1502, a first washer 1504, a second washer 1506, and a nut 1508. It should be appreciated that the first pivot member could be configured in other suitable manners. The bolt 1052 extends through pivot ends 1096 and 1098 of the outer tire engager 1076, pivot ends 1086 and 1088 of the inner tire engager 1070, tire engager supports 1102, 1104 and 1106 of the body 1052 to enable the inner and outer tire engagers 1070 and 1076 to independently pivot relative to the body 1052, and pivot connection bars or brackets 1250 and 1252. The first pivot member thus attaches the pivot connection brackets 1250 and 1252 to the body 1052 of the chock 1050. The pivot connection bracket 1250 is also attached to the body 1052 of the chock 1050 by a suitable fastener such as a bolt 1512, a first washer 1514, a second washer 1516, and a nut 1518 as seen in FIGS. 50 and 51. The pivot connection bracket 1252 (and the paddle 1180) is also attached to the body 1052 of the chock 1050 by a suitable fastener such as a bolt 1522, a first washer 1524, a second washer 1526, and a nut 1528 as also seen in FIGS. 50 and 51. The pivot connection brackets 1250 and 1252 provide additional structural integrity to the tire engaging assembly. It should also be appreciated that these pivot connection brackets, pivot members and fasteners are configured to facilitate the replacement of the inner and outer tire engagers in the event such tire engagers break. As mentioned above, bracket 1252 also functions as a handle for the chock 1050.

It should be appreciated that the pivot connection brackets and the paddle may be made from any suitable materials. In one embodiment, the paddle is molded from a glass filled nylon. In one embodiment, the brackets are molded from an Acrylonitrile-butadine-styrene. It should also be appreciated that the these components may be alternatively configured and sized n accordance with the present disclosure.

It should be appreciated that such inner and outer tire engagers 1070 and 1076 are configured in certain embodiments to break upon a designed amount of pressure placed on such tire engagers by a tire as described in detail above. This construction prevents damage to the internal components of the vehicle as described above.

As indicated above and best illustrated in FIGS. 47, 51, 53, and 54, the inner and outer tire engagers 1070 and 1076 are configured to be coupled together, interconnected or interlocking. The reinforcing ribs or supports 1132, 1134, 1136, and 1138 of the inner tire engager 1070 respectively include indentations, slots or steps 1162, 1164, 1166, and 1168 (see FIGS. 51 and 53) configured to respectively receive connecting protrusions, pins or steps 1172, 1174, 1176, and 1178 (see FIGS. 51 and 54) extending from the reinforcing ribs or supports 1144, 1146, 1148, and 1150 of the outer tire engager 1076. This configuration enables the inner and outer tire engagers 1070 and 1076 to co-act such that when the inner and outer tire engagers 1070 and 1076 are in the retracted position and the outer tire engager 1076 is moved from the retracted position to the extended position, the outer tire engager 1076 causes the inner tire engager 1070 to also move from the retracted position to the extended position. This configuration enables a loader to easily move both the inner and outer tire engagers 1070 and 1076 to their respective extended positions. If the loader desires to just move the inner tire engager 1070 to its extended position (and to have the outer tire engager 1076 in the retracted position), after this rotation of both tire engagers, the outer tire engager 1076 can be disengaged or decoupled from the inner tire engager 1070 and rotated back to its retracted position, leaving the inner tire engager 1070 in its extended position. This configuration also provide substantial support by the inner tire engager 1070 for the outer tire engager 1076. In other words, when both tire engagers are in the extended positions, and pressure by a tire is applied to the upper portion of the outer tire engager, the interlocking steps of the inner and outer tire engagers provide additional support for the outer tire engager.

It should be appreciated that the central portion 1056 of the body 1052 also serves to support the inner and outer tire engagers 1070 and 1076 when each of them are in the extended position. More specifically, when the inner tire engager 1070 is in the extended position, it rests against the support section 1190 of the central portion 1056 of the body 1052. Likewise, when the outer tire engager 1076 is in the extended position, it rests against the support section 1190 of the central portion 1056.

When the inner and outer tire engagers 1070 and 1076 are pivotally attached to the body 1052, the securing tongues 1410, 1412, 1414, and 1416 of the inner and outer tire engagers 1070 and 1076 are configured to move within the tongue clearance areas 1101a, 1103a, 1105a, and 1107a of the pivot areas 1101, 1103, 1105, and 1107 to enable rotation from the retracted positions to the extended positions, and from the extended positions to the retracted positions without interference. More specifically, the pivot ends 1086 and 1088 (see FIG. 53) of the inner tire engager 1070 respectively define or include oval pivot member adjustment or rotation slots 1086a and 1088a, and the pivot ends 1096 and 1098 (See FIG. 54) of the outer tire engager 1076 respectively define or include oval pivot member adjustment or rotation slots 1096a and 1098a. These oval pivot member adjustment or rotation slots enable the inner and outer tire engagers 1070 and 1076 to first be rotated to an intermediate extended position where the securing tongues 1410, 1412, 1414, and 1416 are not in the securing slots 1420, 1422 1424, and 1426, and then moved downwardly to the locked extended position such that the securing tongues 1410, 1412, 1414, and 1416 are in the securing slots 1420, 1422, 1424, and 1426. The tongues are received in the respective slots to prevent undesired rotation or pivoting of the respective inner and outer tire engagers after they have been positioned in the locked extended positions by a loader. It should be appreciated that in alternative embodiments, when one or both of the inner and outer tire engagers are rotated, they are in the locked extended positions and do not need to be moved downwardly. It should also be appreciated that the inner and outer tire engagers can be of other suitable configurations and can interlock or otherwise interact in other suitable manners.

The chock 1050 includes a paddle 1180 attached to the central portion 1056 of the body 1052 to prevent lateral movement of the tire. In the illustrated embodiment, the paddle 1180 is attached to the body 1052 by bracket 1252. In the illustrated embodiment, the paddle 1180 is integrally formed with the bracket 1252. In alternative embodiments, the paddle 1180 and the bracket 1252 may be separate components. In the illustrated embodiment, the paddle 1180 includes a forward tire engaging portion 1182 configured to engage the side of the tire and a rear stabilizing portion 1184 integrally connected to the connection bracket 1252 for stability. When the tire exerts pressure on the forward tire engaging portion 1182 of the paddle 1180, the bracket 1252 and the rear stabilizing portion 1184 serve to stabilize the paddle 1180. It should be appreciated that the paddle 1180 does not move with either of the tire engagers 1070 or 1076 and is configured to engage the side of the tire at a relatively low position regardless of the position of the tire engagers. One advantage of this configuration is that the paddle is always positioned in a safe zone, and thus will not interfere with the fender of the vehicle. Another advantage is that the paddle 1180 is in the low position to prevent lateral shifting of the tire and prevent the tire from walking out of the chock. It should be appreciated that the paddle can be configured and attached to the body in other suitable manners.

Turning now to the locking assembly 1064, the central portion 1056 and the rear portion 1058 of the body 1052 are configured support the locking assembly 1064. More specifically, the rear portion 1058 of the body 1052 includes spaced-apart side walls 1202 and 1204 and a rear wall or base 1206 interconnecting and extending between the side walls or bases 1202 and 1204. The side walls or bases 1202 and 1204 are connected to the central portion 1056 of the body 1052 and extend rearwardly from the central portion 1056. The central portion 1056 and the side walls 1202 and 1204 and rear wall or base 1206 of the rear portion 1058 of the body 1052 define a locking member receiving area 1210 in which the locking member 1066 of the locking assembly 1064 is movably or rotatably positioned.

The locking member 1066 is generally rectangular and sized and configured to be positioned in the locking member receiving area 1210. In one embodiment, the locking member is molded of a liquid thermoset plastics material primarily composed of a plural component liquid monomer mixture which can be molded by a reaction injection molding (RIM)

process. The locking member can alternatively be made from a nylon, a glass filled nylon, a Dicyclopentadiene, an Acrylonitrile-butadine-styrene, or a polycarbonate. It should further be appreciated that the locking member could be made from any one or more suitable materials, including other metals, plastics, ceramics and composite materials or combinations thereof.

More specifically, the locking member 1066 is pivotally connected to the rear portion 1058 of the body 1052 by a second pivot member. The second pivot member in the illustrated embodiment includes a bolt 1532, a first washer 1534, a second washer 1536, and a nut 1538 as seen in FIGS. 50 and 51. It should be appreciated that other suitable pivot assemblies can be employed. In the illustrated embodiment, the rear portion 1058 of the body 1052 includes two recess areas 1809 and 1811 (see FIG. 50) configured to facilitate such pivotal attachment of the locking member 1066 to the body 1052.

Turing now to FIGS. 48, 49, 51, 51A, 55, 56, 56A, and 57, the locking member 1066 includes front and rear upwardly projecting bosses 1212 and 1214 configured to receive and support a locking pin 1220 for axial movement. The locking pin 1220 is positioned in or extends though the bosses 1212 and 1214 and a compression spring 1222 is journaled about the locking pin 1220 between the bosses 1212 and 1214. The compression spring 1222 biases the locking pin 1220 forwardly to its normal or resting position (through the handle as discussed below). The free end 1221 of the locking pin 1220 extends forwardly from boss 1212 and is configured to be received in a locking notch 1224 in the central portion 1056 of the body 1052 (as best illustrated in FIG. 52A). The locking area or surface 1226 includes a sloped rearwardly facing biasing wall 1228 as best seen in FIG. 52A and as also well illustrated in FIG. 60). If the biasing wall is appropriately sloped, in one embodiment, when the locking member 1066 is pivoted downwardly from the unlocked position, toward the locked position, the free end 1221 of the locking pin 1220 engages the sloped biasing wall 1228 of the locking area or surface 1226 which causes the locking pin 1220 to be biased against the compression spring 1222 journaled about the locking pin 1220. When the free end 1221 of the locking pin 1220 reaches the locking notch 1224, the compression spring 1222 causes the locking pin 1220 to move into the locking notch 1224 and thus secure the locking member 1066 in the locked position. This movement of the locking pin 1220 can and in certain embodiments is accomplished by the handle 1230 as discussed below.

In the illustrated embodiment, the handle 1230 of the locking assembly 1060 is pivotally attached to the locking member 1066 and configured to actuate the locking pin 1220 axially (against the compression spring 1222) to facilitate the unlocking of the locking member 1066. In the illustrated embodiment, the handle 1230 includes a hand grasp 1233, an actuation arm 1234 attached to the hand grasp 1233, an actuation hand 1235 attached to the actuation arm 1234, and a pivot finger or lever 1236 attached to the actuation hand 1235. More specifically, the pivot finger or lever 1236 is pivotally attached to the locking member 1066 by a pivot pin 1237. The pivot pin 1237 is configured to be received in a pivot hole 1213a in the locking member 1066. The handle 1230 is configured to pivot about the pivot pin 1237. The actuation hand 1235 defines a horizontally or substantially horizontally extending locking pin opening 1239 sized and configured such that the locking pin 1220 extends through the locking pin opening 1239. The actuation hand 1235 also defines a pair of aligned vertically or substantially vertical extending oval roll or engagement pin openings 1241 and 1243 sized and configured such that a roll or engagement pin 1242 attached to the locking pin 1220 extends upwardly from the locking pin 1220 through the roll or engagement pin openings 1241 and 1243. The locking assembly 1060 also includes an actuation bearing 1245 slidably mounted on the locking pin 1220 and positioned adjacent to the rear side of the actuation hand 1235 next to the compression spring 1222.

Figure 49:
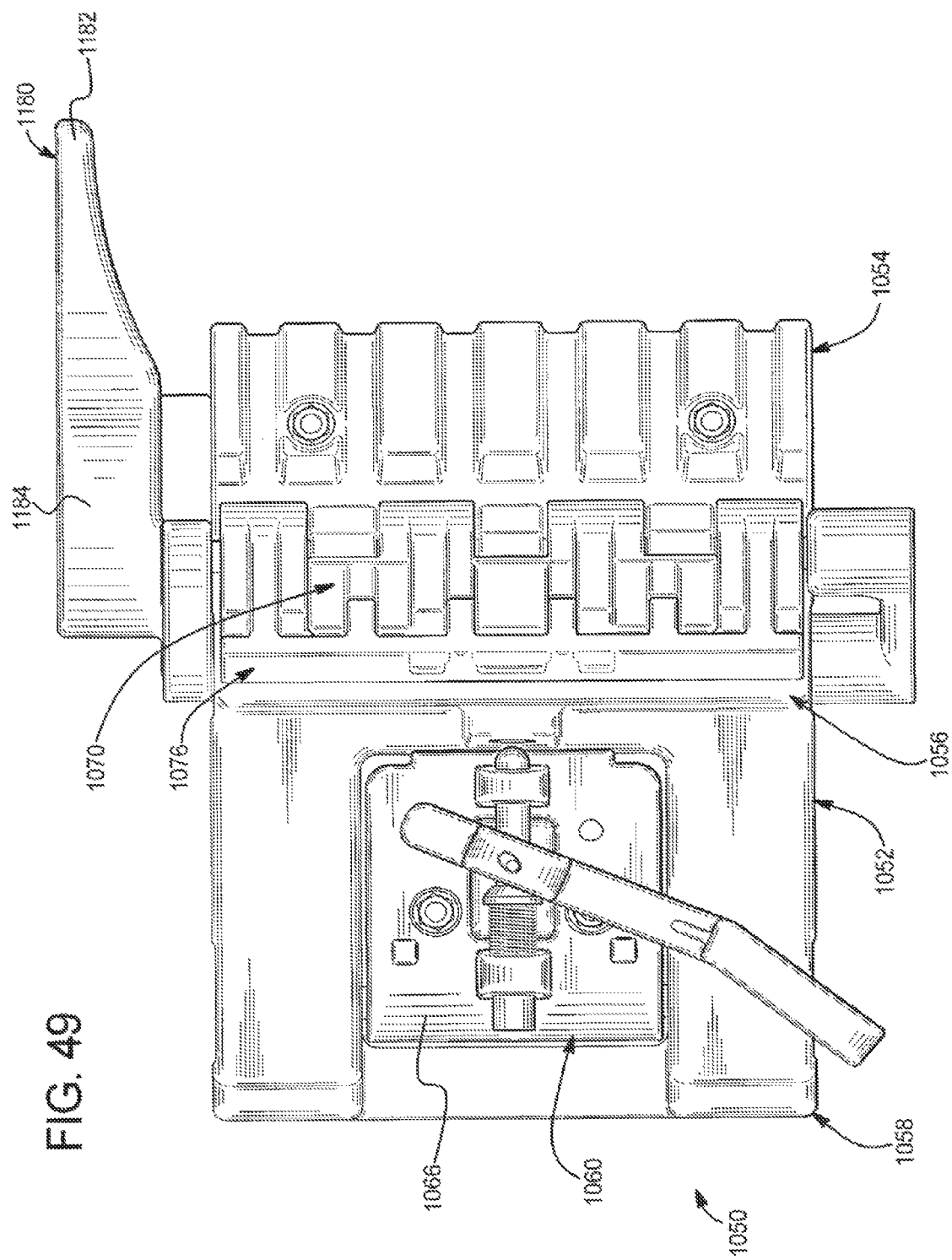
FIG. 49 is a top view of the chock of the embodiment of FIG. 47, and illustrating the inner tire engager in an extended position, the outer tire engager in an extended position, the locking pin in an unlocked position and the handle of the locking assembly in an actuated position.
Figure 57:
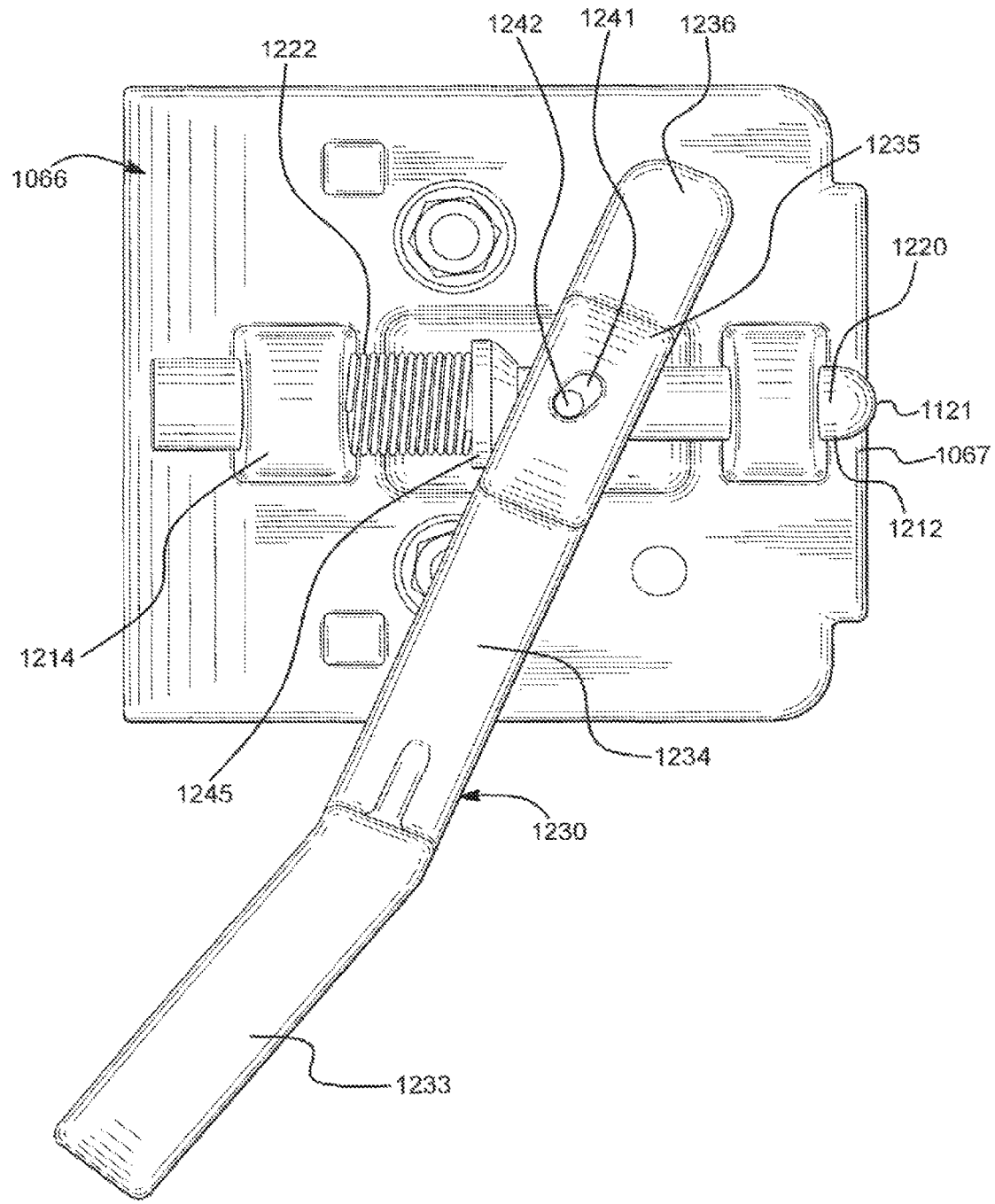
FIG. 57 is an enlarged top view of the locking member of the chock of the embodiment of FIG. 47, and illustrating the locking pin in the unlocked position and the handle in the actuated position.

In operation, the handle 1230 is moveable from a resting position as illustrated in FIGS. 48, 55, and 56 to an actuation or actuated position as illustrated in FIGS. 49 and 57. When the handle 1230 is moved from the resting position to the actuated position, the actuation hand 1235 causes the roll or engagement pin 1242 to move rearwardly which in turn causes the locking pin 1220 to move rearwardly and to be released from the locking notch 1224 (see FIG. 52A). In other words, the force applied against the hand grasp 1233 causes a rearward force against the locking pin 1220. When the handle 1230 is moved from the resting position (see FIG. 56) to the actuated position (see FIG. 57), the roll or engagement pin 1242 (which is attached to the locking pin 1220) moves from the front of the roll or engagement pin openings 1241 and 1243 (see FIG. 56) to the rear of the roll or engagement pin openings 1241 and 1243 (see FIG. 57). This configuration also limits the movement of the handle and the locking pin. When the locking pin is disengaged from the locking notch 1224 (see FIG. 52A), the locking member 1066 can be upwardly rotated to release the locking assembly from the grating. It should be appreciated that the hand grasp 1233 is sized and configured to enable a loader to lock and unlock the locking member 1066 of the locking assembly 1064 without placing the loaders hand under the vehicle which thus also limits damage to the vehicle and injury to the loader or unloader.

It should also be appreciated that when the handle is actuated rearwardly, the compression spring 1222 biases the actuation bearing 1245 forwardly, which in turn applies a forward force to the actuation handle 1235, which in turn applies a forward force to the roll or engagement pin 1242, which in turn applies a forward force to the locking pin 1220.

It should be appreciated that locking assembly and the components can be made from any suitable materials. For instance, in one embodiment, the locking member 1066 and the handle 1230 made from a glass filled nylon. It should also be appreciated that one or more of the components of the locking assembly may be alternatively configured. It should also be appreciated that a suitable clip may be employed to more maintain the locking pin in the bosses.

It should be appreciated that the illustrated locking assembly has the handle extending from the right side, and that the locking assembly and handle can be alternatively configured such that the handle extends from the left side. In such embodiment, the pivot pin 1237 would be positioned in pivot hole 1213b illustrated in FIG. 51A.

Figure 37:
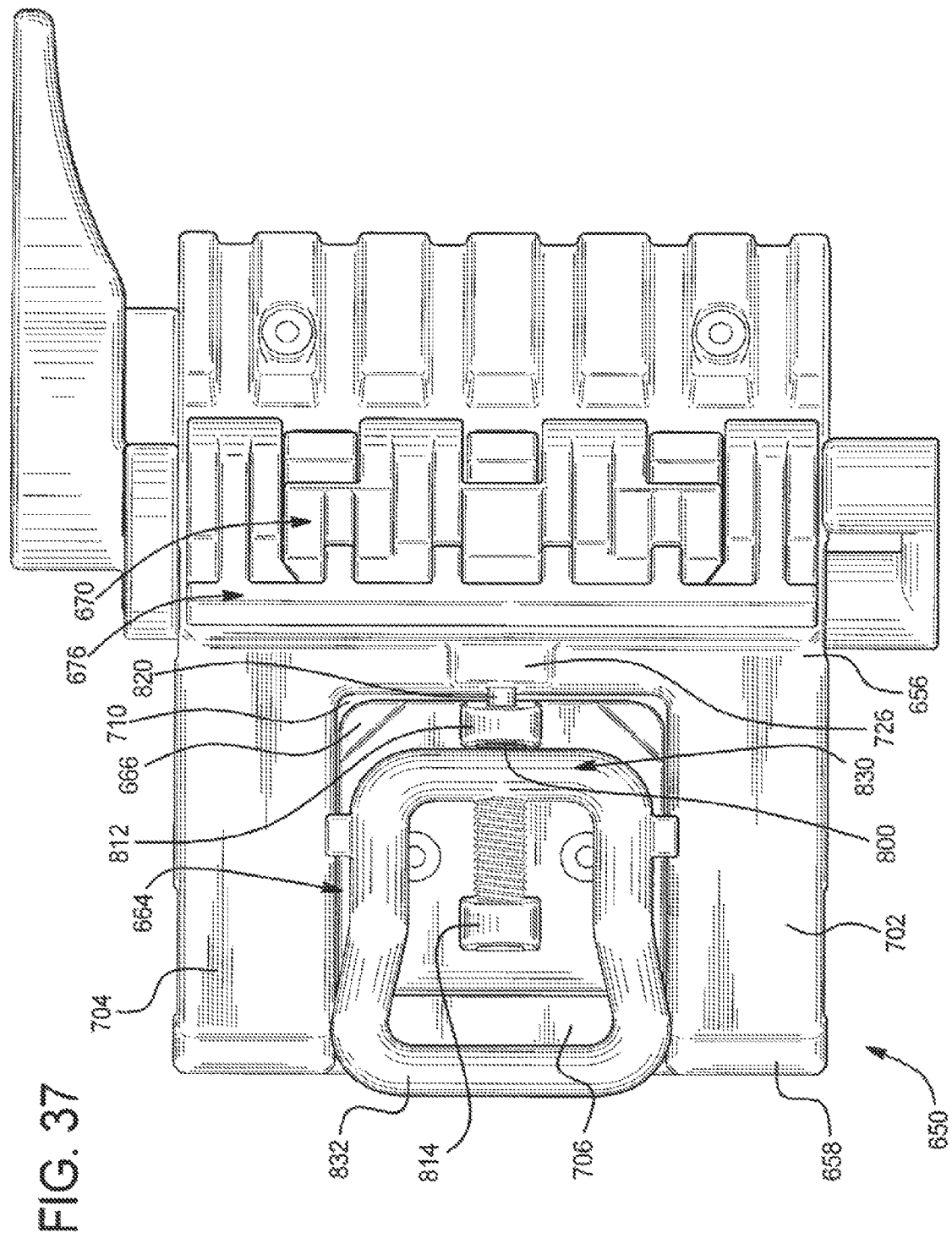
FIG. 37 is a top view of the chock of the embodiment of FIG. 27, and illustrating the inner tire engager in an extended position, the outer tire engager in an extended position, and the locking member in a locked position.
Figure 38:
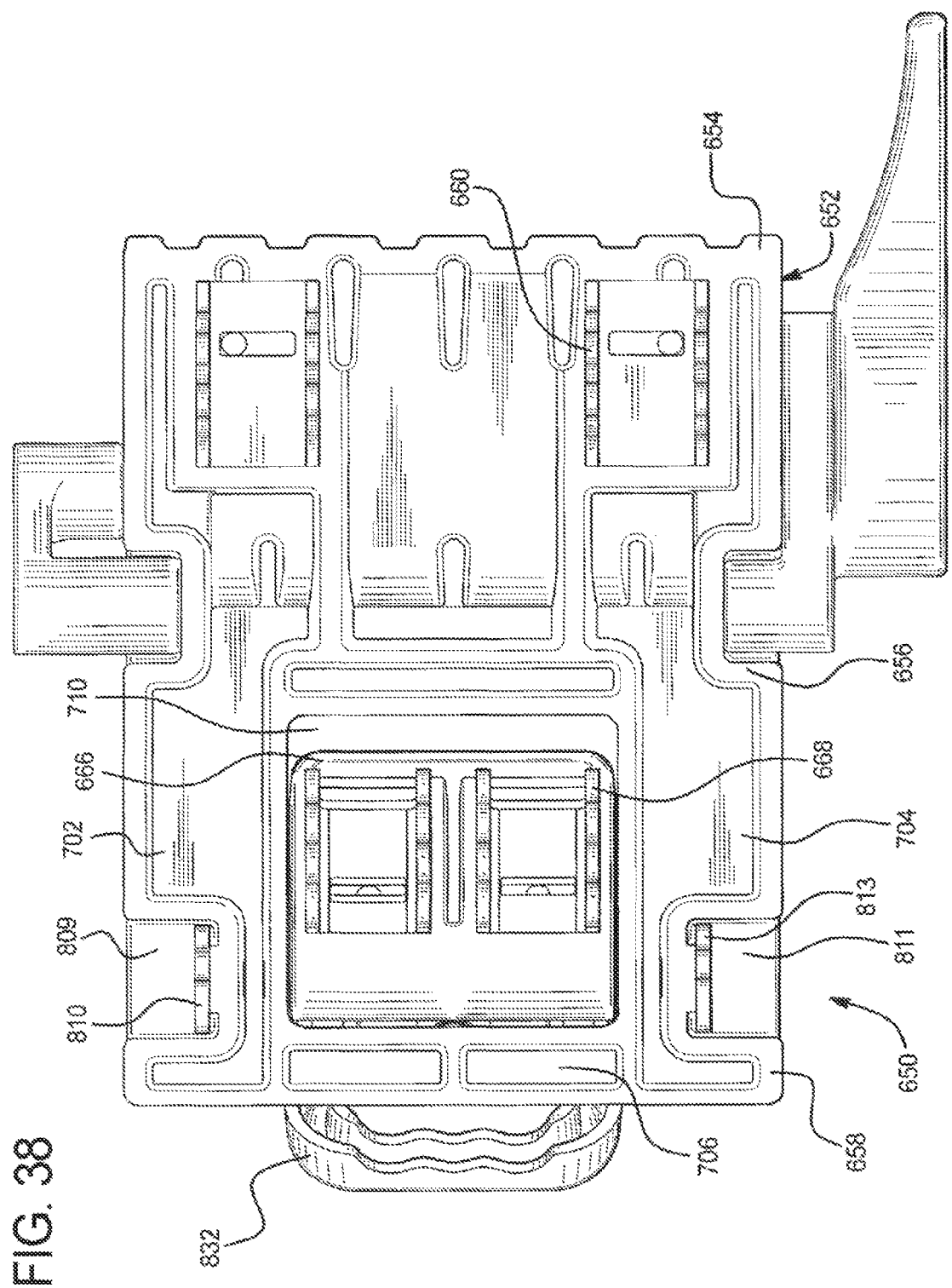
FIG. 38 is a bottom view of the chock of the embodiment of FIG. 27, and illustrating the locking member in an unlocked position.
Figure 39:
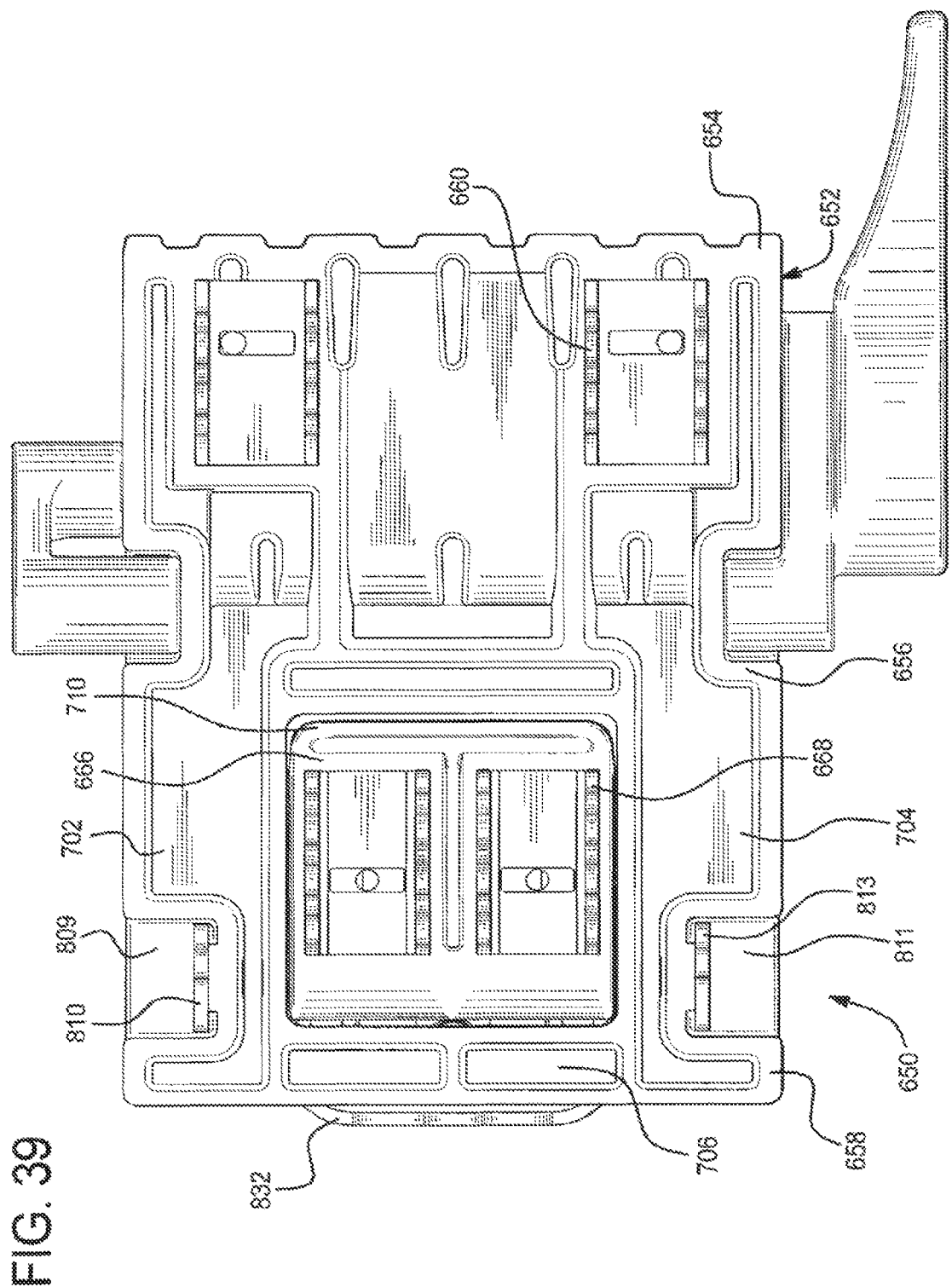
FIG. 39 is a bottom view of the chock of the embodiment of FIG. 27, and illustrating the locking member in a locked position.
Figure 40:
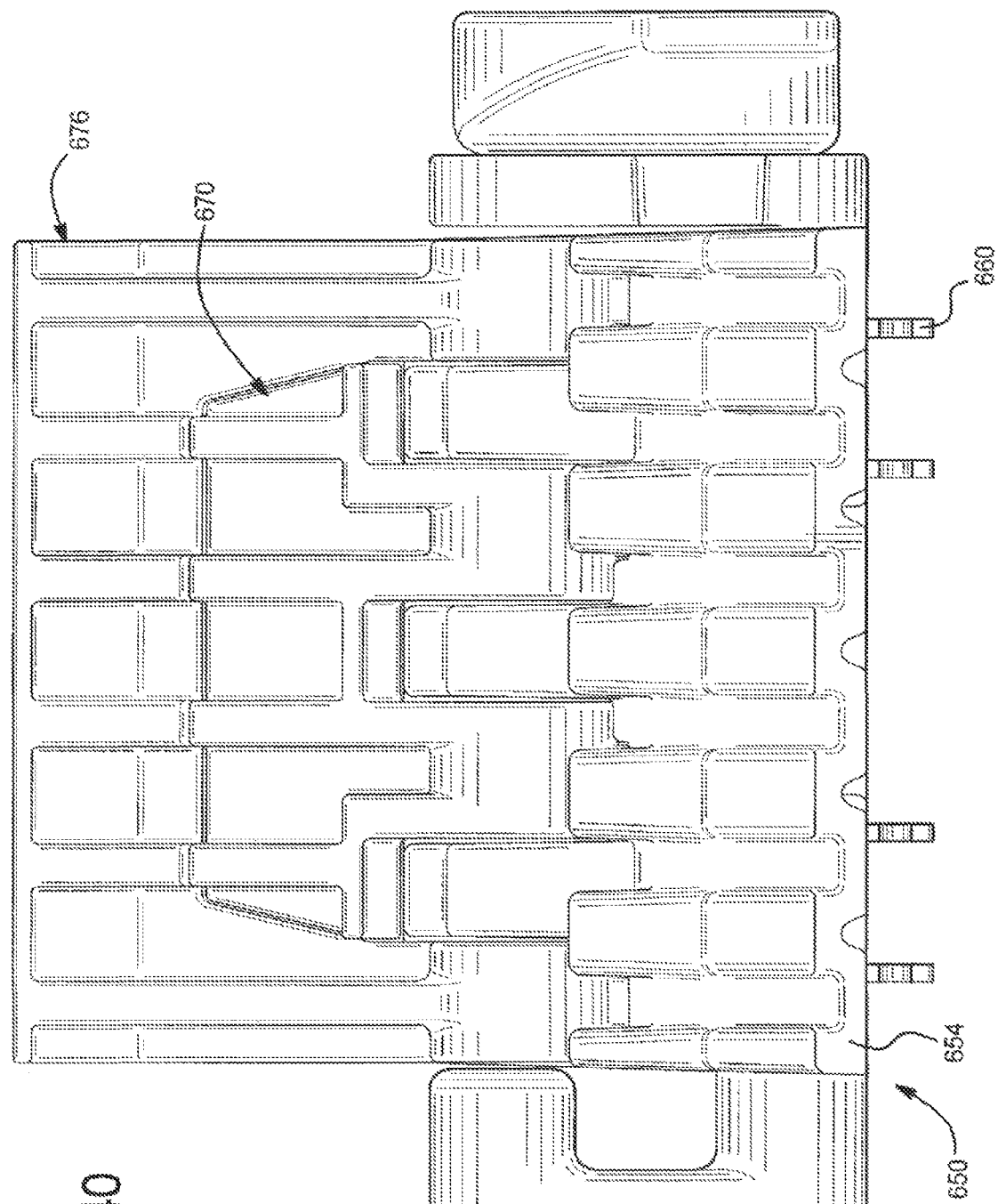
FIG. 40 is a front view of the chock of the embodiment of FIG. 27, and illustrating the inner tire engager in an extended position and the outer tire engager in an extended position.
Figure 41:
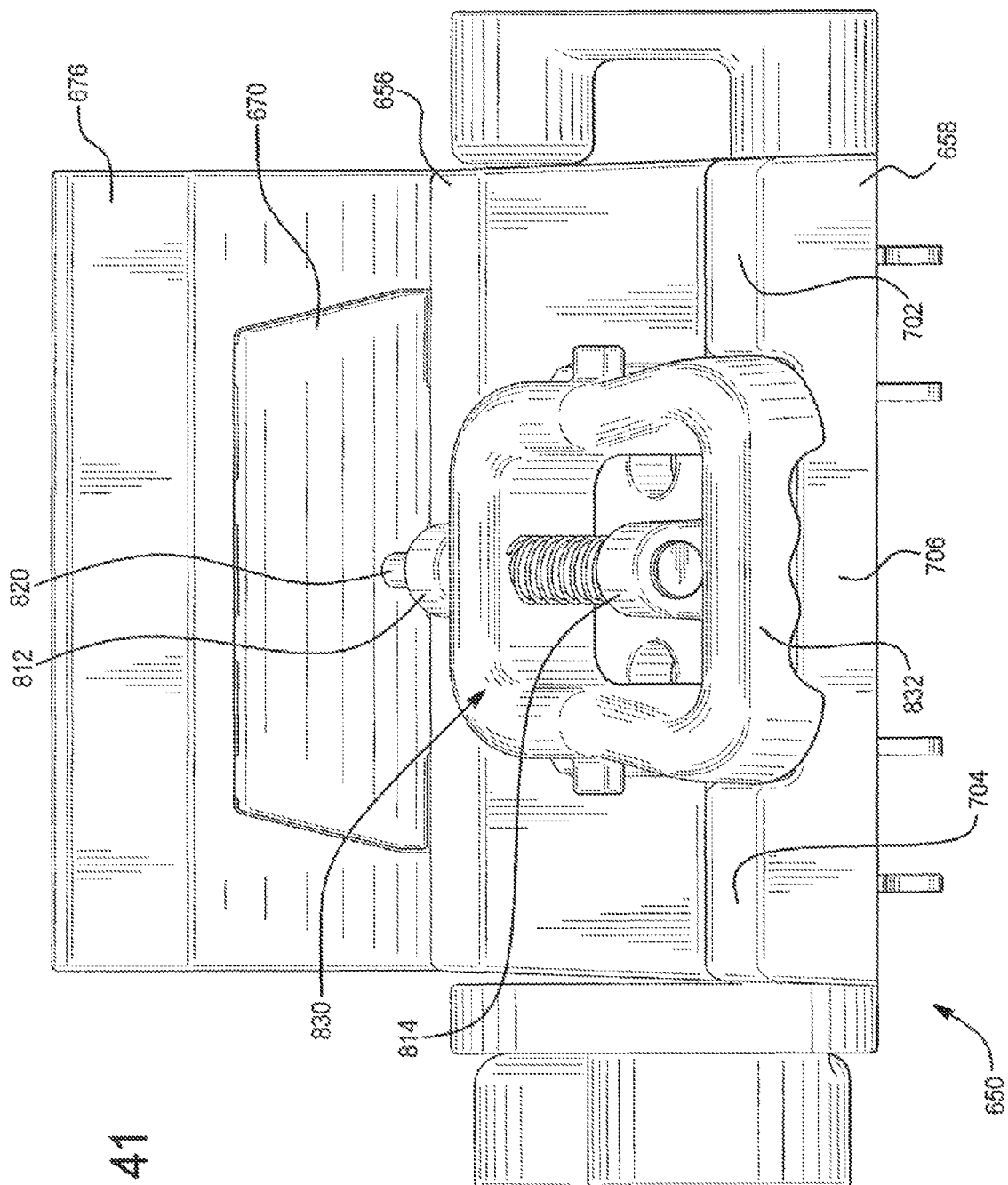
FIG. 41 is a rear view of the chock of the embodiment of FIG. 27, and illustrating the inner tire engager in an extended position, the outer tire engager in an extended position, and the locking member in an unlocked position.
Figure 42:
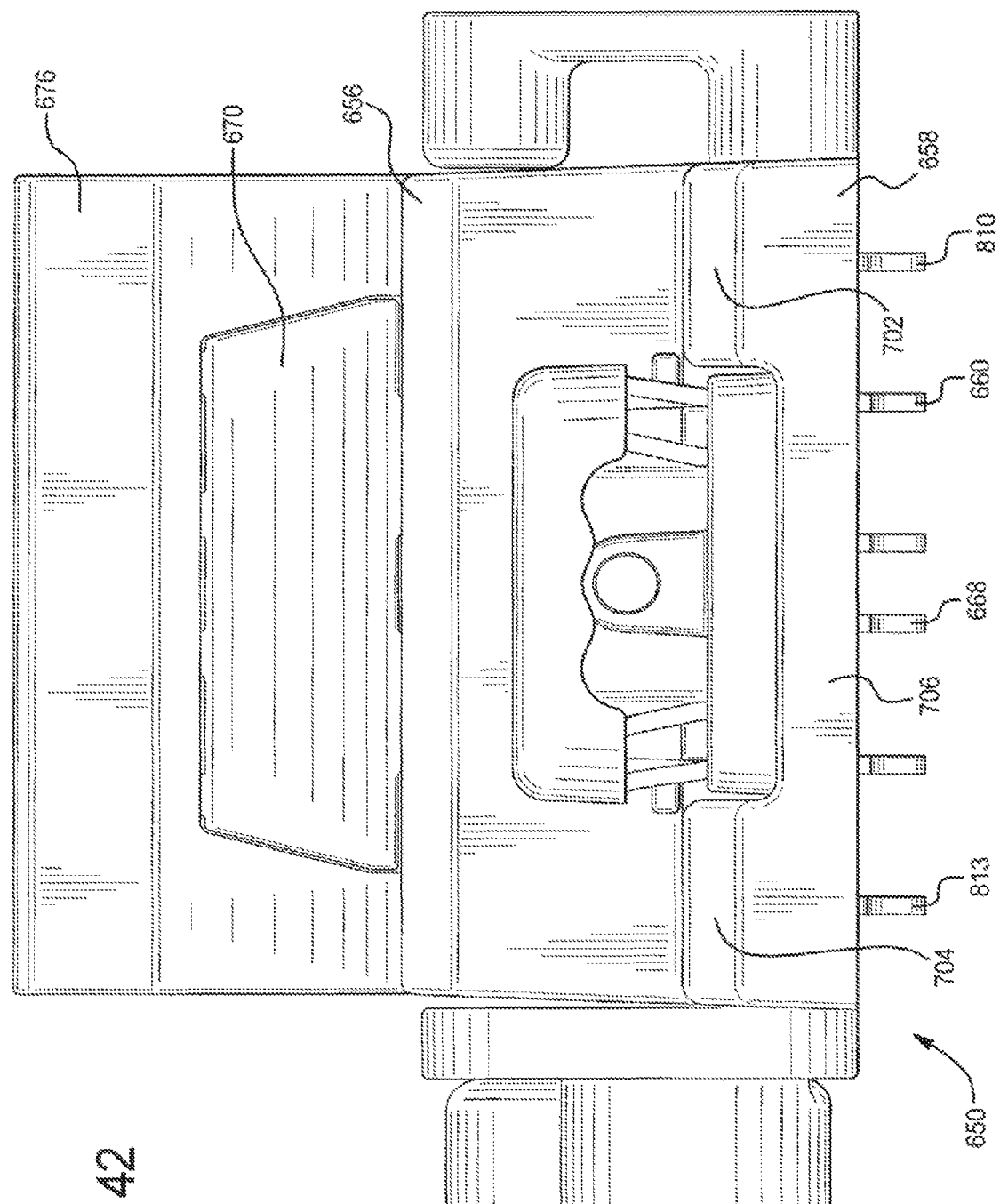
FIG. 42 is a rear view of the chock of the embodiment of FIG. 27, and illustrating the inner tire engager in an extended position, the outer tire engager in an extended position, and the locking member in a locked position.

Unlike the above embodiments of the chock shown in FIGS. 27 to 46, the locking member 1066 of chock 1050 includes an engagement wedge 1067 extending from the front of the locking member 1066 as best shown in FIGS. 48, 49, 50, 51A, 55, 56, and 57. This engagement wedge 1067 is configured to engage the back surface 1227 of the central portion 1056 of the body 1052 when the locking member 1066 is in the locked position. This engagement wedge 1067 prevents relative movement of the body 1052 to the locking member 1066 when the inner and outer tire engagers 1070 and 1076 or engaged by a tire. This engagement wedge 1067 substantially fills the gap which existed between the locking member and the central portion in the chock of FIGS. 27 to 46 as best seen in FIGS. 37 and 39. This engagement wedge prevents the body and the front grate engagers from rearward movement and from disengaging the gating when rearward forces are applied to the tire engagers (or to otherwise to the front of the body), and thus prevents disengagement of the chock from the grating.

As discussed above, the chock 1050 also includes a plurality of downwardly projecting grate engagers or teeth 1060 which extend downwardly from the front section 1054 of the body 1052 and are arranged in four grate engagers or parallel spaced rows each having four teeth. Each grate engager or tooth 1060 has a curved or rounded surface which faces downwardly and forwardly. The curved surfaces permit pivoting of the body 1052 between an upper inclined released position and a downward horizontal locked position where the grate engagers or teeth 1060 project between the parallel spaced wires and engage the wires of the grating or wire grid. The grate engagers or teeth 1060 are arranged in a plurality of laterally spaced apart rows with each row having a plurality of teeth. The grate engagers or teeth 1060 are made from a suitable metal. It should be appreciated that the grate engagers or teeth can be made from any suitably strong material. In the illustrated embodiment, the grate engagers 1060 are respectively attached to two grate engager brackets 1060*a* and 1060*b* (see FIGS. 50 and 51) which are attached to the front portion 1054 of the body 1052 by suitable fasteners such as bolts 1542*a* and 1542*b*, washers 1544*a* and 1544*b*, and nuts 1548*a* and 1548*b*. It should be appreciated as shown in FIGS. 47, 48, 50, 51, and 52 that the front portion 1054 (and particularly upwardly extending reinforcing ribs or supports 1114 and 1122) define suitable openings for the fasteners.

Figure 51A:
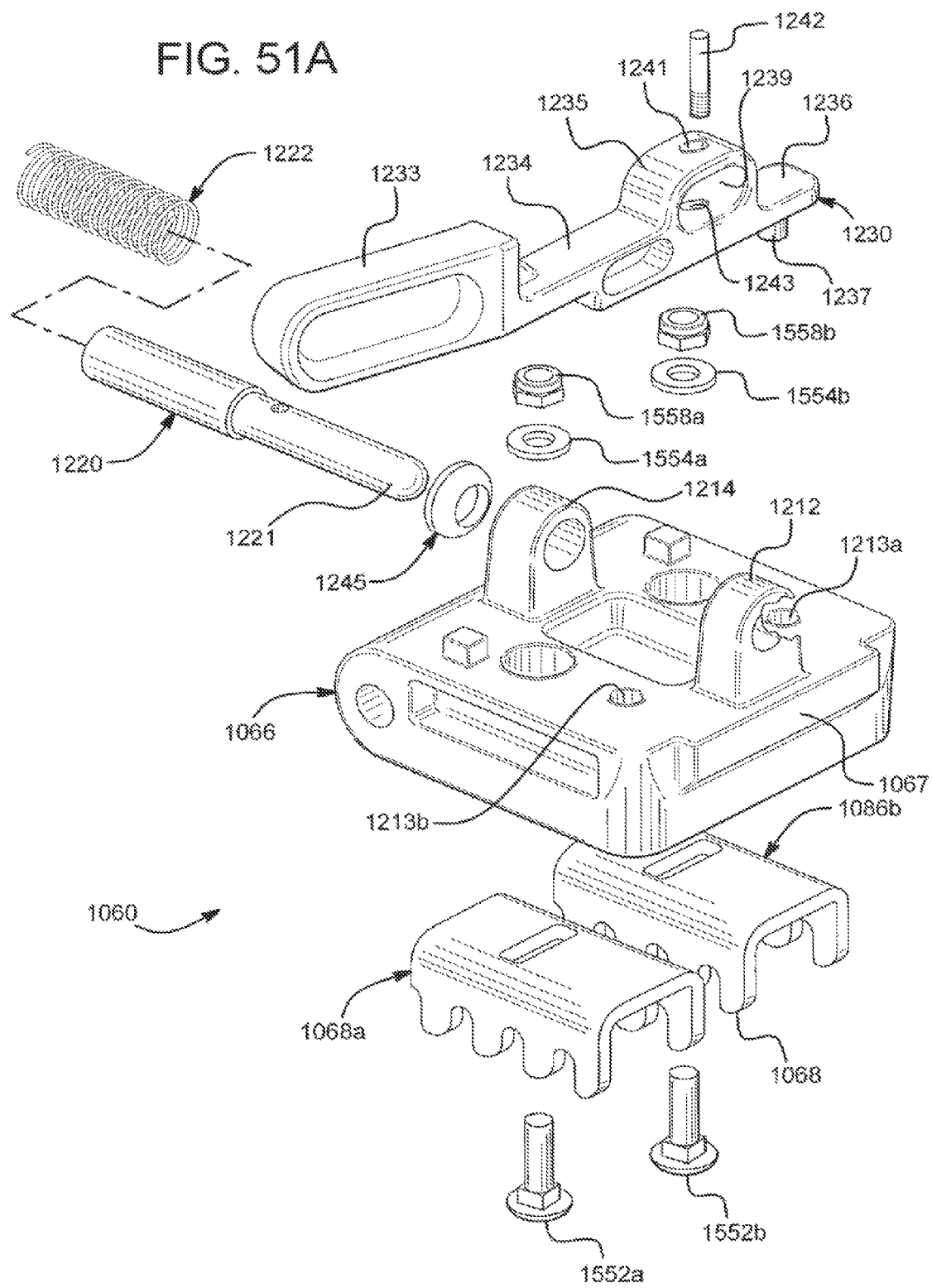
FIG. 51A is an exploded perspective view of the locking assembly of the chock of the embodiment of FIG. 47, and showing the front boss broken away to illustrate the pivot pin opening in the locking member.
Figure 52:
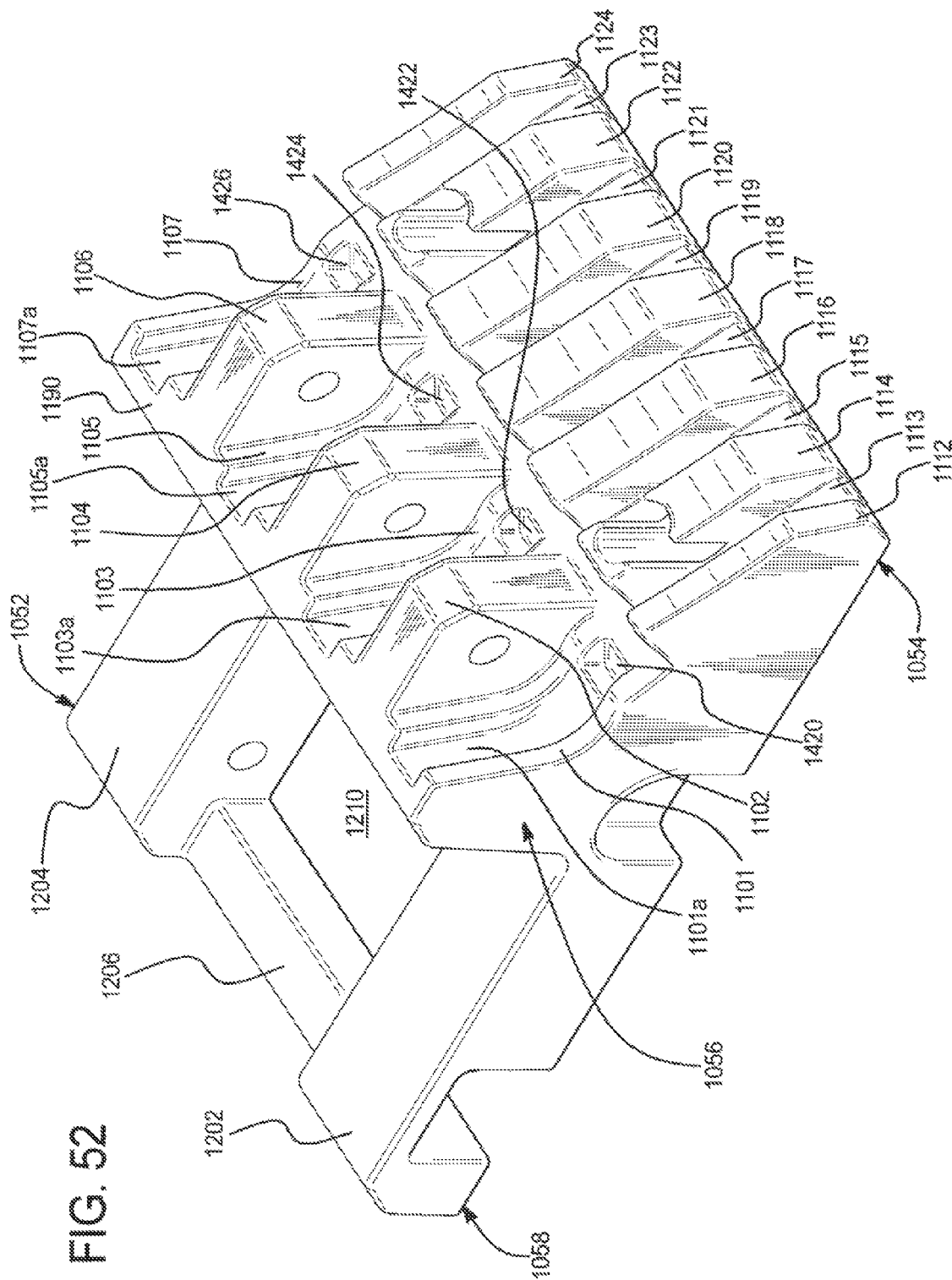
FIG. 52 is an enlarged top front perspective view of the body of the chock of the embodiment of FIG. 47.
Figure 56A:
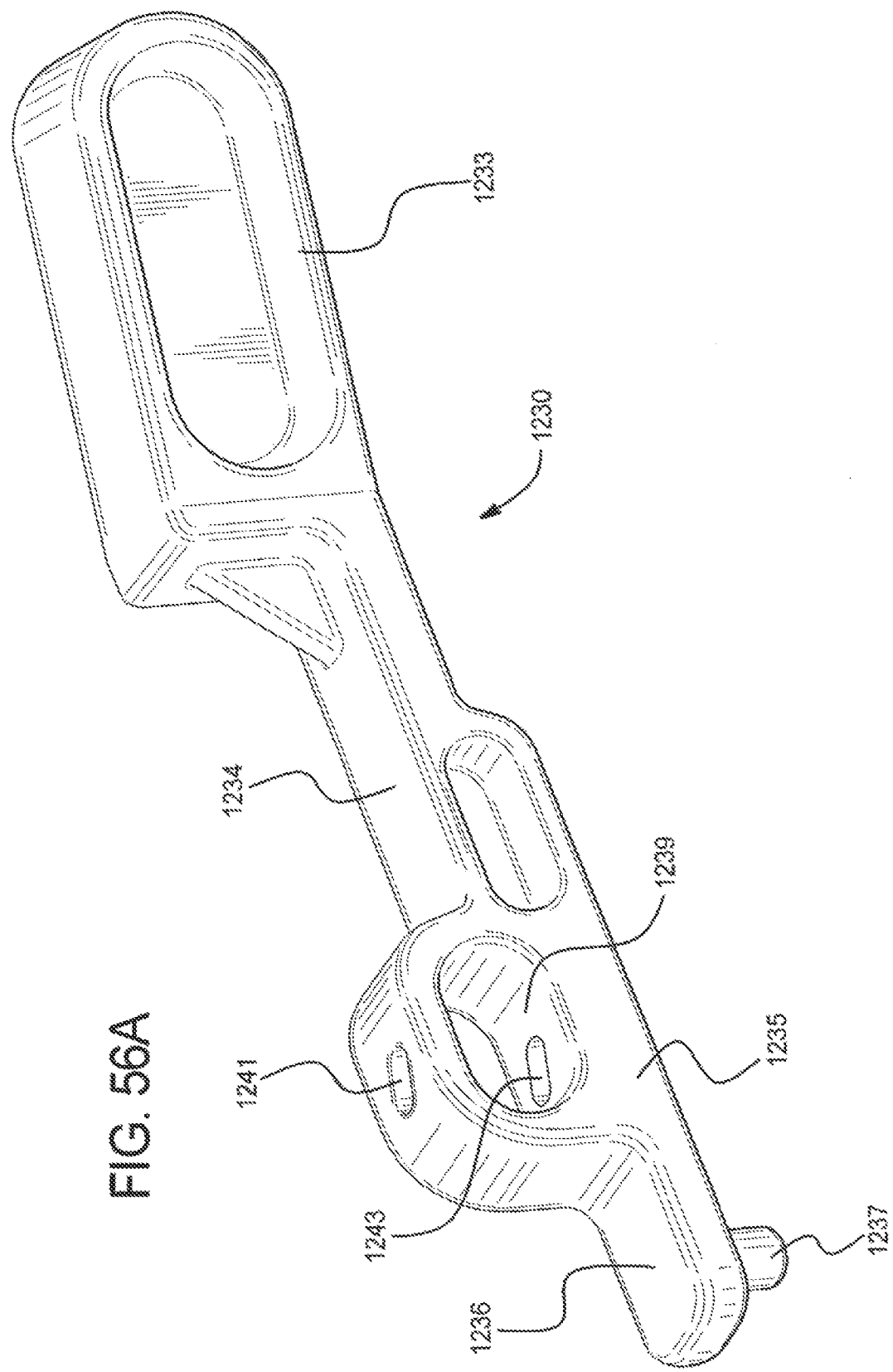
FIG. 56A is an enlarged perspective view of the handle of the locking assembly of the chock of the embodiment of FIG. 47.

As best seen in FIG. 51A, the locking member 1066 of the chock 1050 also has a plurality of downwardly projecting grate engagers or teeth 1068 having rounded front corner surfaces for entering and engaging the grating or wire grid. The grate engagers or teeth 1068 are arranged in a plurality of laterally spaced-apart rows with each row having a plurality of teeth. The grate engagers or teeth 1068 are made from a suitable metal. It should be appreciated that the grate engagers or teeth can be made from any suitably strong material. In the illustrated embodiment, the grate engagers 1068 are respectively attached to two grate engager brackets 1068*a* and 1068*b* which are attached to the locking member 1066 by suitable fasteners such as bolts 1552*a* and 1552*b*, washers 1554*a* and 1554*b*, and nuts 1558*a* and 1558*b*. It should be appreciated that, as shown in FIGS. 48, 59, 50, 51A, 55, 56, and 57, the locking member 1066 defines suitable openings for the fasteners. As best seen in FIGS. 51A, the rear edge of each of the grate engagers is straight or substantially straight and the front edge of each of the grate engagers is curved. This facilitates insertion into the grating when the locking member is moved from the open position to the closed and locked position. It should be appreciated that the grate engagers and the grate engager brackets can be alternatively configured in accordance with the present disclosure.

Figure 58:
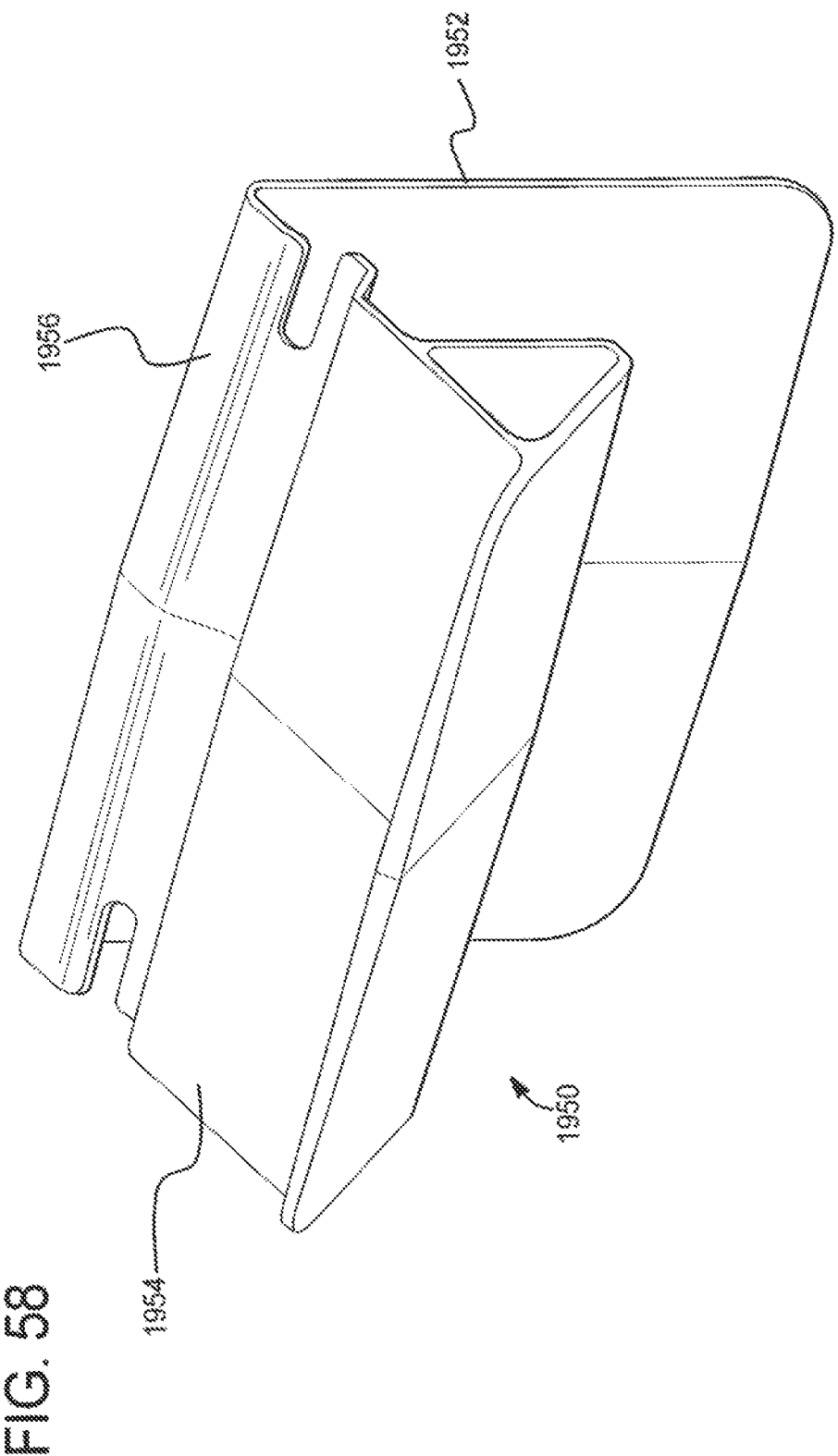
FIG. 58 is an enlarged perspective view of a bracket for holding a chock in a storage pan attached to a side wall of an auto-rack railroad car.

Turning now to FIGS. 58, 59, and 60, the present disclosure also provides a chock storage bracket 1950 for holding a chock 1050 in a storage pan 900 attached to a side wall of an auto-rack railroad car. The chock storage bracket 1950 includes a pan attachment wall or arm 1952, a chock engager or holder 1954 and a connection arm 1956 connecting the chock engager or holder 1954 to the pan attachment wall or arm 1952. The chock engager or holder 1954 is biased by the connection arm 1956 toward the pan attachment wall or arm 1952. The pan attachment wall 1952 is configured to fit between the storage pan 900 and the side wall of the auto-rack car (not shown) to hold the chock storage bracket 1950 in place. The chock engager 1954 is configured to engage the rear wall or base 1206 interconnecting and extending between the side walls or bases 1202 and 1204 of the rear portion 1058 of the body 1052. The chock storage bracket is in one embodiment molded from a suitable nylon or other suitable plastic material. It should be appreciated that the chock storage bracket can be made from other suitable materials and in other suitable manners. It should also be appreciated that the chock storage bracket can be configured in other suitable configurations.

It should also be appreciated that, as mentioned above, the outer tire engager 1076 includes storage member locking fingers 1099*a*, 1099*b* and 1099*c* extending from the outer surface of the lip 1099 for engaging the bottom portion of the storage pan 900 as best illustrated in FIGS. 59.

Figure 61:
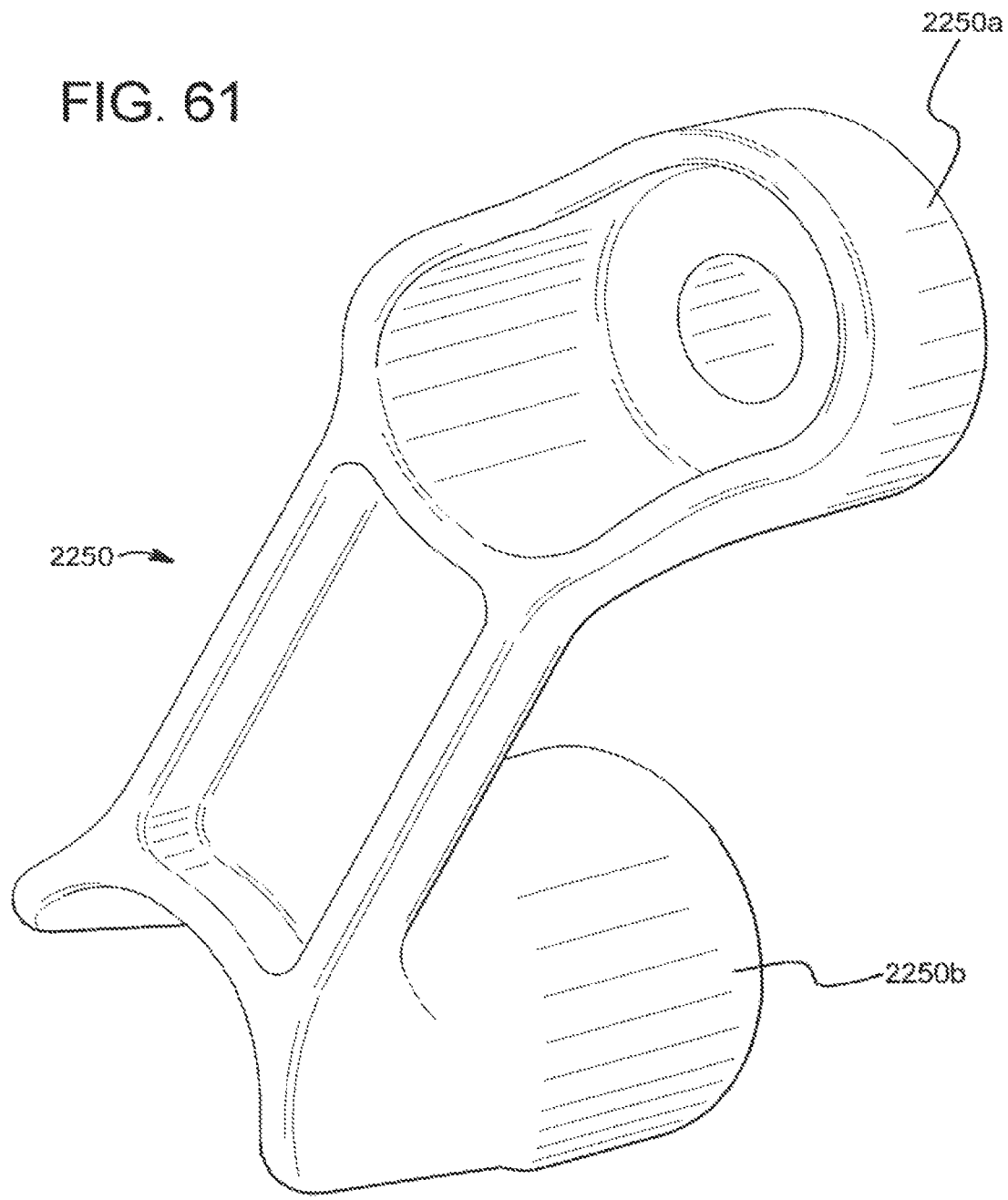
FIG. 61 is a perspective view of an alternative embodiment of a pivot connection bracket for the chock.
Figure 62:
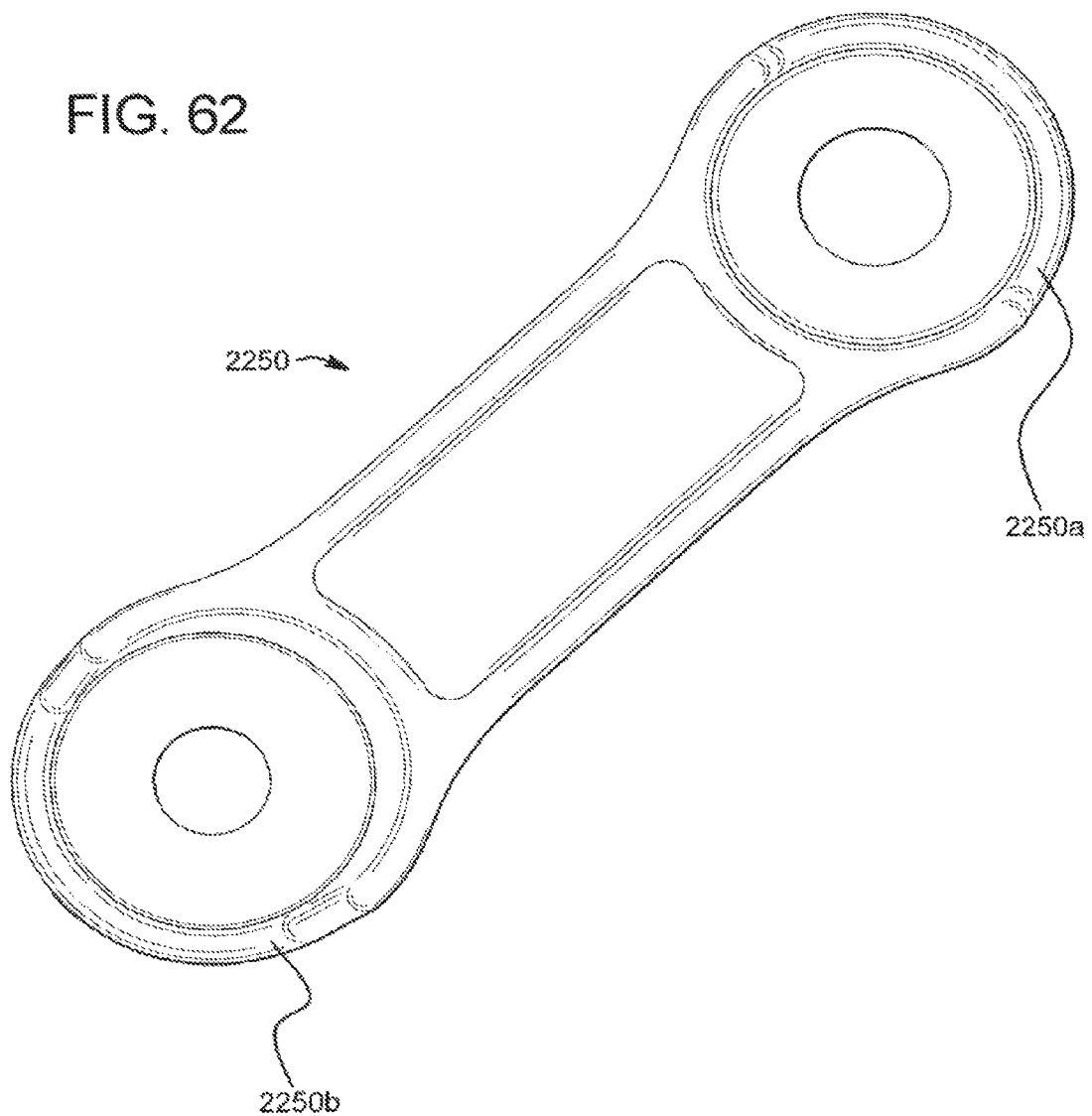
FIG. 62 is a side view of the alternative embodiment of the pivot connection bracket of FIG. 61.

Turning now to FIGS. 61 and 62, an alternative pivot connection bracket 2250 is illustrated. The pivot connection bracket 2250 includes alternatively configured ends 2250*a* and 2250*b*. This alternative configuration is advantageous to reduce possible breakage of the pivot connection bracket and for assembly purposes. It should be appreciated that the connection brackets can be configured in other alternative configuration in accordance with the present disclosure.

Figure 63:
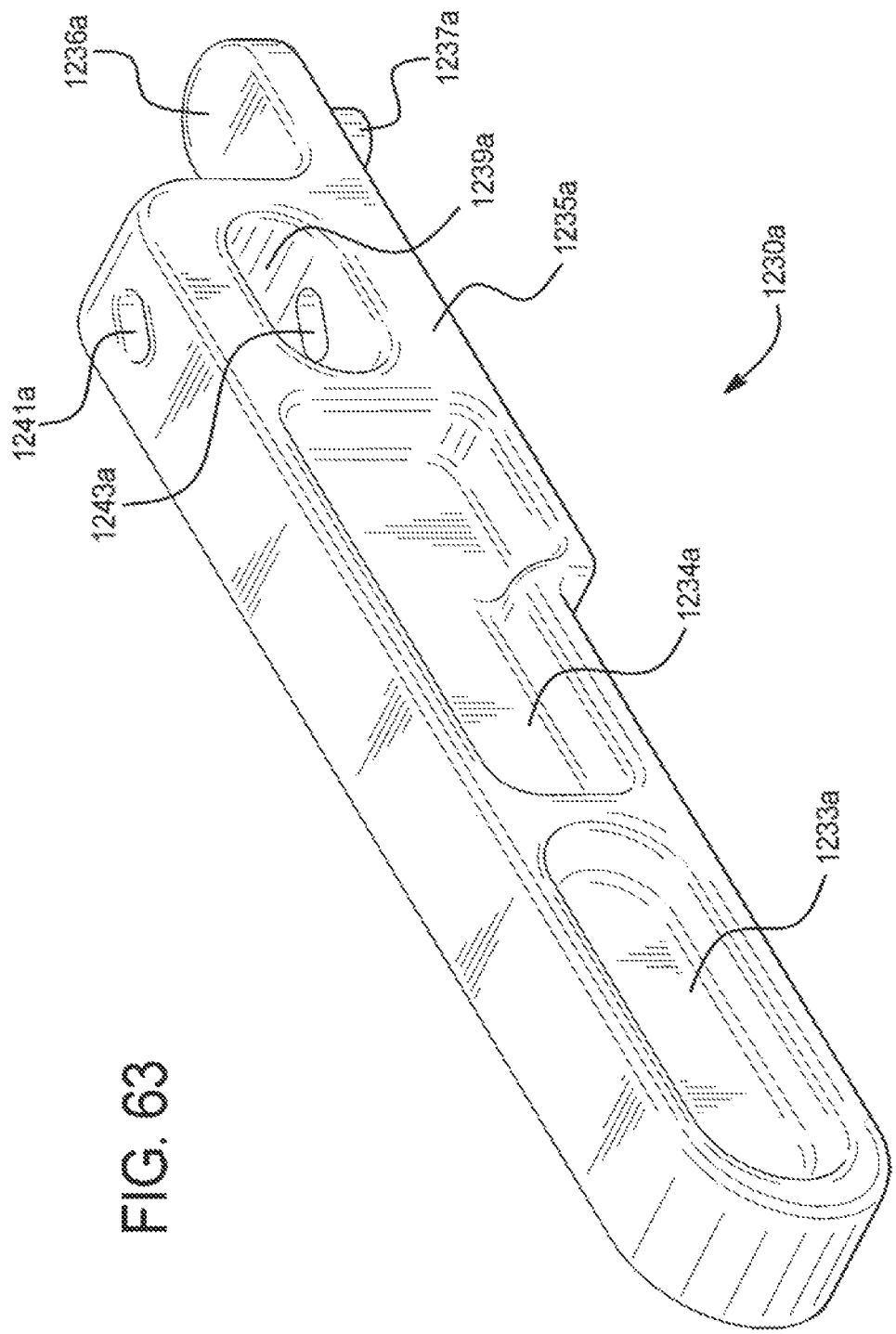
FIG. 63 is a side perspective view of an alternative embodiment of the handle of the locking assembly.

Turning now to FIG. 63, an alternative handle of the locking assembly is illustrated. In this alternative embodiment, the handle 1230*a* includes a hand grasp 1233*a*, an actuation arm 1234*a* attached to the hand grasp 1233*a*, an actuation hand 1235*a* attached to the actuation arm 1234*a*, and a pivot finger or lever 1236*a* attached to the actuation hand 1235*a*. The actuation hand 1235*a* defines a horizontally or substantially horizontally extending locking pin opening 1239*a*. The actuation hand 1235*a* also defines a pair of aligned vertically or substantially vertical extending oval roll or engagement pin openings 1241*a* and 1243*a*. This alternative configuration is advantageous to reduce possible breakage of the handle. It should be appreciated that the handle can be configured in other alternative configurations in accordance with the present disclosure.

It should also be appreciated that this pivot handle mechanism can be configured to be used in a locking mechanism which is pivotally attached to the center portion of the body and locks at the rear portion of the body. Such embodiment, may include one or more engagement wedges or other suitable configurations to prevent disengagement of the chock from the grating.

It will be understood that modifications and variations may be effected without departing from the scope of the novel concepts of the present invention, and it is understood that this application is to be limited only by the scope of the claims.

The invention is claimed as follows:

1. A vehicle wheel chock locking assembly handle for a locking assembly of a vehicle wheel chock, said vehicle wheel chock locking assembly handle comprising:
    an elongated body defining a locking pin opening configured such that a locking pin of the locking assembly can extend through said locking pin opening, and a pair of aligned roll pin openings configured such that a roll pin of the locking assembly can extend through said roll pin openings and through said locking pin; and
    a pivot finger attached to the body, said pivot finger including a pivot pin configured to be received in a pivot hole in a locking member of the locking assembly.

2. The vehicle wheel chock locking assembly handle of claim 1, wherein the locking pin opening extends in a first direction through the body and the roll pin openings extend in a second direction through the body, said second direction being transverse to said first direction.

3. The vehicle wheel chock locking assembly handle of claim 1, wherein each of the roll pin openings are oval.

4. The vehicle wheel chock locking assembly handle of claim 1, wherein the body and the pivot finger are integrally formed.

5. The vehicle wheel chock locking assembly handle of claim 1, wherein the body includes an actuation hand which defines said locking pin opening and said roll pin openings.

6. The vehicle wheel chock locking assembly handle of claim 5, wherein the actuation hand includes a first wall and a second wall, said first wall and said second wall partially defining the locking pin opening, and wherein one of the roll pin openings is in the first wall and the other roll pin opening is in the second wall.

7. A vehicle wheel chock locking assembly handle for a locking assembly of a vehicle wheel chock, said vehicle wheel chock locking assembly handle comprising:
   an elongated body defining a locking pin opening configured such that a locking pin of the locking assembly can extend through said locking pin opening, and at least one roll pin opening configured such that a roll pin of the locking assembly can extend through said roll pin opening and through said locking pin; and
   a pivot finger attached to the body.

8. The vehicle wheel chock locking assembly handle of claim 7, wherein the locking pin opening extends in a first direction through the body and the at least one roll pin opening extends in a second direction through the body, said second direction being transverse to said first direction.

9. The vehicle wheel chock locking assembly handle of claim 7, wherein each roll pin opening is oval.

10. The vehicle wheel chock locking assembly handle of claim 7, wherein the body and the pivot finger are integrally formed.

11. The vehicle wheel chock locking assembly handle of claim 7, wherein the body includes an actuation hand which defines said locking pin opening and said each roll pin opening.

12. The vehicle wheel chock locking assembly handle of claim 11, wherein the actuation hand includes a first wall partially defining the locking pin opening, and wherein the at least one roll pin opening is in the first wall.

13. The vehicle wheel chock locking assembly handle of claim 7, wherein the pivot finger includes a pivot pin configured to be received in a pivot hole in a locking member of the locking assembly.

\* \* \* \* \*